United States Patent
Roenning

(10) Patent No.: US 8,631,047 B2
(45) Date of Patent: Jan. 14, 2014

(54) EDITING 3D VIDEO

(75) Inventor: Jeff Roenning, Santa Cruz, CA (US)

(73) Assignee: Apple Inc., Cupertino, CA (US)

( * ) Notice: Subject to any disclaimer, the term of this patent is extended or adjusted under 35 U.S.C. 154(b) by 198 days.

(21) Appl. No.: 12/816,340

(22) Filed: Jun. 15, 2010

(65) Prior Publication Data

US 2011/0307526 A1    Dec. 15, 2011

(51) Int. Cl.
*G06F 7/00* (2006.01)

(52) U.S. Cl.
USPC .......................................................... 707/803

(58) Field of Classification Search
USPC .................................................. 707/803, 913
See application file for complete search history.

(56) References Cited

U.S. PATENT DOCUMENTS

| | | |
|---|---|---|
| 5,442,744 A | 8/1995 | Piech et al. |
| 5,664,216 A | 9/1997 | Blumenau |
| 5,682,326 A | 10/1997 | Klingler et al. |
| 5,999,173 A * | 12/1999 | Ubillos .......................... 715/724 |
| 6,154,600 A | 11/2000 | Newman et al. |
| 6,154,601 A | 11/2000 | Yaegashi et al. |
| 6,161,115 A | 12/2000 | Ohanian |
| 6,324,335 B1 | 11/2001 | Kanda |
| 6,392,710 B1 | 5/2002 | Gonsalves et al. |
| 6,414,686 B1 | 7/2002 | Protheroe et al. |
| 6,477,315 B1 | 11/2002 | Ohomori |
| 6,539,163 B1 | 3/2003 | Sheasby et al. |
| 6,546,188 B1 | 4/2003 | Ishii et al. |
| 6,628,303 B1 | 9/2003 | Foreman et al. |
| 6,763,175 B1 | 7/2004 | Trottier et al. |
| 6,828,971 B2 | 12/2004 | Uesaki et al. |
| 6,867,787 B1 | 3/2005 | Shimizu et al. |
| 7,009,611 B2 | 3/2006 | Di Lelle |
| 7,313,755 B2 | 12/2007 | Rahman et al. |
| 7,325,199 B1 | 1/2008 | Reid |
| 7,336,264 B2 | 2/2008 | Cajolet et al. |
| 7,623,755 B2 | 11/2009 | Kuspa |
| 7,836,389 B2 | 11/2010 | Howard et al. |

(Continued)

FOREIGN PATENT DOCUMENTS

| | | |
|---|---|---|
| EP | 0702832 | 3/1996 |
| WO | WO 2009/122213 | 10/2009 |
| WO | WO 2010/106586 | 9/2010 |

OTHER PUBLICATIONS

"Step by Step Guide to Stereoscopic 3D Editing & Finishing", Month Unknown, 2009, pp. 1-29, Avid Technology Inc., www.avid.com/stereo3D.

(Continued)

*Primary Examiner* — Truong Vo
(74) *Attorney, Agent, or Firm* — Adeli & Tollen LLP

(57) ABSTRACT

Some embodiments provide a 3D video editing application. The application identifies a set of video clips on one or more external sources. The set includes a first video clip of a particular scene from a first view and a second video clip of the particular scene from a second view. The application associates the first video clip with the second video clip and stores the associated first and second video clips in a storage. The association for use in creating a composite presentation that includes the set of video clips. The application receives an edit to a first video clip in a first track of the composite presentation. The application identifies an associated second video clip in a second track and automatically applies the received edit to the first video clip and the associated second video clip.

24 Claims, 32 Drawing Sheets

(56) References Cited

U.S. PATENT DOCUMENTS

| | | | |
|---|---|---|---|
| 2001/0020953 | A1 | 9/2001 | Moriwake et al. |
| 2001/0036356 | A1 | 11/2001 | Weaver et al. |
| 2002/0021832 | A1 | 2/2002 | Dawson |
| 2002/0023103 | A1 | 2/2002 | Gagne |
| 2002/0154140 | A1 | 10/2002 | Tazaki |
| 2002/0154156 | A1 | 10/2002 | Moriwake et al. |
| 2002/0156805 | A1 | 10/2002 | Schriever et al. |
| 2003/0002715 | A1 | 1/2003 | Kowald |
| 2003/0117431 | A1 | 6/2003 | Moriwake et al. |
| 2004/0071441 | A1 | 4/2004 | Foreman et al. |
| 2004/0100482 | A1* | 5/2004 | Cajolet et al. ............... 345/716 |
| 2004/0201609 | A1 | 10/2004 | Obrador |
| 2005/0219239 | A1 | 10/2005 | Mashitani et al. |
| 2005/0259147 | A1* | 11/2005 | Nam et al. ................. 348/43 |
| 2006/0008247 | A1 | 1/2006 | Minami et al. |
| 2007/0089152 | A1 | 4/2007 | Patten et al. |
| 2007/0189708 | A1* | 8/2007 | Lerman et al. ............... 386/52 |
| 2007/0296809 | A1* | 12/2007 | Newbery ................. 348/42 |
| 2008/0044155 | A1 | 2/2008 | Kuspa |
| 2009/0046097 | A1 | 2/2009 | Franklin |
| 2010/0111489 | A1* | 5/2010 | Presler ..................... 386/52 |
| 2010/0281375 | A1 | 11/2010 | Pendergast et al. |
| 2010/0281376 | A1 | 11/2010 | Meaney et al. |
| 2010/0290483 | A1* | 11/2010 | Park et al. ................. 370/472 |
| 2011/0157331 | A1* | 6/2011 | Jang ..................... 348/54 |

OTHER PUBLICATIONS

"Editing Stereoscopic 3D Video in Vegas Pro 9", Workflow Paper, Apr. 2, 2010, pp. 1-6, Sony Creative Software Inc., Madison, WI, USA.

Lee, Bongho, et al., "Stereoscopic Contents Authoring System for 3D DMB Data Service", Proceedings of the SPIE-IS&T Electronic Imaging, Jan. 19, 2009, pp. 1-12, vol. 7237, SPIE—The International Society for Optical Engineering, San Jose, CA, USA.

Casares, Juan, et al., "Simplifying Video Editing Using Metadata," Proceedings of Designing Interactive Systems (DIS 2002), Jun. 2002, pp. 157-166, London, United Kingdom.

Chisan, James, et al., "Video Bench—Final Report: SEng 480a/CSc 586a," Apr. 11, 2003, University of Victoria.

Myers, Brad A., et al., "A Multi-View Intelligent Editor for Digital Video Libraries," The First ACM+IEEE Joint Conference on Digital Libraries (JCDL'01), Jun. 24-28, 2001, pp. 106-115, Roanoke, VA, USA.

Author Unknown, "Apple Announces Final Cut Pro 4," NAB, Apr. 6, 2003, 3 pages, Apple Inc., Las Vegas, Nevada, USA.

Author Unknown, "Using Adobe Premiere Elements 8 Editor," last updated Aug. 12, 2010, 313 pages, Adobe Systems Incorporated, San Jose, California, USA.

Author Unknown, "Using Adobe Flash CS4 Professional," updated Mar. 5, 2009, 474 pages, Adobe Systems Incorporated, San Jose, California, USA.

Author Unknown, "Adobe Director 11: User Guide," Month Unknown, 2008, 498 pages, Adobe Systems Incorporated, San Jose, California, USA.

Author Unknown, "Adobe Premiere Pro CS3: User Guide," Apr. 1, 2008, 455 pages, Adobe Systems Incorporated, San Jose, California, USA.

Author Unknown, "iMovie '08 Getting Started," Month Unknown, 2008, pp. 1-50, Apple Inc., USA.

Brenneis, Lisa, "Final Cut Pro 3 for Macintosh: Visual QuickPro Guide," Month Unknown, 2002, 288 pages, Peachpit Press, Berkley, California, USA.

* cited by examiner

EDITING 3D VIDEO

BACKGROUND 3D video is becoming more and more popular in today's entertainment world. 3D movies are becoming more prevalent, and 3D television is expected to hit retailers soon. 3D video creates the illusion of depth in a video image by playing two tracks stereoscopically, which a user views through a pair of polarized glasses. When viewed through the polarized glasses, each eye only sees one of the tracks, thereby creating the illusion of depth.

The two 3D video tracks are generally filmed at the same time from two cameras that have two different views of a scene. In order to create 3D movies, television shows, etc., the creators (i.e., directors, editors, etc.) must edit 3D video. However, this can be very difficult with today's editing tools. An editor has to first cut one of the two tracks as desired, then go back and create the second track to perfectly match the first frame by frame. This essentially forces duplicating the editing process. Furthermore, post-cutting procedures such as color grading have to be uniformly applied separately to the two different tracks.

SUMMARY

Some embodiments of the invention provide a media editing application for importing, editing, and exporting 3D video. 3D video is generally captured simultaneously by two cameras with synchronized timecodes—a primary camera and a secondary camera. The media editing application of some embodiments identifies pairs of primary and secondary clips that were simultaneously captured and associates the pairs of clips together. The associated clips are then used to create a composite media presentation, and edits applied to one of the clips in a pair are automatically applied to the other clip.

In order to identify pairs of clips to associate, some embodiments examine the metadata of clips as the clips are imported. In some embodiments, a primary clip and its corresponding secondary clip have the same timecodes, and these timecodes are matched to identify pairs of clips. In some embodiments, the cameras store the clips with specific filenames such that simultaneously-recorded primary and secondary clips have file names that are the same except for an identifier (e.g., a prefix) that differentiates the primary clips from the secondary clips. Upon import, matching filenames are identified and the pairs of clips associated.

Once the clips are imported and associated by the media editing application, a user can create a composite video presentation with the clips. In some embodiments, a composite video presentation includes primary and secondary video tracks. When a user adds a primary clip to the primary track at a particular location in the composite video presentation, the media editing application automatically adds the associated secondary clip to the secondary track at the same location.

As the user edits the composite video presentation (e.g., inserting clips, deleting clips, moving clips, trimming clips, applying effects, etc.), some embodiments maintain the associations between the clips such that all edits applied to primary clips are correspondingly applied to associated secondary clips. In some embodiments, a user can decide for certain edits that do not affect the timeline of the composite presentation (e.g., color correction, alignment control, etc.) whether to apply the edit to both of a pair of associated clips automatically.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following Figures.

DETAILED DESCRIPTION

In the following detailed description, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a media editing application for importing, editing, and exporting 3D video. 3D video is generally captured simultaneously by two cameras with synchronized timecodes—a primary camera and a secondary camera. The media editing application of some embodiments identifies pairs of primary and secondary clips that were simultaneously captured and associates the pairs of clips together. The associated clips are then used to create a composite media presentation, and edits applied to one of the clips in a pair are automatically applied to the other clip.

Figure 1:
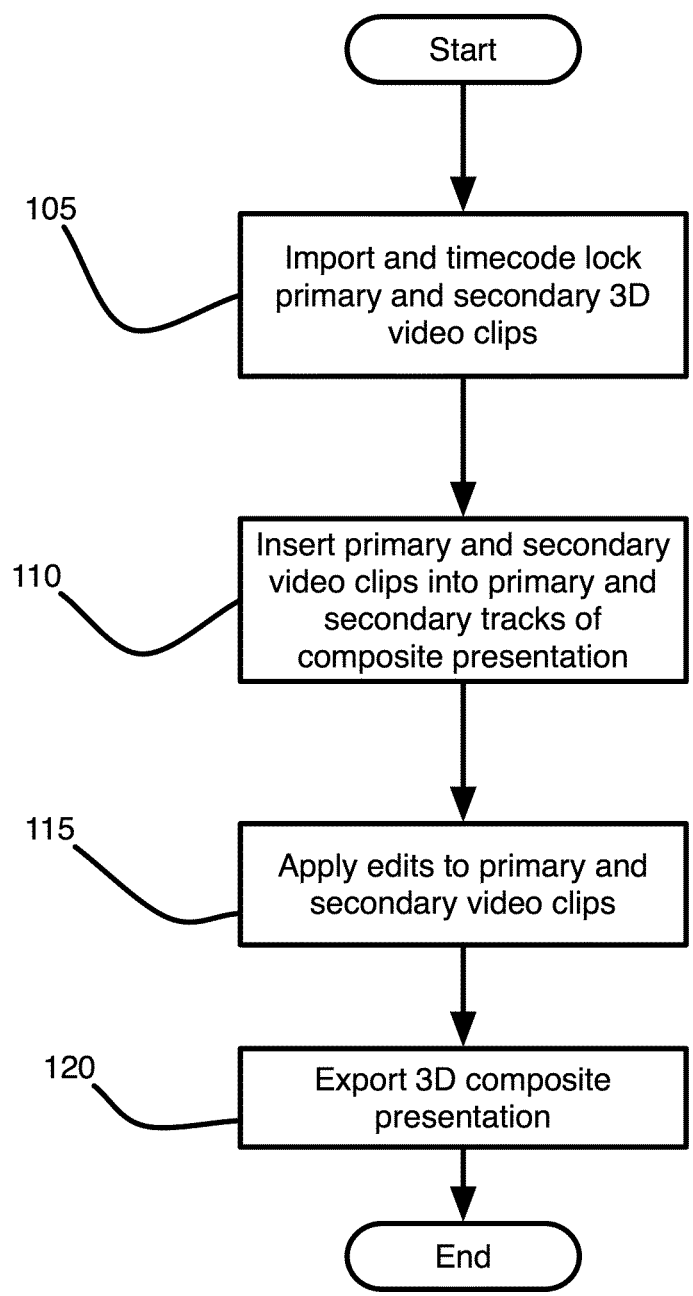
FIG. 1 conceptually illustrates a process of some embodiments performed by a media editing application.

FIG. 1 conceptually illustrates a process 100 of some embodiments performed by such a media editing application. As shown, the process 100 begins by importing and timecode locking (at 105) primary and secondary 3D video clips. In some embodiments, the media editing application timecode locks pairs of clips by associating a primary clip with its corresponding secondary clip.

In order to identify pairs of clips to associate, some embodiments examine the metadata of clips as the clips are imported. In some embodiments, a primary clip and its corresponding secondary clip have the same timecodes, and these timecodes are matched to identify pairs of clips. In some embodiments, the cameras store the clips with specific filenames such that simultaneously-recorded primary and secondary clips have file names that are the same except for an identifier (e.g., a prefix) that differentiates the primary clips from the secondary clips. Upon import, matching filenames are identified and the pairs of clips associated.

Next, the process inserts (at 110) the primary and secondary video clips into primary and secondary tracks of a composite presentation. The primary track and secondary track are designed to be played stereoscopically in order to create the 3D viewing effect when a viewer is wearing polarized 3D glasses. In some embodiments, the clips are inserted into the tracks by a user through a graphical user interface of the media editing application.

When a user adds a primary clip to the primary track at a particular location in the composite video presentation, the media editing application automatically adds the associated secondary clip to the secondary track at the same location. Some embodiments create new data structures for the clips in the tracks and associate these data structures as pairs when the clips are inserted into the tracks.

The process 100 then applies (at 115) edits to the primary and secondary video clips. In some embodiments, the edits are applied to the clips through the graphical user interface of the media editing application. As the user edits the composite video presentation, some embodiments maintain the associations between the clips such that all edits applied to primary clips are correspondingly applied to associated secondary clips.

Some embodiments automatically apply a subset of all the edits to the associated clips. Edits that affect the timeline of the composite presentation (e.g., inserting a clip, deleting a clip, moving a clip, trimming a clip, etc.) are automatically applied to both clips in a pair. In some embodiments, a user can decide for certain edits that do not affect the timeline of the composite presentation (e.g., color correction, alignment control, etc.) whether to apply the edit to both of a pair of associated clips automatically or to only apply the edit to a particular one of the pair.

The process 100 exports (at 120) the 3D composite presentation. The process then ends. Some embodiments maintain the associations between the clips in the primary and secondary tracks in the export file. Some embodiments export the presentation to a single file that includes information about both primary and secondary tracks. Other embodiments, though export the presentation to two files—one for the primary track and another for the secondary track.

Several more detailed embodiments of the invention are described below. Section I describes in further detail the architecture of the 3D video editing system of some embodiments. Section II then describes the import and timecode locking process of some embodiments. Section III introduces the graphical user interface of the media editing application, while Section IV describes the application of various edits to a 3D composite presentation. Section V describes the export of a 3D composite presentation. Finally, Section VI describes an electronic system with which some embodiments of the invention are implemented.

I. 3D Video System Architecture

Figure 2:
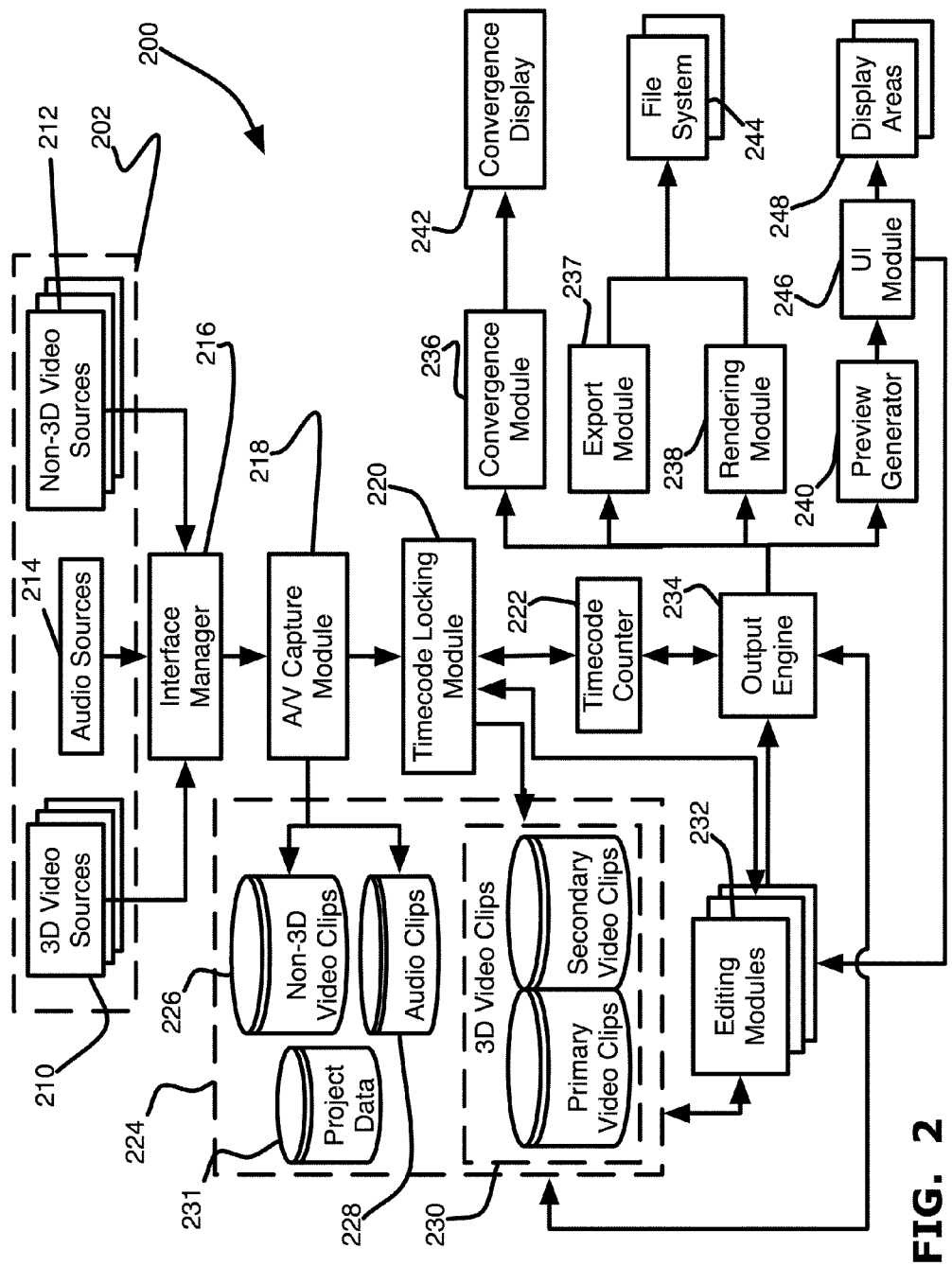
FIG. 2 illustrates the system architecture of a 3D editing system of some embodiments.

The 3D video editing application is part of a 3D editing system in some embodiments. The 3D editing system may be a specialized computing device or a personal computer in different embodiments. FIG. 2 illustrates the system architecture of a 3D editing system 200 of some embodiments. As shown in FIG. 2, the 3D editing system module includes media sources 202, interface manager 216, A/V capture module 218, timecode locking module 220, timecode counter 222, data storage 224, non-3D video clips 226, audio clips 228, 3D video clips 230, editing modules 232, output engine 234, convergence module 236, export module 237, rendering module 238, preview generator 240, UI module 246, convergence display 242, file system 244 and display areas 248. Some or all of these modules are part of a 3D video editing application in some embodiments, while some of the modules are part of other applications (e.g., an operating system) on the computing device on which the 3D video editing application operates.

The media sources 202 of some embodiments include 3D video sources 210, non-3D video sources 212, and/or audio sources 214. Although shown and discussed individually, these sources can be combined into one physical source in some embodiments. The media sources 202 store multimedia files before their import into the 3D video editing application. The media sources 202 may be one or more devices, files and/or multimedia streams. Multimedia streams may include content that is generated in real-time or near-real time and transmitted to the 3D video editing application. In some embodiments, the media sources 202 are selectable, allowing for import of only a selected set of the multimedia files stored.

The 3D video sources 210 of some embodiments are sources that can store 3D video content before the import of the content into the 3D video editing system 200. In some embodiments, the 3D video content stored on the 3D video sources includes one or more sets of 3D video clips. In some embodiments, the sets of 3D video clips are pairs of clips that include one primary clip and one secondary clip. The primary 3D video clip may be a video clip that corresponds to one eye (e.g., the left eye) and the secondary 3D video clip is a video clip that corresponds to the other eye (e.g., the right eye), producing a 3D effect when the pair of 3D video clips are played and viewed simultaneously.

In some embodiments, the 3D video sources 210 are one or more storage devices, such as solid state memory, hard drive, CD, DVD or other portable media, etc. These 3D video sources 210 can receive the 3D video clips from a variety of sources, including one or more 3D video cameras. In some embodiments, the 3D video sources 210 are one or more 3D cameras connected to a system on which the 3D video editing application is running Once connected, the 3D video sources appear as user-selectable devices from which pairs of 3D video clips may be imported.

The non-3D video sources 212 of some embodiments are sources that can store non-3D video clips before the import of the clips into the 3D video editing system 200. In some embodiments, the non-3D video sources 210 are one or more non-3D cameras connected to a system on which the 3D video editing application is running Once connected, the non-3D video sources appear as user-selectable device from which video clips may be imported. In some embodiments, the non-3D video sources 210 are one or more storage devices, such as solid state memory, hard drive, CD, DVD or other portable media, etc.

Audio sources 214 of some embodiments are sources that can store audio clips before the import of the clips into the 3D video editing system 200. In some embodiments, the audio sources 214 are one or more microphone devices that record and store audio. Once connected, the audio sources may appear as a user-selectable device from which audio clips may be imported. In some embodiments, the audio sources 214 are one or more storage devices, such as solid state memory, hard drive, CD, DVD or other portable media, etc.

The interface manager 216 allows the 3D video editing application to communicate with the media sources 202 in order to import media from the media sources 202. The interface manager 216 imports the multimedia data from the media sources 202 into the 3D video editing application. The interface manager 216 of some embodiments can communicate with a variety of devices, including, but not limited to, attached 3D and non-3D video capturing devices and/or general storage devices of some embodiments. Some embodiments will include multiple different interface managers for interfacing with different types of devices.

The A/V capture module 218 routes the imported multimedia clips based on the type of clip. In some embodiments, the A/V capture module 218 routes non-3D video clips and audio clips to storage and routes 3D video clips to a special module for further processing. To determine the imported multimedia clip type, the A/V capture module 218 of some embodiments inspects metadata of the multimedia clip. In some embodiments, the A/V capture module 218 determines an imported clip's type based on the source of the clip.

The timecode locking module 220 associates two related 3D video clips during import. Two 3D video clips are related in some embodiments if they are a simultaneous recording of the same scene, but taken from two different positions. The positional difference produces the stereoscopic effect central to creating the 3D effect when the two related 3D video clips are played back together. The timecode locking module 220 ensures that the two related 3D video clips are associated or linked together for editing, export and playback. Before the timecode locking module 220 associates the two related 3D video clips, one of the two related 3D video clips is designated as the primary clip and the other as the secondary clip.

Some embodiments achieve this designation based on the filenames of the 3D video clips. Cameras can be set up to use a special prefix in the filename to distinguish primary and secondary 3D video clips. In some embodiments, the filename prefix of "P" designates a primary clip and "S" designates a secondary clip. In some embodiments, a metadata field for the 3D video clip indicates whether it is a primary or secondary 3D video clip. For instance, the metadata field might indicate whether the clip is a left eye clip or right eye clip, with the left eye clips all being automatically designated as primary clips and the right eye clips as secondary clips.

During import, the timecode locking module 220 attempts to associate each imported primary 3D video clip with its related secondary 3D video clip. Different embodiments use different techniques to identify related primary and second 3D video clips. In some embodiments, the timecode locking module 220 relies on the filenames to identify a pair of related primary and secondary 3D video clips. Alternatively, or conjunctively, the timecode locking module 220 may rely on timecodes to identify a pair of related primary and secondary 3D video clips (e.g., the starting and ending timecodes of the clips). Once the related pair of primary and secondary 3D video clips is identified, the timecode locking module 220 associates them with each other. This association can also be referred to as "linking", "locking" or "timecode locking".

In some embodiments, the timecode locking module 220 associates related primary and secondary 3D video clips by storing a reference (e.g., a pointer) to the second clip with the first clip, and vice versa. This reference may be a field that uniquely identifies the other clip (e.g., the second clip's filename or a file system address). The timecode locking module operation and the data structure of the 3D video clips are discussed in further detail below by reference to FIG. 3.

The timecode counter 222 is used by the timecode locking module 220 in some embodiments. In some embodiments, the timecode counter 222 identifies timecode of imported video and can be used to help identify related 3D video clips. In some embodiments, the timecode counter 222 is used by the output engine when rendering a composite presentation in order to define new timecode for the output file or when exporting a composite presentation.

The data storage 224 stores the multimedia files after they are imported into the 3D video editing application. The data storage 224 houses all of the 3D video clips 230, non-3D video clips 226 and audio clips 228. The 3D video clips 230 are stored as timecode locked primary and secondary video clips. The data storage 224 may be one or more physical storages and can be local or remote to the system running the 3D video editing application.

In some embodiments, the data storage 224 also stores project data 231 for one or more composite media presentations that are composited from the various media clips. The project data 231 may include in and out points (i.e., timecodes) in the media clips that define clips that are part of a composite presentation, start and end points for the clips within the timeline of the composite presentation, edits applied to the clips, etc., as well as various other data about the composite presentation.

The editing modules 232 process media-editing instructions received from a user through the user interface (UI) interaction module 246. The editing modules 232 may use the video clips stored in the data storage 224 to create a composite presentation. The editing modules can update project data 231 with any edits affecting the composite presentation. Examples of such editing instructions may include instructions to select, move, drag, drop, insert, delete, trim, etc., clips in the timeline of the composite media presentation. In addition, the editing modules 232 of some embodiments communicate with the output engine to ensure that a composite presentation is output correctly. To update the project data 231, some embodiments of the editing modules 232 create, delete, and/or modify data structures representing the various clips in the composite presentation, as described below by reference to FIG. 11.

Output engine 234 processes data from the editing modules 232 and data storages 224 in order to output a composite presentation. The output engine 234 sends the output information about the composite presentation to the convergence module 236, rendering module 238 and/or preview generator 240 for output to various different destinations. In some embodiments, the output engine 234 also communicates with the timecode counter 222 to insert timecode information into a composite presentation as necessary.

Convergence module 236 communicates with the output engine 234 to format data for display on a convergence display 242. The convergence module 236 of some embodiments formats the primary and secondary 3D video clips for concurrent or converged display to the convergence module 236 for real-time 3D viewing of the 3D content being edited.

Convergence display 242 displays the converged primary and secondary 3D video clips together in 3D during editing. In some embodiments, the converged primary and secondary 3D video clips are displayed in real time, as the application user edits them. In some embodiments, the converged primary and secondary 3D video clips are not displayed in real time.

The export module 237 of some embodiments creates a cross-platform project file using the project data 231 (e.g., an XML file). This file enables the data defining the composite presentation (e.g., a set of clips that make up the composite presentation, where in the timeline of the composite presentation those clips reside, etc.) to be read by other applications (e.g., other video editing applications, color grading applications, etc.). In some embodiments, associations between primary and secondary 3D video clips are also stored in the exported file. The exported project file can be stored in a file system 244.

Rendering module 238 enables the storage or output of audio and video from the 3D video editing application. Rendering module 238 receives data from the editing module 232 and, in some embodiments, creates a composite media presentation from individual media clips. The composite media presentation can be stored or sent to any file system 244 or other output. The rendering module 238 of some embodiments creates two separate file system writable files, one for the primary 3D video clip and another for the secondary 3D video clip. In some embodiments, the rendering module bundles the separate files together.

File system 244 is used to store the rendered 3D video from the rendering module 238. The file system 244 of some embodiments is external to the 3D video editing application in some embodiments. In some embodiments, the file system 244 is part of the data storages 224.

Preview generator 240 enables the output of audio and video from the 3D video editing application so that a user can preview the composite presentation based on information from the editing module 232. In some embodiments, the preview generator 240 generates two previews, one for a primary track of the composite presentation and one for a secondary track of the composite presentation. The preview generator provides these previews to the UI module 246 for incorporation into the user interface of the 3D video editing application. UI module 246 provides an interactive interface for the application user via input devices (not shown). The input devices, such as cursor controllers (mouse, tablet, touchpad, etc.) and keyboards, send signals to a cursor controller driver and keyboard driver, which translate those signals into user input data that is provided to the UI module 246. Alternatively or conjunctively, some embodiments include a touchscreen that sends signals to the UI module 246. The UI module interprets the user input data and passes it to various modules, including editing modules 232.

The UI module 246 also translates information for display on display areas 248. The UI module uses information from the data storage 224 (e.g., the project data) to generate the UI for the video editing application. Some information received from the input devices that modifies the user interface without affecting the composite presentation is used only within the UI module 246 in some embodiments.

The display areas 248 display the user interface of the video editing application as generated by the UI module 246. In some embodiments, the convergence display 237 is one of the display areas 248. In some embodiments, one or more of the display areas 248 is a touchscreen that also serves as an input device.

The operation of the 3D video system architecture will now be described. The 3D video editing application initially imports multimedia clips for editing from the media sources 202, which can include the 3D video sources 210, audio sources 212 and non-3D video sources 214. The clips may be imported automatically upon connection of the media sources or in response to user selection of an import command.

To create the 3D video clips, 3D camera(s) record two separate video clips of the same scene simultaneously from different positions. The two separate video clips are referred to as the primary and secondary 3D video clips. The primary and secondary 3D video clips each correspond to one of the viewer's eyes in some embodiments. Although both clips are played simultaneously during viewing, each eye sees only one of the 3D video clips due to an optical filter such as 3D glasses.

Audio clips are in some embodiments recorded by an audio recording device separately from the 3D and non-3D cameras. In other embodiments, the audio recording device is part of the 3D and/or non-3D cameras. Each scene in some embodiments includes one or more audio clips corresponding to the primary and secondary 3D video clips described previously. For non-3D video clips, non-3D cameras record a separate video clip for a scene that is filmed in some embodiments. These cameras do not have primary and secondary video clips.

During import, the interface manager 216 communicates with the media sources 210 to import the multimedia clips and forward those selected for import to the A/V capture module 218. The A/V capture module 218 stores non-3D video clips 226 and audio clips 228 to the storage devices 224 and forwards 3D video clips to the timecode locking module 220. The timecode locking module 220 associates the primary and secondary 3D video clips together using the timecode counter 222 as necessary, and stores the associated primary and secondary clips in 3D video clips storage 230.

During editing, the editing modules 232 receive user edits from the UI module 246 and apply them to the 3D video clips 230, non-3D video clips 226 and audio clips 228 to create the composite media presentation. Generally, the editing modules 232 apply effects affecting the timeline of the composite media presentation to both the primary and secondary 3D video clips. The editing modules 232 apply effects not affecting the timeline optionally to both the primary and secondary clips. Editing operations to the video clips in the composite presentation with primary and secondary tracks are described in more detail in the discussion of FIG. 12.

The composite presentation may be exported in response to a user command. In some embodiments, the output engine 234 may compress the media presentation for output. The output engine 234 compresses any 3D video clips 230, non-3D video clips 226 and audio clips 228 using a selected compression scheme prior to outputting the video. Otherwise, the output engine 234 accesses the 3D video clips 230, non-3D video clips 226 and audio clips 228 from the data storages 224 and prepares them for export to a convergence display 242, a file system 244, or any other output.

For exporting the composite presentation to the file system 244, the output engine 234 sends the multimedia clips that make up the composite presentation to the rendering module 238. The rendering module 238 may export the clips as a single file or a single video stream. In some embodiments the rendering module 238 exports the primary and secondary tracks of the composite presentation as separate files and/or streams.

For export to the convergence display 242, the output engine 234 sends the multimedia clips to the convergence module 235, which prepares the primary and secondary 3D video clips for simultaneous display in real time or near real time in some embodiments. The convergence display 242 is a 3D capable display that can show the combined primary and secondary 3D video clips as they appear during playback.

II. Importing & Timecode Locking 3D Video Clips

Figure 3:
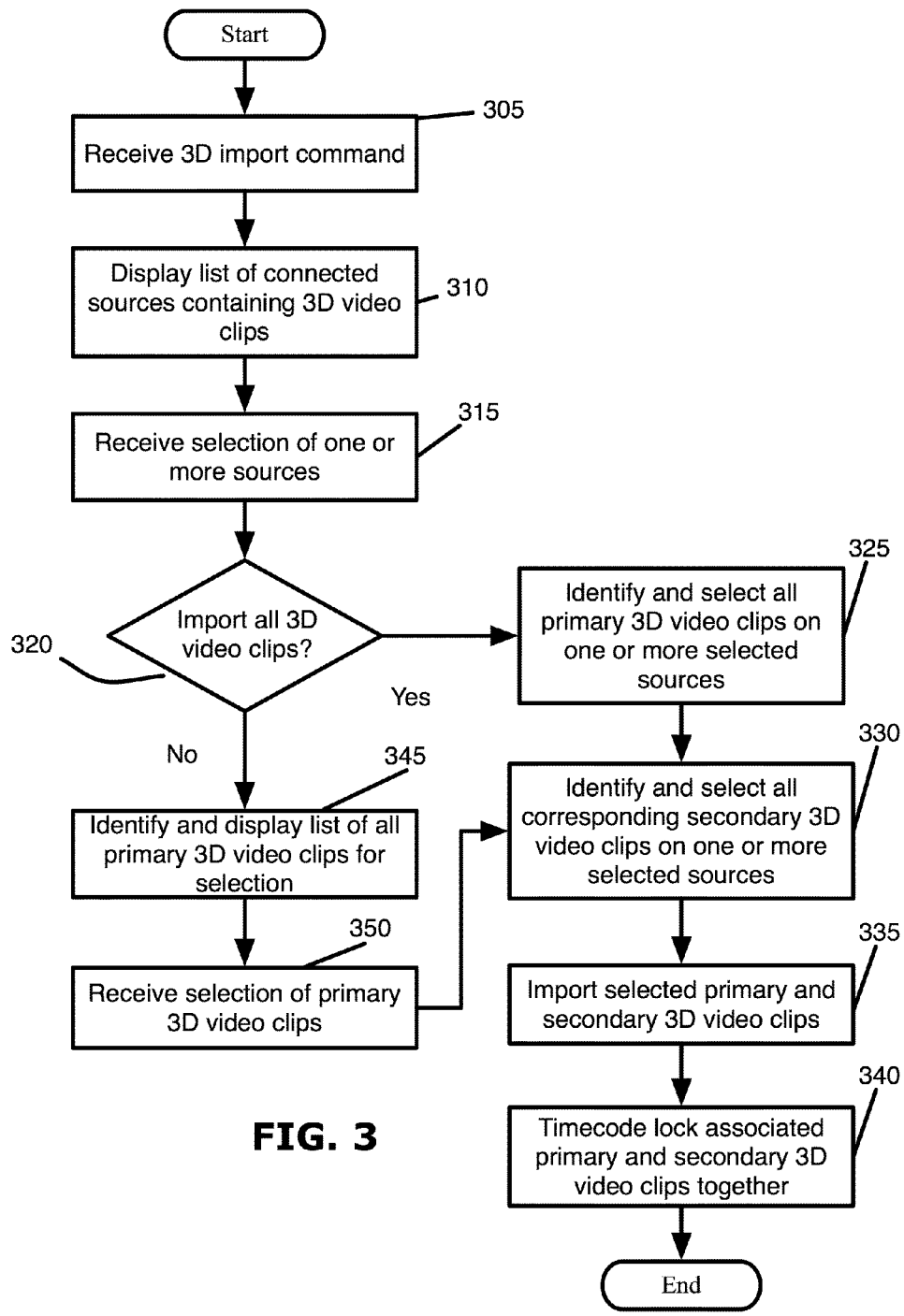
FIG. 3 conceptually illustrates a process of some embodiments for importing and timecode locking 3D video clips.

As described previously, some embodiments of the 3D video editing application timecode lock related primary and secondary 3D video clips as the clips are imported. FIG. 3 conceptually illustrates a process 300 of some embodiments for importing and timecode locking 3D video clips. Process 300 will be described with reference to FIGS. 4 and 6, which illustrate a graphical user interface ("GUI") of the media editing application of some embodiments and FIGS. 8-9, which illustrate data structures of some embodiments for storing media clips. In some embodiments, at least a portion of process 300 is performed by timecode locking module 220.

As shown, the process 300 begins by receiving (at 305) a 3D import command. In some embodiments, the 3D import command is received from a user interaction with the application. The 3D import command may also be initiated programmatically in some embodiments, when 3D video sources are connected to a 3D video editing system.

Next, the process 300 displays (at 310) a list of connected sources containing 3D video clips, such as the sources 202. The connected sources include one or more devices directly attached to the hardware running the application, or connected through a network. The sources include cameras, any type of storage, or any other device having multimedia clips. In some embodiments, the connected sources are 3D video cameras. Some embodiments display any accessible device for selection, whether or not the device stores 3D video clips. The connected sources may include a variety of multimedia file types, such as audio and non-3D video clips.

Figure 4:
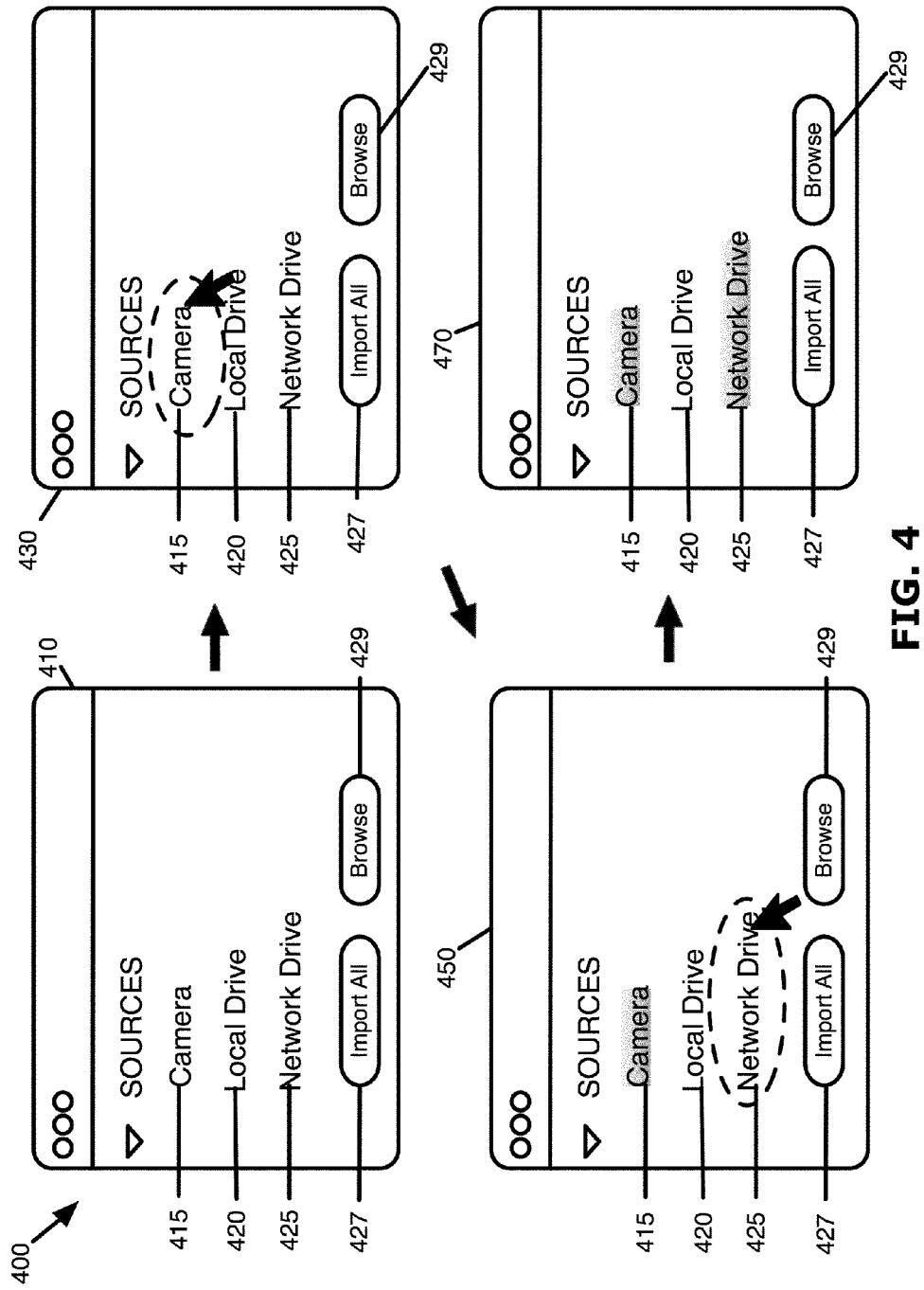
FIG. 4 illustrates a GUI of a media editing application of some embodiments that displays a list of sources containing 3D video clips for user selection.

FIG. 4 illustrates a GUI 400 of a media editing application of some embodiments. The GUI 400 displays a list of sources containing 3D video clips for user selection. Specifically, FIG. 4 illustrates the GUI 400 at four different stages. A first stage 410 displays a list of connected sources, a second stage 430 shows user selection of a first device, a third stage 450 shows user selection of another device, and a fourth stage 470 shows the GUI after the user selection of devices. The GUI 400 displays three connected sources: a camera 415, a local drive 420 and a network drive 425, though additional devices of different types may be recognized and displayed as well by some embodiments. The camera 415 may represent one or more 3D or non-3D video camera(s). The local and network drives 420 and 425 may be hard drives, solid state drives or any other types of media.

The process 300 next receives (at 315) a selection of one or more sources from the user. FIG. 4 illustrates this selection process through the four stages mentioned previously. Specifically, the second stage 430 and third stage 450 show the user selecting the camera 415 and the network drive 425 as the sources (e.g., by clicking on the source using a cursor controller, tapping the source on a touchscreen, etc.). The fourth stage 470 shows the camera 415 and network drive 425 as selected.

Next, the process 300 determines (at 320) whether to import all 3D video clips from the selected source(s). In some embodiments, an import all button 427, or similar GUI item, allows a user to import all of the 3D video clips from a selected source 415. In some embodiments, a browse button 429, or similar GUI item, displays a file browsing GUI, which displays a list of files for selective importing.

Figure 5:
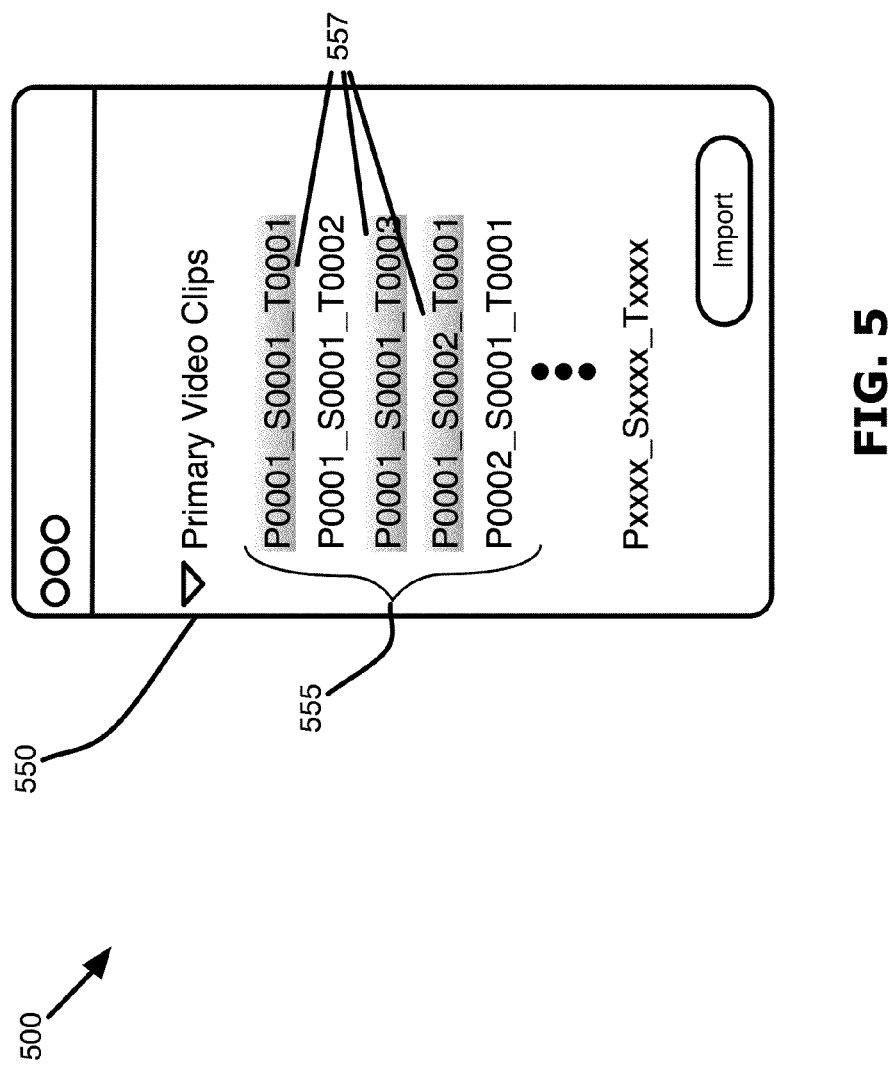
FIG. 5 illustrates a file browsing GUI that lists only the primary 3D video clips in some embodiments.

FIG. 5 illustrates such a file browsing GUI 550 of some embodiments that lists only the primary 3D video clips. The file browsing GUI 550 may list all of the files on a selected source (e.g., camera 415), or may be restrictive. The GUI may display only the multimedia files, only video files, only 3D video files, or even only primary 3D video files.

In some embodiments, the browsing GUI 550 displays all of the multimedia files on the selected source. In some embodiments, the browsing GUI 550 displays all of the video files on the selected source, whether 3D or not. The application user can select one or more files displayed in the browsing GUI 550 for importing. In the example shown in FIG. 5, only selected files 557 will be imported. The GUIs and buttons shown in FIG. 5 are for illustrative purposes; other GUIs and button combinations can implement the display of connected sources containing 3D video clips for user selection.

Figure 6:
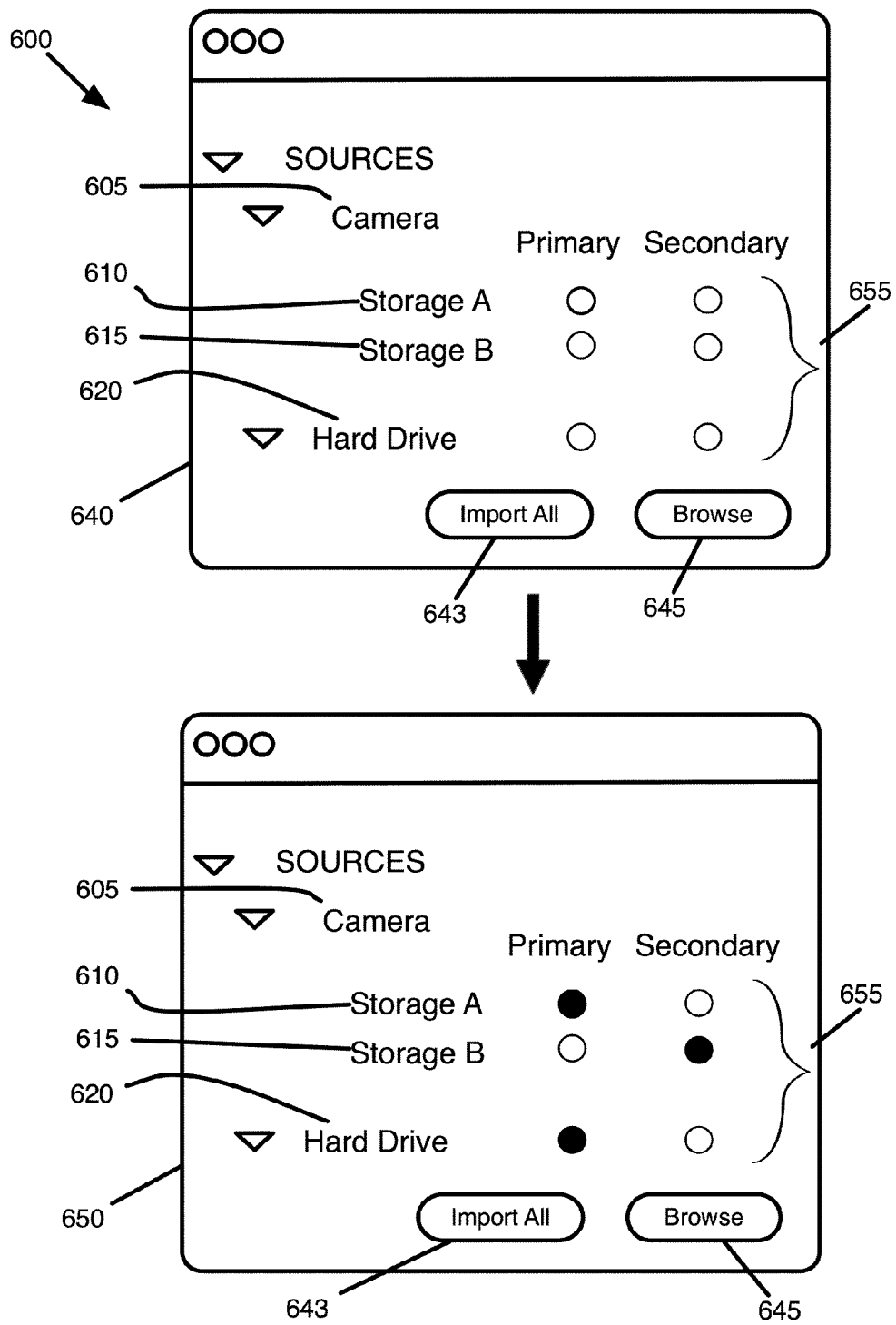
FIG. 6 illustrates a GUI of some embodiments that allows the user to explicitly identify the primary and secondary sources.

In some embodiments, the user can explicitly specify the primary and secondary sources. FIG. 6 illustrates a GUI 600 of some embodiments that allows the user to explicitly identify the primary and secondary sources. FIG. 6 illustrates the GUI 600 in two different stages. In a first stage 640, the user has not identified the primary and secondary sources. In a second stage 650, the user has identified the primary and secondary storages.

The devices represented as options in GUI 600 include a hard drive 620 and a 3D video camera 605 with two storage elements, storage A 610 and storage B 615. The user can identify primary and secondary clip sources by selecting the appropriate buttons 655 or similar GUI item(s). In stage 650, the user has specified storage A 610 and hard drive 620 as the location for the primary 3D video clips, and storage B 615 as the location for the secondary 3D video clips. In some embodiments, all of the devices do not need primary or secondary designations. For example, the user may want to only import clips from certain sources, or some sources may not hold any 3D video clips.

In some embodiments, an import all button 743 or similar GUI item allows a user to import all of the 3D video clips from the selected primary and secondary storages 610 and 615. In some embodiments, a browse button 625 or similar GUI item displays a file browsing GUI such as 550. A file browsing GUI 550 displays a list of files on the storage designated as the primary source by the user as described previously. The GUIs and buttons shown in FIG. 6 are for illustrative purposes; other GUIs and button combinations can implement the display of connected sources containing 3D video clips for user selection.

When all 3D video clips are being imported, the process identifies and selects (at 325) all primary 3D video clips on one or more of the selected sources. In some embodiments, the video editing application relies on user identification of primary and secondary sources to determine which clips are primary and secondary 3D video clips. All of the files on a selected primary video source will be identified as primary 3D video clips in some embodiments. However, in some embodiments, the process 300 identifies primary 3D video clips by examining the metadata for the video clips on the selected source(s). Metadata in some embodiments is information about a file, and contains one or more fields that store data regarding the file.

On the other hand, when not all of the 3D video clips are being imported, the process 300 identifies and displays (at 345) a list of all primary 3D video clips for selection. As described above, the process may identify the primary 3D video clips by either examining the metadata or relying on user identification of the sources. The process then receives (at 350) selection of primary 3D video clips to import.

Figure 7:
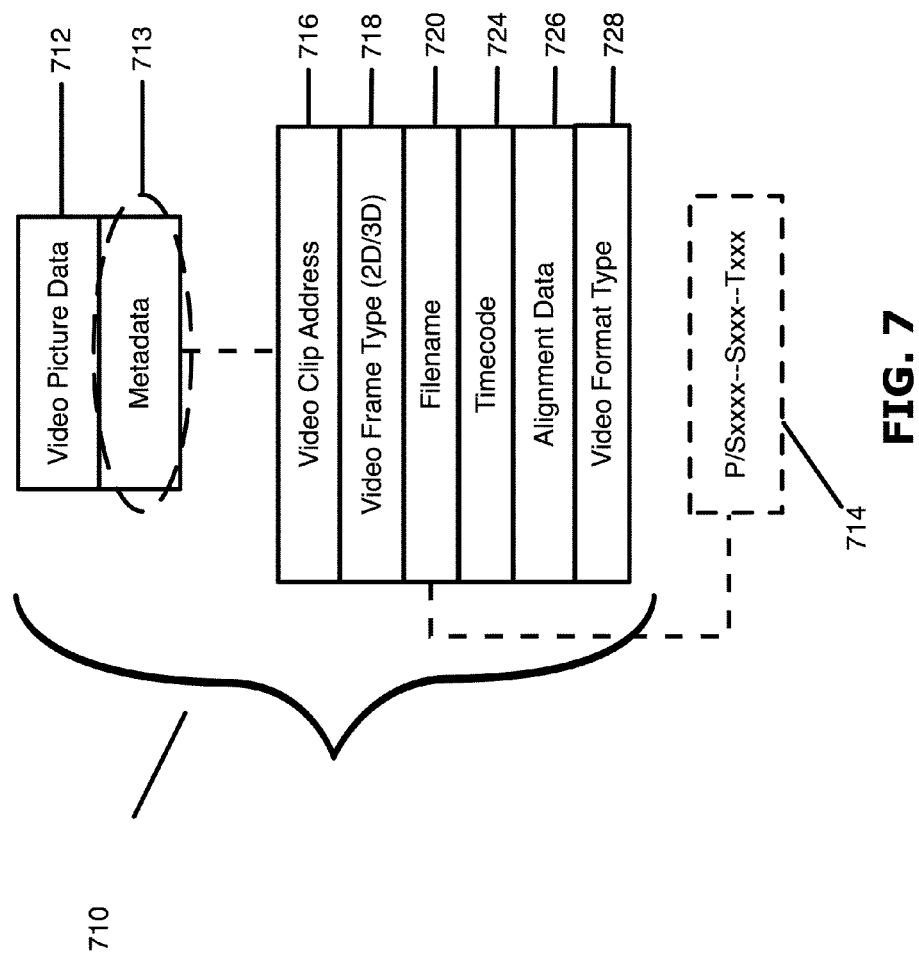
FIG. 7 conceptually illustrates a data structure of some embodiments for a video clip received from a video source.

FIG. 7 conceptually illustrates a data structure of some embodiments for a video clip received from a video source. The data structure 710 includes metadata used by the media-editing application to distinguish primary from secondary 3D video clips. As shown, the metadata may also include other information not specifically used to distinguish between primary and secondary 3D video clips.

The data structure 710 includes picture data 712 and metadata 713 in some embodiments. The metadata 713 includes video clip address 716, video frame type 718, timecode 724, alignment data 726 and video format type 728 in some embodiments. The video picture data 712 stores the actual video clip itself, while the metadata 713 includes information about the clip. This metadata information includes a video clip address 716, which identifies a location of the video clip on the source of the video clip. The video frame type 718 metadata of some embodiments identifies the clip as either 2D or 3D, which determines whether the video clip will be timecode locked. The timecode information 724 will often include start and end timecodes for the video clip. In some embodiments, each video picture (e.g., frame, field) of the video clip has a timecode, often formatted in hour:minute:second:frame format. The alignment data 726 contains positional information about the video clip. The video format type data 728 indicates information about the type of video file.

In some embodiments, the media editing application uses the filename 720 to identify primary 3D video clips. In some cases, a naming convention for the filenames distinguishes primary and secondary video clips. Some embodiments use a naming convention such as "P/Sxxxx-Sxxx-Txxx" to identify whether the 3D video clip is a primary or secondary clip. In the example file naming convention, all primary 3D video clips begin with the letter "P", and all secondary 3D video clips begin with the letter "S". Each "x" can be any character, including letters and numbers. In some embodiments, the Sxxx represents the scene number, and Txxx the take number. Two related 3D video clips will have the same filename other than the "P" and "S" designators. Other file naming conventions may also be used to distinguish primary from secondary clips while identifying corresponding clips.

In some embodiments, the naming convention is specified on the video recording device before recording. For example, a primary camera that will record the primary video clips for the primary track may be configured prior to filming to use "Pxxxx" in the filename of all of its clips, which will be primary. A secondary camera for recording the secondary video clips for the secondary track may be configured to use "Sxxxx" in the filename of its clips. The user (e.g., the director, cameraman, etc.) specifies the scene and take number before filming the take, and these are appended to the filename of each of the cameras.

Next, the process 300 identifies and selects (at 330) all corresponding secondary 3D video clips on one or more selected sources. That is, for each primary video clip selected for import, some embodiments identify a corresponding secondary video clip to import. In some embodiments, the video editing application compares certain metadata fields of each selected primary 3D video clips with the metadata fields of each file on the selected secondary source(s).

Some embodiments use filenames to match primary and secondary 3D video clips. The media editing application identifies a corresponding secondary 3D video clip for a primary 3D video clip by comparing the filename of the primary 3D video clip with each file on the selected source(s).

In some embodiments, the naming convention of the primary and secondary clips is the same: part of the filename designates whether the file is primary or secondary, and the remaining portion of the filename is identical for the primary and secondary clip. For example, a primary filename using the naming convention of "P/S-Sxxx-Txxx" may have a filename "P-S001-T003". The "P" in this example designates the file as a primary video clip. The corresponding secondary filename would be "S-S001-T003" in this example, with the "S" designating the file as a secondary video clip. The rest of the filename designates the video clip as the third take for Scene 1.

In some embodiments, the process 300 uses the timecode information 724 to match primary and secondary 3D video clips. Video cameras use timecode to indicate relative order of recordings from the camera, and two video cameras may use a synchronized timecode, such that simultaneous recordings of the same scene with the synchronized cameras will have the same timecode. If the timecode information of a primary clip and a secondary clip is the same (i.e., the start and end timecodes are the same), then the two video clips are assumed to be corresponding in some embodiments.

The process 300 next imports (at 340) the selected primary and secondary 3D video clips. In some embodiments, the files are imported from the media source(s) into the a data storage associated with the video editing application. Once the video clips are in the data storage, a user of the video editing application can use the video clips to create a composite media presentation.

Figure 8:
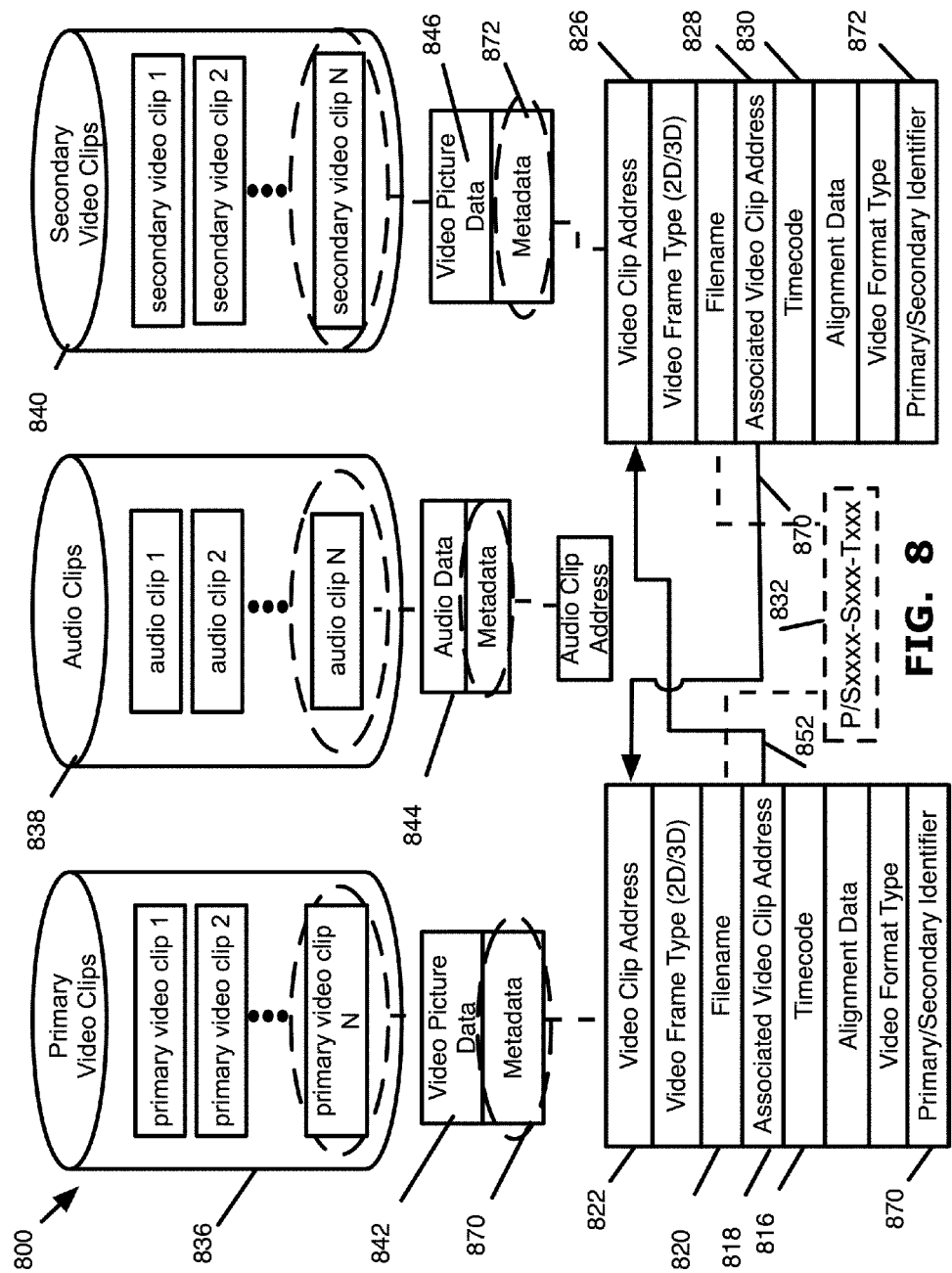
FIG. 8 illustrates timecode locked primary and secondary 3D video clips associated by filename and stored in a storage.

Next, the process 300 timecode locks (at 345) related primary and secondary 3D video clips together, then ends. FIG. 8 illustrates timecode locked primary and secondary 3D video clips associated by filename 832 and stored in a storage such as storage 224. FIG. 8 shows primary and secondary 3D video clips having video picture data 842 and 846 and metadata 870 and 872. For illustrative purposes, the primary and secondary 3D video clips and audio clips are shown as being stored separately in data storages 836, 838, and 840. As described previously, they may reside on the same physical storage.

Many of the metadata fields for metadata 870 and 872 were described previously under the discussion of FIG. 7 and are not further elaborated upon here, except those fields that are related to timecode locking Timecode locking in some embodiments involves associating related primary and secondary 3D video files together, and maintaining the association during editing, particularly when the edit affects the timeline of a composite presentation of which the timecode locked video clips are a part. The video editing application can associate, or timecode lock, primary and secondary 3D video clips 836 and 842 in several ways. In some embodiments, each video clip stores the address of its associated corresponding clip in its own metadata. For example, the illustrated primary 3D video clip stores the video clip address 826 of the secondary 3D video clip in its associated video clip address metadata field 818. In some embodiments, this reference is stored as a pointer to the video clip address of 826. FIG. 8 illustrates this link through the arrow 852, which connects the associated video clip address 818 of the primary 3D video clip to the video clip address 826 of the secondary 3D video clip. As shown, the associated video clip address field 828 of the secondary 3D video clip also has a reference to the video clip address 822 of the primary video clip. FIG. 8 illustrates this link through arrow 850. In some embodiments, both references 852 and 850 are used, so that the files reference each other. In some embodiments, rather than referencing memory addresses of the corresponding video clips, a primary clip simply stores a filename of a corresponding secondary clip, and vice versa.

Figure 9:
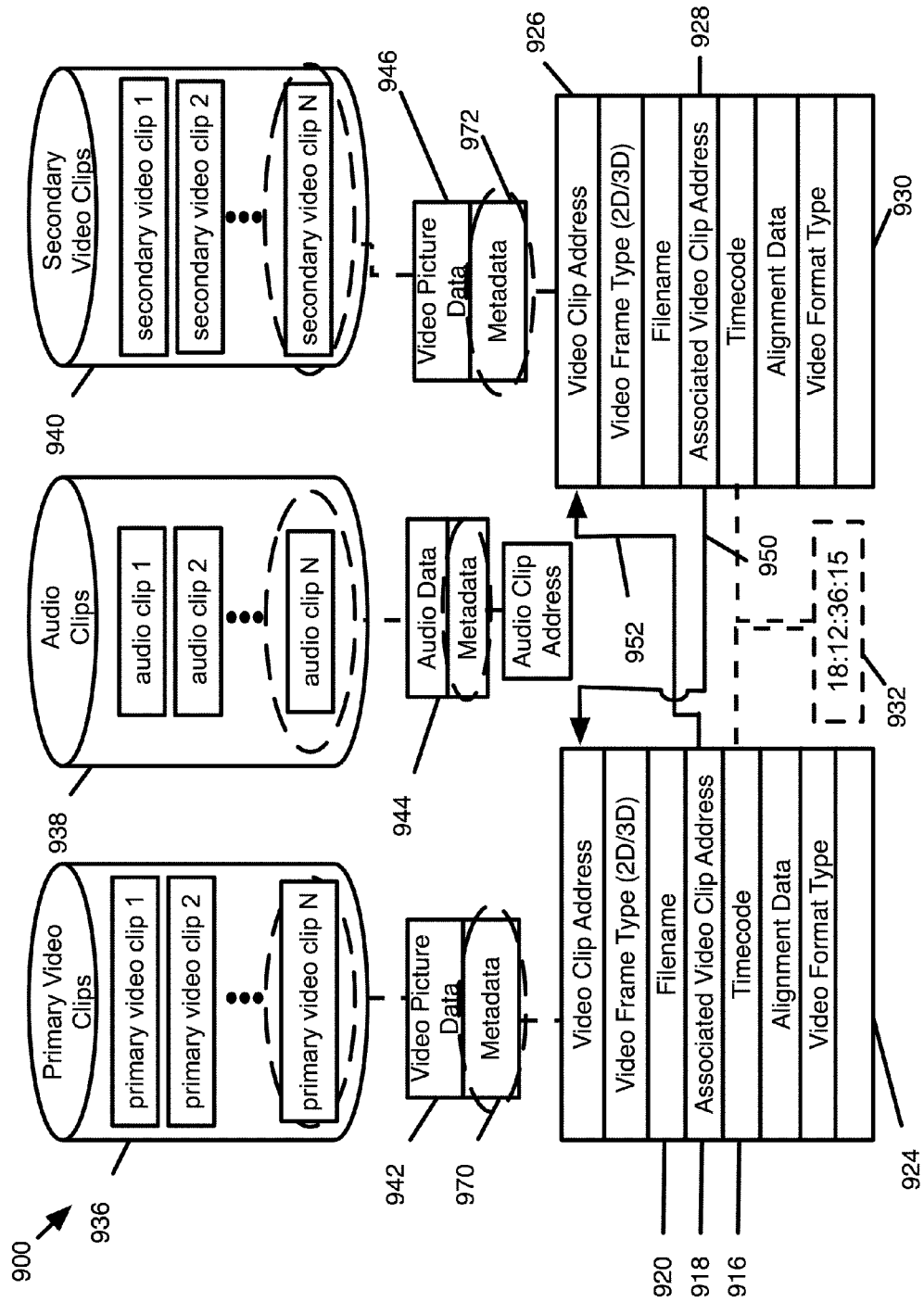
FIG. 9 illustrates timecode locked primary and secondary 3D video clips associated by timecode and stored in a storage.

FIG. 9 illustrates timecode locked primary and secondary 3D video clips associated by timecode 932 and stored in a storage such as storage 224. FIG. 9 shows primary and secondary 3D video clips having video picture data 942 and 946 and metadata 970 and 972. For illustrative purposes, the primary and secondary 3D video clips and audio clips are shown as being stored separately in data storages 936, 938, and 940. As described previously, they may reside on the same physical storage.

As described above, the timecode 932 is metadata appended to the video clip by the device (e.g., camera) that captures the video in some embodiments. The timecode indicates a relative order of the video recorded by the device. That is, a first video clip recorded before a second video clip will generally have an earlier timecode than the second video clip, although timecode will reset to zero after a particular length of total recording (e.g., 24 hours) in some cases. The timecode is appended to each video picture (e.g., frame or field) of a video clip in some embodiments, and specifies hour:minute:second:frame. As shown, the primary video picture data 942 has metadata 970 with timecode "18:12:36:15" (e.g., the starting timecode of the primary video clip). Correspondingly, the secondary video picture data 946 has metadata 972 with the same timecode "18:12:36:15". In some embodiments, the media editing application matches the timecode of the primary and secondary 3D video clips (e.g., by looking at start and end timecodes) and associates clips with matching timecodes.

Once the corresponding primary and secondary video clips are determined by using the timecode, the pairs are associated with each other. As mentioned above with respect to FIG. 8, some embodiments associate two clips using pointer references (e.g., the references 952 and 950). A metadata field of the associated primary video clip contains a pointer reference 952 to the video clip address 926 of its associated secondary video clip. A metadata field of associated secondary video clip 950 can similarly contain a pointer reference to the video clip address of its associated primary clip in some embodiments.

The pointer references 952 and 950 (and 852 and 850) are conceptual illustrations of how the primary and secondary video clips may be associated. Clips may be associated using other techniques as well. For example, some embodiments just store a filename of an associated clip. Some embodiments do not store any associations with the video clip itself. Instead, the video editing application stores a list of all primary 3D video clips and secondary 3D video clips with associations between the 3D video clips. When performing an edit operation on a clip, this list is referenced by the video editing application to determine whether a corresponding clip exists, and if so, the information for the corresponding clip.

FIGS. 8 and 9 illustrate that the primary and secondary video clips stored by the 3D video editing application are associated. In addition, some embodiments also associate the audio clips stored in storage 838 with corresponding video clips. When the video clips are filmed, one or more audio clips may also be recorded with synchronized timecodes. In addition, some embodiments store the audio clips with filenames, e.g. "A1xxxx-Sxxx-Txxx". Using either the filenames or the timecodes, or a combination thereof, the audio clips can be associated with the video clips.

In addition to association video clips based on a matching filename or timecode, some embodiments use other processes, such as looking at duration or receiving association information manually. For example, in some embodiments a user will select a primary 3D video clip and then its corresponding secondary 3D video clip so that the video editing application can associate the two 3D video clips.

III. Media Editing Application Graphical User Interface

Once the 3D video clips (and any other media clips) are imported and associated, the clips can be used to create a composite presentation. In some embodiments, the composite presentation is created through a user interface of the video editing application by which a user adds clips to the composite presentation by dragging representations of the clips from a media library to tracks in a composite display area.

Figure 10:
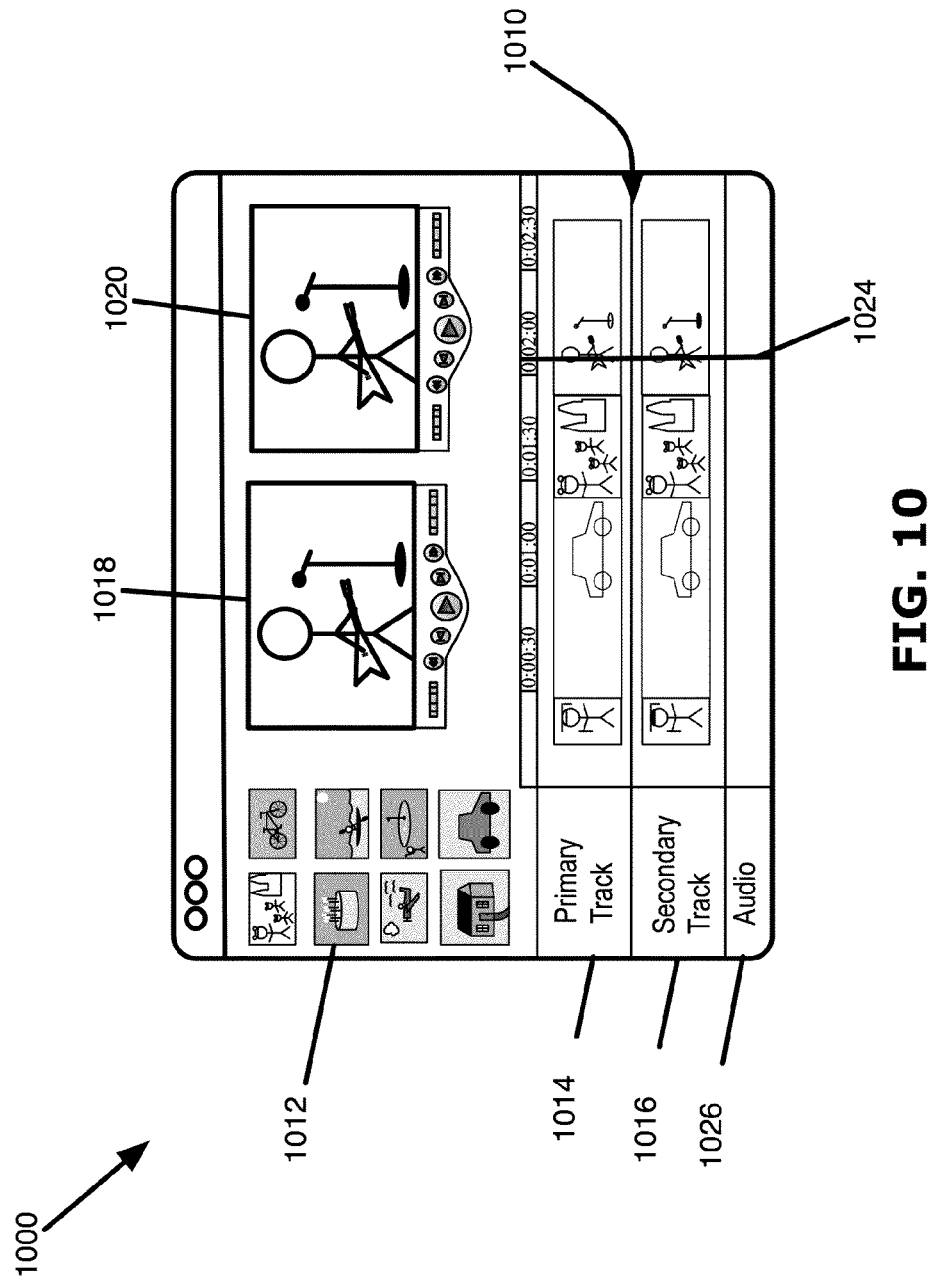
FIG. 10 illustrates an example of a GUI for a media editing application for some embodiments.

FIG. 10 illustrates an example of such a GUI 1000 for a media editing application for some embodiments, though other GUI configurations may be used to implement the same or similar functionality. GUI 1000 includes a multimedia clip library 1012, a composite display area 1010 with primary track 1014 and secondary track 1016, a primary preview display area 1018, a secondary preview display area 1020, an audio track 1026 and a playhead 1024.

The multimedia clip library 1012 includes graphical representations (e.g., thumbnails) of one or more multimedia clips stored in a data storage accessible by the media editing application. In some embodiments, the multimedia clips can be any type of multimedia file including video, audio and still pictures. In some embodiments, the multimedia clips include 3D video clips. The graphical representation of the media clips may indicate the type of clip in some embodiments (e.g., through text, graphics, etc.).

In some embodiments, the clips displayed in the multimedia library are all multimedia clips in the data storages of a device on which the media editing application operates. In other embodiments, only clips in folders selected by a user are displayed in the multimedia library 1012. In addition, some embodiments allow a user to organize the multimedia library into bins, such that clips that are expected to be used in a similar portion of a composite presentation can be grouped together irrespective of their location in storage.

The composite display area 1010 provides a visual representation of the composite presentation being created by the user. Specifically, it displays one or more geometric shapes that represent one or more media clips that are part of the composite presentation. The composite display area 1010 is an area that includes multiple tracks that span a timeline 1025. One or more media clips can be placed on each track. In some embodiments, no two clips can overlap on the same track. In the example GUI shown in FIG. 10, the composite display area includes a primary track 1014, a secondary track 1016, and an audio track 1026. In order to create the composite presentation, a user can select a representation of a media clip in the multimedia library 1012 and add the clip to the composite display area 1014 (e.g., through a drag-and-drop operation or a menu selection operation).

In the 3D video editing application, the primary track 1014 represents a sequence of primary video clips and the secondary track 1016 represents a sequence of secondary video clips. Unlike 2D video, in which only one track can be played at once, in 3D video both the primary and secondary tracks are played stereoscopically to create the 3D effect. A user can alter the primary track by inserting primary 3D video clips into the track, deleting primary 3D video clips from the track, moving 3D video clips within the track, etc. Similar edits can be applied to the secondary video clips in the secondary track.

In some embodiments, the secondary track 1016 cannot be altered directly and is locked for certain types of edits. For example, edits affecting the timeline can only be applied directly to the primary track 1014 in some embodiments. The timeline-affecting edits are then automatically applied to the secondary track 1016. Other edits, such as special effects or alignment control, can be made directly to either track and can be optionally applied to the other track. In some embodiments, the secondary track 1016 is not locked, and timeline-affecting edits can be made directly to the secondary track 1016. In such embodiments, the timeline-affecting edits made to the secondary track 1016 are automatically applied to the primary track 1014. These editing functions and their effects on the tracks will be described in detail below.

The audio track 1026 is a visual representation of the audio portion of the composite media presentation. Although only one audio track 1026 is shown, some embodiments can include multiple audio tracks. As with the video tracks 1014 and 1016, media (specifically, audio) can be added to the audio track from the multimedia library 1012. In some embodiments, when video is added to the video tracks of the composite display area, one or more corresponding audio tracks are automatically added to the audio tracks.

The playhead 1024 indicates a position along the timeline of the composite display area 1010. The playhead 1024 is often used to select an edit point for insertion of a clip into the timeline or other edit operation. In addition, the frame of video shown in the preview display areas 1018 and 1020 is at the frame at the point along the timeline in the composite display area 1010 at which the playhead is located. The playhead 1024 can be moved along the timeline to change the current editing/playback location. In some embodiments, the playhead can be moved frame by frame.

The primary display area 1018 displays the primary track video of the composite presentation. In some embodiments, the frame shown in the primary display area 1018 is the frame underneath the playhead (i.e., the frame at the same point in the timeline of the composite display area as the playhead. In some embodiments, edits (e.g., effects such as transitions or color corrections) to primary track clips can be visualized within the primary display area. Similarly, the secondary display area 1020 displays the secondary track video of the composite presentation. As the frame shown in the primary display area 1018 is that underneath the playhead in the primary track, the corresponding frame shown in the secondary display area 1020 is that underneath the playhead in the secondary track. When the two tracks include timecode-locked clips, the two frames will be corresponding versions of a scene from two different angles.

The secondary display area 1020 shows the current secondary display video. In some embodiments, edits not affecting the timeline can be made directly to this display area. For edits affecting the timeline, the secondary display area 1020 is locked and cannot be edited. Video clips loaded into the secondary track 1014 are displayed in the secondary display area 1020 based on the location of the playhead 1024. The current image or video shown is wherever the playhead 1024 is located along the secondary track 1014.

When 3D video clips are added to the tracks of the composite display area, some embodiments store data about these timeline clips separately from the data structures for the imported media clips (e.g., the data structures illustrated in FIGS. 8 and 9). Data structures for the timeline clips do not store the actual video data that is stored in the media clips in some embodiments, but instead store references to the media clips.

In some embodiments, when a primary 3D video clip is added to the primary track of a composite presentation, a corresponding secondary 3D video clip is also added to the secondary track. Some embodiments create linked data structures for these timeline clips.

Figure 11:
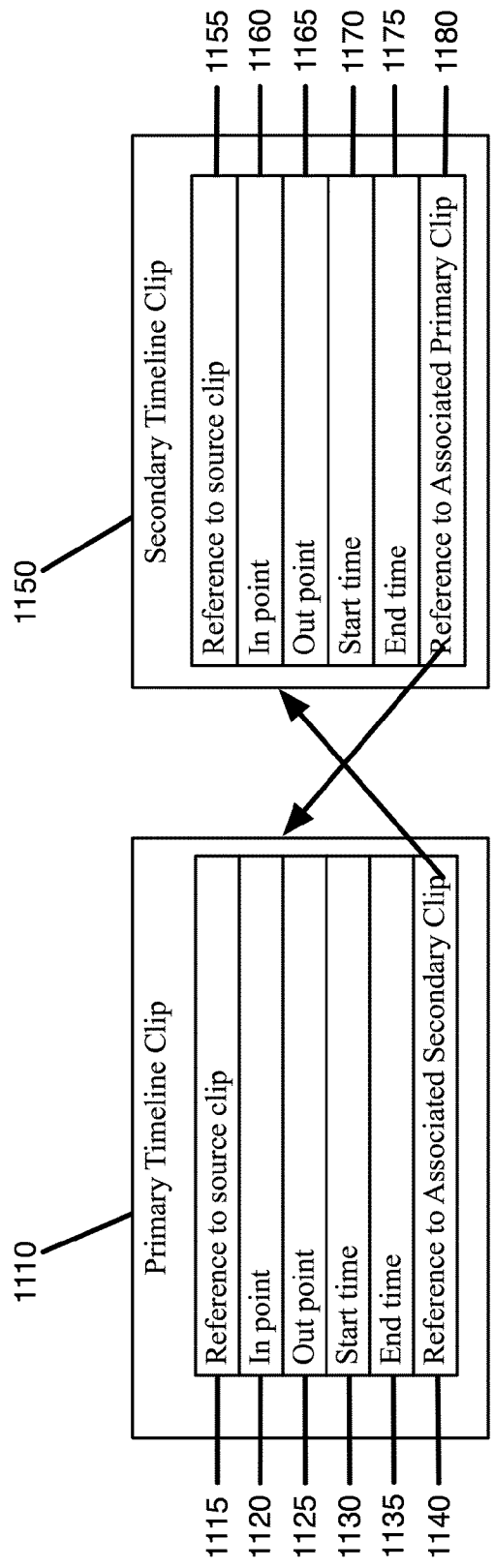
FIG. 11 illustrates a primary timeline clip and an associated secondary timeline clip.

FIG. 11 illustrates a primary timeline clip 1110 and an associated secondary timeline clip 1150. The primary timeline clip 1110 includes various data fields: a reference 1115 to a source clip, an in point 1120, an out point 1125, a start time 1130, an end time 1135, and a reference 1140 to an associated secondary clip. Similarly, the secondary timeline clip 1150 includes a reference 1155 to a source clip, an in point 1160, an out point 1165, a start time 1170, an end time 1175, and a reference 1180 to an associated primary clip.

The reference 1115 to a source clip is a reference to the media clip that stores the video data for the primary timeline clip. In some embodiments, this is the 3D video clip represented in the multimedia library that a user has dragged onto the primary video track. The in point 1120 and out point 1125 refer to the timecode of the referenced media clip. The in point 1120 is the timecode of the media clip at which the primary timeline clip 1110 starts and the out point 1125 is the timecode of the media clip at which the primary timeline clip 1110 ends. In some embodiments, when a clip is initially added to the primary video track, the whole clip is used such that the in and out points are the start and end timecodes of the media clip. Users can modify the in and out points of the timeline clips during the editing process (e.g., with trim edits, described below).

The start time 1130 and end time 1135 refer to the timeline of the composite video presentation of which the primary timeline clip is a part. Thus, a clip that starts one minute into the composite presentation will have a start time of 00:01:00. Because the duration of the primary timeline clip can be derived easily from the in and out points 1120 and 1125, some embodiments do not include any end time data. When a user moves a clip in the timeline, or performs an edit to another clip that causes a clip to move in the timeline, its in and out points are not changed. However, the start and end time of the clip are changed by such a move.

The reference to an associated secondary clip 1140 stores a reference to the secondary timeline clip 1150. As mentioned, when the primary timeline clip 1110 is created as source media is added to the timeline, its associated secondary clip 1150 is automatically created as well. The reference 1155 to the source clip in the secondary timeline clip 1150 will refer to a secondary 3D video clip that is associated with the primary 3D video clip referenced in field 1115.

The in and out points 1160 and 1165 and start and end times 1170 and 1175 stored in the secondary timeline clip 1150 will have the same values as their counterparts in the primary timeline clip 1110. In fact, some embodiments only include a reference 1155 to a source clip and a reference 1180 to the associated primary clip in a secondary timeline clip data structure.

Various editing operations may be performed within GUI 1000 to create and edit a composite presentation. Some of these edits, and specifically their application to editing 3D video, will now be described in the following Section.

IV. Applying Edits to Primary and Secondary Video Clips

As described above, some embodiments provide the capability to apply edits automatically to both primary and secondary video clips that form a composite presentation. In some embodiments, certain types of edits are always applied to both the primary and secondary video clips, while other types of edits are applied to either both primary and secondary video clips or only one of the two based on user specification. Specifically, some embodiments always apply edits that affect the timeline of the composite presentation (e.g., inserting, deleting, moving, trim the video clips, etc.) to both the primary and secondary video clips, while edits that do not affect the timeline (e.g., effects such as color correction, alignment control, etc.).

Figure 12:
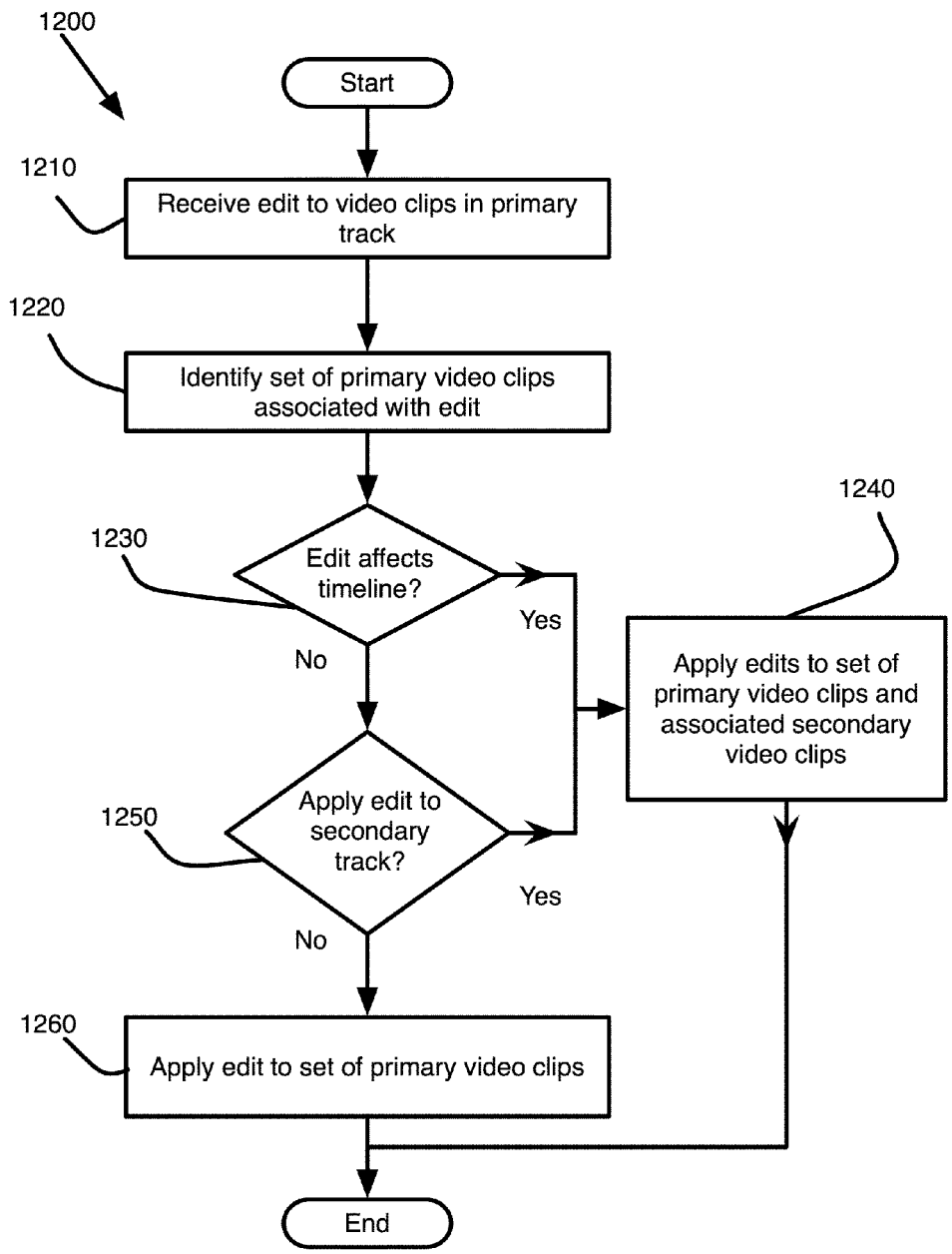
FIG. 12 conceptually illustrates a process of some embodiments for applying edits to 3D video clips in a composite presentation.

FIG. 12 conceptually illustrates a process 1200 of some embodiments for applying edits to 3D video clips in a composite presentation. In some embodiments, the process 1200 is performed by a media-editing application with the capability to edit composite presentations that include 3D video clips. As shown, the process 1200 begins by receiving (at 1210) an edit to one or more video clips in the primary track. In some embodiments, these video clips are received through user interaction with a user interface of the media editing application. The user may select one or more video clips and specify (e.g., through various user interface tools) a type of edit to apply to the selected video clips. The user interaction may be received from the user through an input device, such as a mouse or other cursor controller, a touchscreen, a keyboard, etc. The edits may include insertion of a video clip into the composite presentation, deletion of a clip from the composite presentation, movement of a clip in the composite presentation, adjustment of a trim boundary between video clips, application of color correction to at least one video picture of a video clip, application of alignment control to a video clip, etc.

Next, the process 1200 identifies (at 1220) a set of primary video clips associated with the edit. The set of primary video clips may include one or more 3D video clips. The set of primary video clips associated with the edit is determined by the user in some embodiments. Depending on the type of edit, the user may select a group of clips, a portion of one or more clips, a boundary between clips, a range along the timeline, etc. Based on this selection and the application of the edit, a set of clips affected by the edit can be determined.

The process then 1200 evaluates (at 1230) whether the edit affects the timeline of the composite presentation. In some embodiments, the timeline of the composite presentation refers to the sequence over time of the media clips that make up the composite presentation. Thus, edits that affect the sequence or the video clips or their duration will affect the timeline. Such edits include inserting, deleting, moving, or trim the video clips in some embodiments.

When the edit affects the timeline, the process 1200 applies (at 1240) the edits to the identified set of primary video clips and a set of secondary video clips associated with that set of primary video clips. In some embodiments, the secondary video clips associated with the set of primary video clips are the clips associated through data structures such as those shown in FIG. 11. That is, the clips have been inserted into the timeline together based on associations between their respective source media clips. For each primary video clip that is inserted, deleted, moved, etc. in the primary track, a corresponding secondary video clip is affected in the same manner in the secondary track. Thus, for example, if a user deletes a primary video clip from the composite presentation, the corresponding secondary video clip will also be deleted.

On the other hand, when the edit does not affect the timeline, the process 1200 determines (at 1250) whether to apply the edit to the secondary track. Examples of edits that do not affect the timeline include the application of special effects or alignment control. In some embodiments, when the user selects the edit, the media editing application prompts the user as to whether he wants the edit applied to the secondary track. Some embodiments enable the user to determine beforehand (e.g., through a checkbox, hotkey, etc.) whether the edit will be applied to one or both tracks.

When the edit is also to be applied to the secondary track, the process 1200 applies (at 1240) the edits to the identified set of primary video clips and the set of secondary video clips associated with that set of primary video clips. On the other hand, when the edit is not applied to the secondary track, the process 1200 applies (at 1260) the edit to the set of primary video clips only, without altering any secondary video clips. In some embodiments, certain edits (e.g., application of effects, alignment control, etc.) can be applied to only a set of secondary video clips without affecting any of the primary clips. After applying the edit to one or both sets of video clips, the process ends.

The following sub-section describe a variety of edits in greater detail. Subsection A describes several edits (insertion of a video clip, deletion of a video clip, movement of a video clip, and trimming) that are automatically applied to both the primary and secondary video tracks. Subsection B describes several edits (application of an effect, alignment control) that can be applied to either both tracks or only one track.

A. Edits Automatically Applied to Both Primary and Secondary Video Clips

As mentioned above, edits that affect the timeline of the composite presentation are automatically applied to clips on both the primary and secondary tracks. That is, when an edit is applied to a clip on one of the tracks, the edit is automatically applied to a corresponding clip on the other track. Examples of the application of such edits are described in the following sub -sections: (1) insertion of a 3D video clip, (2) deletion of a 3D video clip, (3) movement of a 3D video clip, and (4) trimming of a 3D video clip.

(1) Insertion

Figure 13:
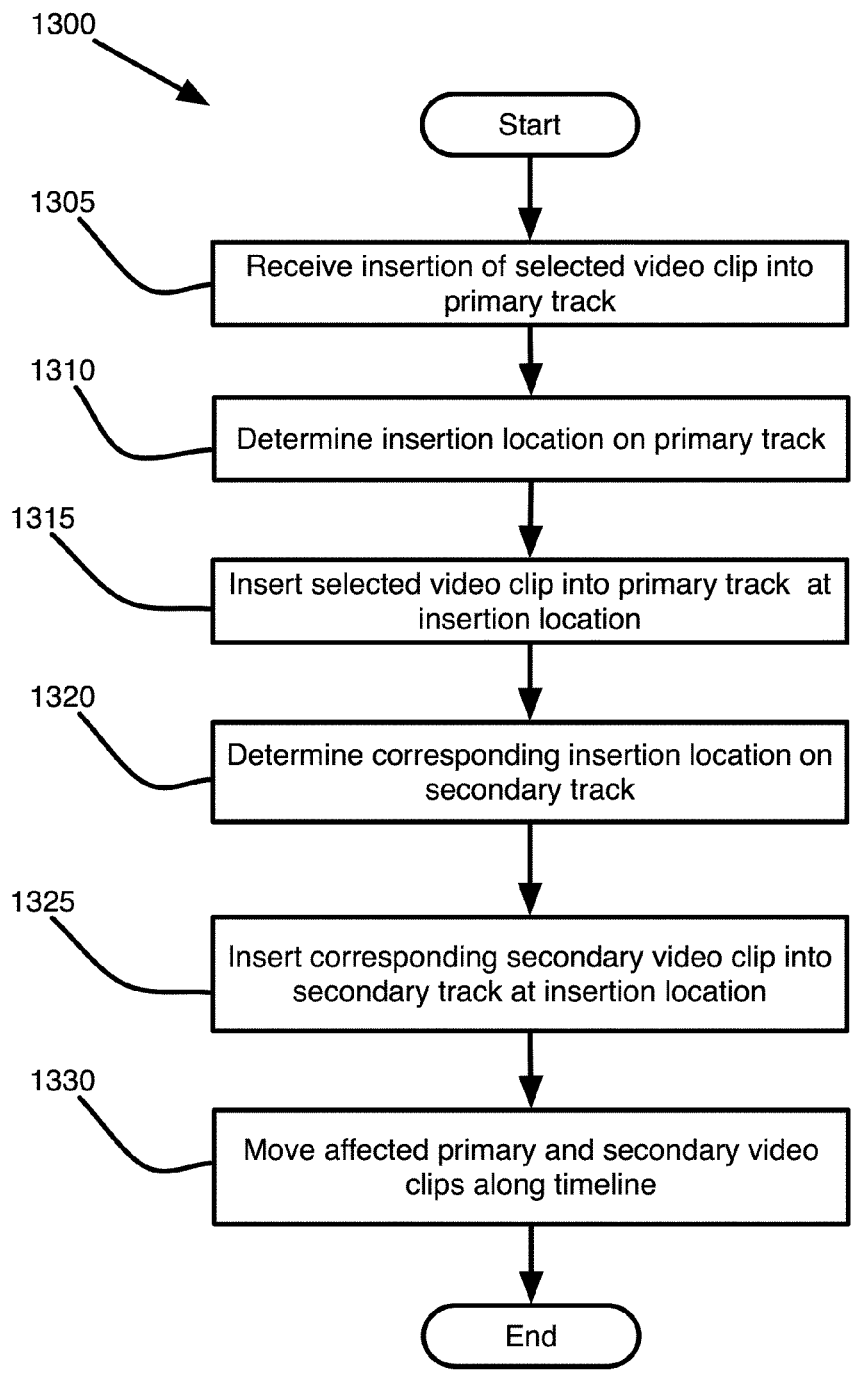
FIG. 13 conceptually illustrates a process for inserting a media clip into a primary track of a composite media presentation.

FIG. 13 conceptually illustrates a process 1300 for inserting a media clip into a primary track of a composite media presentation. Process 1300 will be described by reference to FIGS. 14 and 15.

Figure 14:
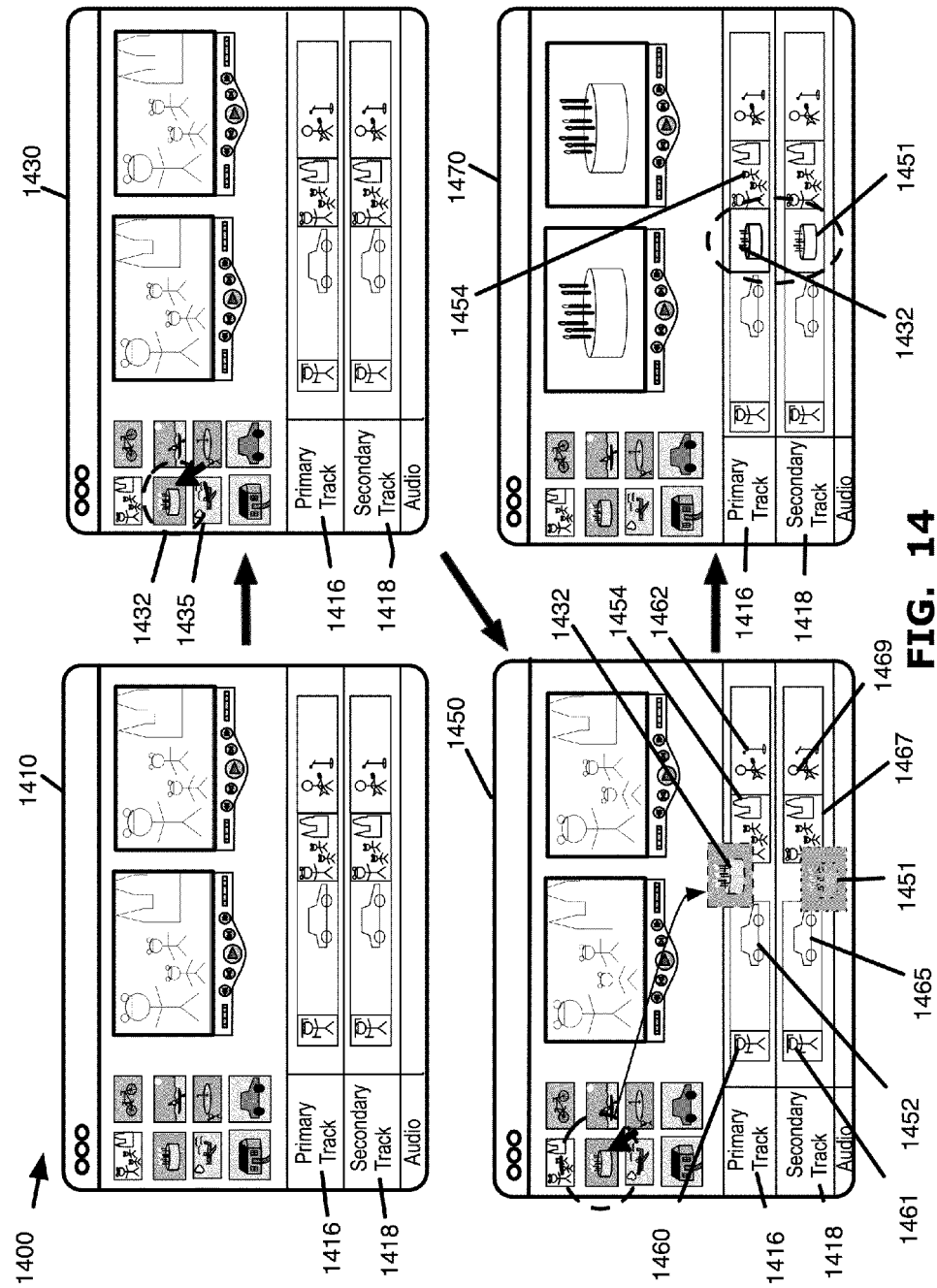
FIG. 14 illustrates an example of the insertion of a pair of corresponding 3D video clips into a composite presentation through the use of a GUI of a media editing application of some embodiments.

FIG. 14 illustrates an example of the insertion of a pair of corresponding 3D video clips into a composite presentation through the use of a GUI 1400 of a media editing application of some embodiments. Specifically, FIG. 14 illustrates the GUI 1400 at four different stages: a first stage 1410 at which a set of media clips have been edited to form a composite presentation, a second stage 1430 at which a user selects a video clip from a media library, a third stage 1450 at which the user drags and inserts the selected video clip between two other video clips in the primary track, and a fourth stage 1470 after the insertion of the selected video clip. As shown at stage 1410, the GUI 1400 includes a multimedia clip library 1435, a graphical representation of a composite presentation including primary track 1416 and secondary track 1418, a primary display area 1420, and secondary display area 1422, similar to the corresponding GUI elements described above by reference to FIG. 10.

As shown, the process 1300 begins by receiving (at 1305) an insertion of a selected video clip into the primary track of a composite presentation. In some embodiments, a user selects a video clip from the multimedia library and drags the video clip over the primary track. A user may also insert a video clip via keystrokes or other techniques in some embodiments.

Stage 1430 of FIG. 14 illustrates that a user has selected a video clip 1432 from multimedia library 1435 using a cursor (e.g., by placing the cursor over the video clip and clicking a mouse button or similar cursor controller selector, placing a finger over the video clip on a touchscreen, etc.). As shown in stage 1450, the user has dragged the selected video clip 1432 to a location in the graphical representation of the composite presentation between video clip 1452 and video clip 1454. In order to insert the video clip, in some embodiments the user drops the selected video clip (e.g., by releasing a cursor controller selector, removing a finger from a touchscreen, etc.).

Returning to FIG. 13, the process 1300 next determines (at 1310) the insertion location on the primary track. The insertion location may be defined in many ways. In some embodiments, the insertion location is defined as a time on the timeline of the composite presentation or as a location between two adjacent video clips. In the example of FIG. 14, the insertion location is between adjacent clips 1452 and 1454.

Next, the process 1300 inserts (at 1315) the selected video clip into the primary track at the insertion location. Stage 1470 of FIG. 14 illustrates that the video clip 1432 has been inserted into the primary track between video clip 1452 and video clip 1454.

The process 1300 next determines (at 1320) a corresponding insertion location on the secondary track. This insertion location will be at the same position on the secondary track as the primary track insertion location. Stage 1450 of FIG. 14 illustrates that a secondary clip 1451 corresponding to the selected primary clip 1432 is being inserted into a corresponding location on the secondary track between secondary clips 1465 and 1467. The secondary clips 1465 and 1467 correspond to primary clips 1452 and 1454.

Next, the process 1300 inserts (at 1325) a corresponding secondary video clip into the secondary track at the insertion location. As described above, each primary 3D video clip will have an associated corresponding secondary 3D video clip that is timecode locked to the primary clip upon import. When a primary 3D video clip is inserted into the primary track of a composite presentation, it is this associated corresponding secondary 3D video clip that is automatically inserted into the secondary track of the composite presentation. Stage 1470 of FIG. 14 illustrates that the corresponding secondary video clip 1451 has been inserted into the secondary track between video clips 1465 and 1467. This location corresponds to that of primary video clip 1432 in the primary track.

In some embodiments, a user may also insert 2D video clips into the composite presentation, even when in 3D editing mode. When a 2D video clip is inserted into the primary track, some embodiments will automatically insert the same 2D video clip into a corresponding location on the secondary track. Other embodiments will simply leave a gap in the secondary video track when a 2D video clip is inserted into the primary track. Either of these mechanisms will serve to keep all of the primary 3D video clips together in the timeline with their corresponding secondary 3D video clips.

The process 1300 then moves (at 1330) any primary and secondary video clips affected by the insertion along the timeline of the composite presentation, then ends. In some embodiments, when a clip is inserted, the overall length of the primary and secondary tracks increases by the duration of the video clip inserted. Any clips after the inserted clip are moved later in the composite presentation by the duration of the inserted clip. Accordingly, all primary clips after the inserted clip and their corresponding secondary clips are affected by the insertion. As shown in FIG. 14, the affected primary video clips include clips 1454 and 1462, while the affected secondary video clips include clips 1467 and 1469. These affected primary and secondary clips are moved later in the timeline in their respective tracks to accommodate the insertion. Stage 1470 shows that the affected clips 1454, 1462, 1467, and 1469 have been moved later in the timeline by the duration of clip 1432 to accommodate the insertion of clip 1432.

The above example shown in FIG. 14 illustrates inserting a video clip into the timeline between two other video clips. In some embodiments, a user can also insert a first clip into the middle of a second clip, thereby splitting the second clip into two clips—one before the first clip in the composite presentation, and one after.

Figure 15:
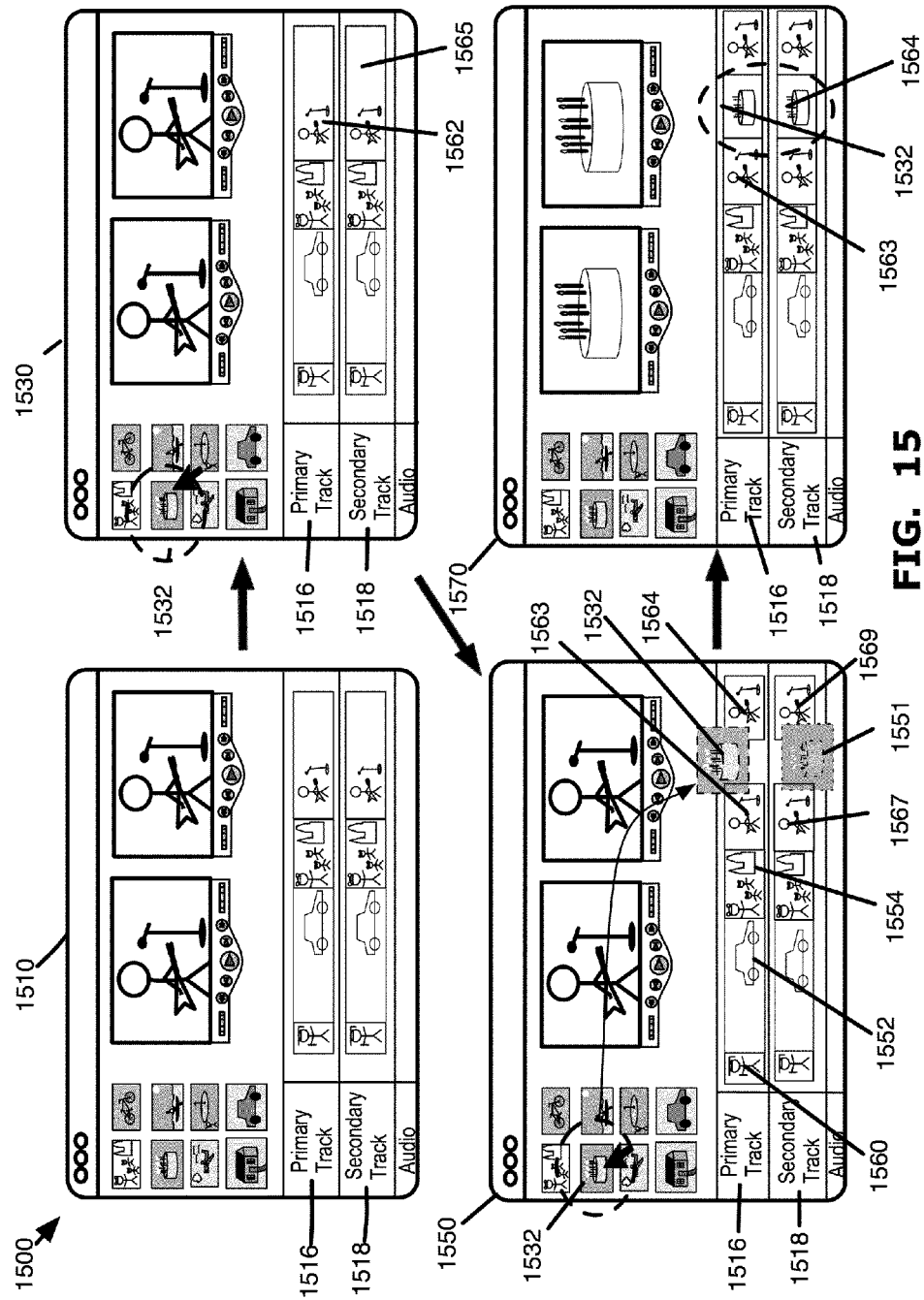
FIG. 15 illustrates an example of the insertion of a first pair of corresponding 3D video clips into the middle of a second pair of corresponding 3D video clips in a composite presentation through the use of a GUI of some embodiments.

FIG. 15 illustrates an example of the insertion of a first pair of corresponding 3D video clips into the middle of a second pair of corresponding 3D video clips in a composite presentation through the use of a GUI 1500 of some embodiments. Specifically, FIG. 15 illustrates the GUI 1500 at four different stages: a first stage 1510 at which a set of media clips have been edited to form a composite presentation, a second stage 1530 at which a user selects a video clip from a media library, a third stage 1550 at which the user drags and inserts the selected video clip in the middle of a second video clip in the primary track, and a fourth stage 1570 after the insertion of the selected video clip.

FIG. 15 illustrates the insertion location on the primary track within another clip, 1462 on the primary track. The insertion location is somewhere along the video clip 1562. The exact insertion location within the new destination may be specified to a frame level in some embodiments. In some embodiments, the insertion location may be specified as a point along the timeline in the composite display. As shown at stage 1510, the GUI 1500 includes a multimedia clip library 1535, a graphical representation of a composite presentation including primary track 1516 and secondary track 1518, a primary display area 1520, and secondary display area 1522, similar to the corresponding GUI elements described above by reference to FIG. 10.

The first and second stages 1510 and 1530 are similar to those of FIG. 14, in that the user has selected a 3D video clip. As shown at the third stage 1550, however, the user inserts the selected primary 3D video clip 1532 into the middle of the primary 3D video clip 1562 in the primary track 1516. In some embodiments, a first clip can be inserted into the middle of a second clip by placing the playhead at the desired insertion point in the second clip and using an insert key, though many other methods of inserting the clip are possible as well (e.g., dragging and dropping the clip at the desired insertion point).

The third stage also shows that an associated corresponding secondary 3D video clip 1551 is being inserted into the secondary track 1518 at a corresponding location along the timeline as the primary 3D video clip 1532, in the middle of the secondary 3D video clip 1565 that corresponds to primary 3D video clip 1562.

The fourth stage 1470 illustrates the result of the insertions of the primary and secondary 3D video clips. The insertion has split the primary 3D video clip 1562 into two new clips 1563 and 1564. The frames of clip 1564 have been moved later in the timeline of the composite presentation by the duration of primary 3D video clip 1532. Although the clips are now split apart, the out point of clip 1563 will be one frame before the in point of clip 1564.

The fourth stage also illustrates that the insertion of the associated corresponding 3D video clip 1551 has split the secondary 3D video clip 1565 into two new clips 1567 and 1569. The new clips 1567 and 1569 correspond to the clips 1563 and 1564. Accordingly, further edits applied to clip 1563 will also be correspondingly applied to clip 1567.

Some embodiments update the data structures of all affected timeline clips after a clip is inserted. When a clip (e.g., clip 1432) is added to the composite media presentation, primary and secondary timeline clip data structures are automatically created, as illustrated above in FIG. 11. The start and end times (in reference to the timeline of the composite presentation) for all of the clips after the inserted clips are moved later by the duration of the inserted clip. In addition, when a clip is inserted in the middle of a second clip to split the second clip in two, new data structures are created for the clip that is split. One of the resulting pairs of clips (primary and secondary) retains the old associated data structures (e.g., the earlier part of the clip), and a new pair of associated data structures are created for the second pair of clips. As mentioned, the out point of the first pair of clips will be one frame prior to the in point of the second pair of clips.

(2) Deletion

Figure 16:
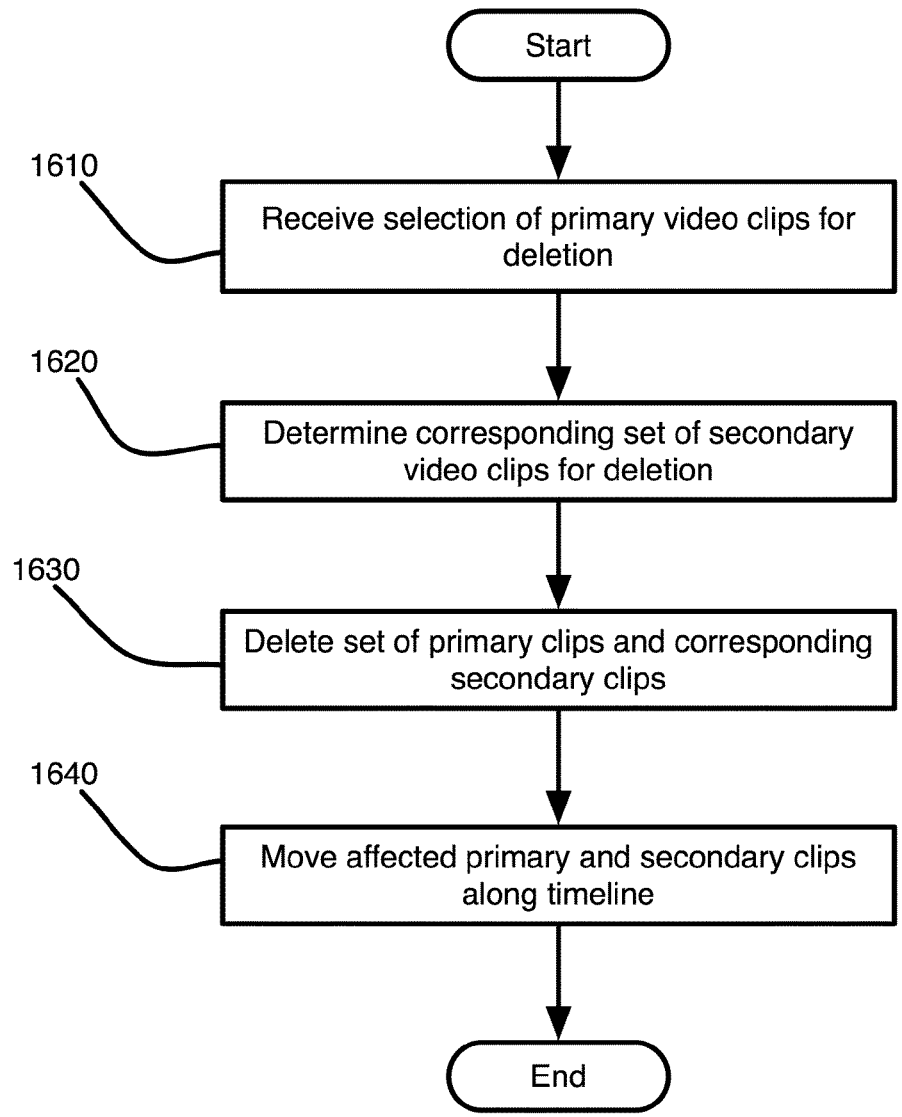
FIG. 16 conceptually illustrates a process for deleting a video clip from a primary track of a composite media presentation.

FIG. 16 conceptually illustrates a process 1600 for deleting a video clip from a primary track of a composite media presentation. Process 1600 will be described with reference to FIG. 17.

Figure 17:
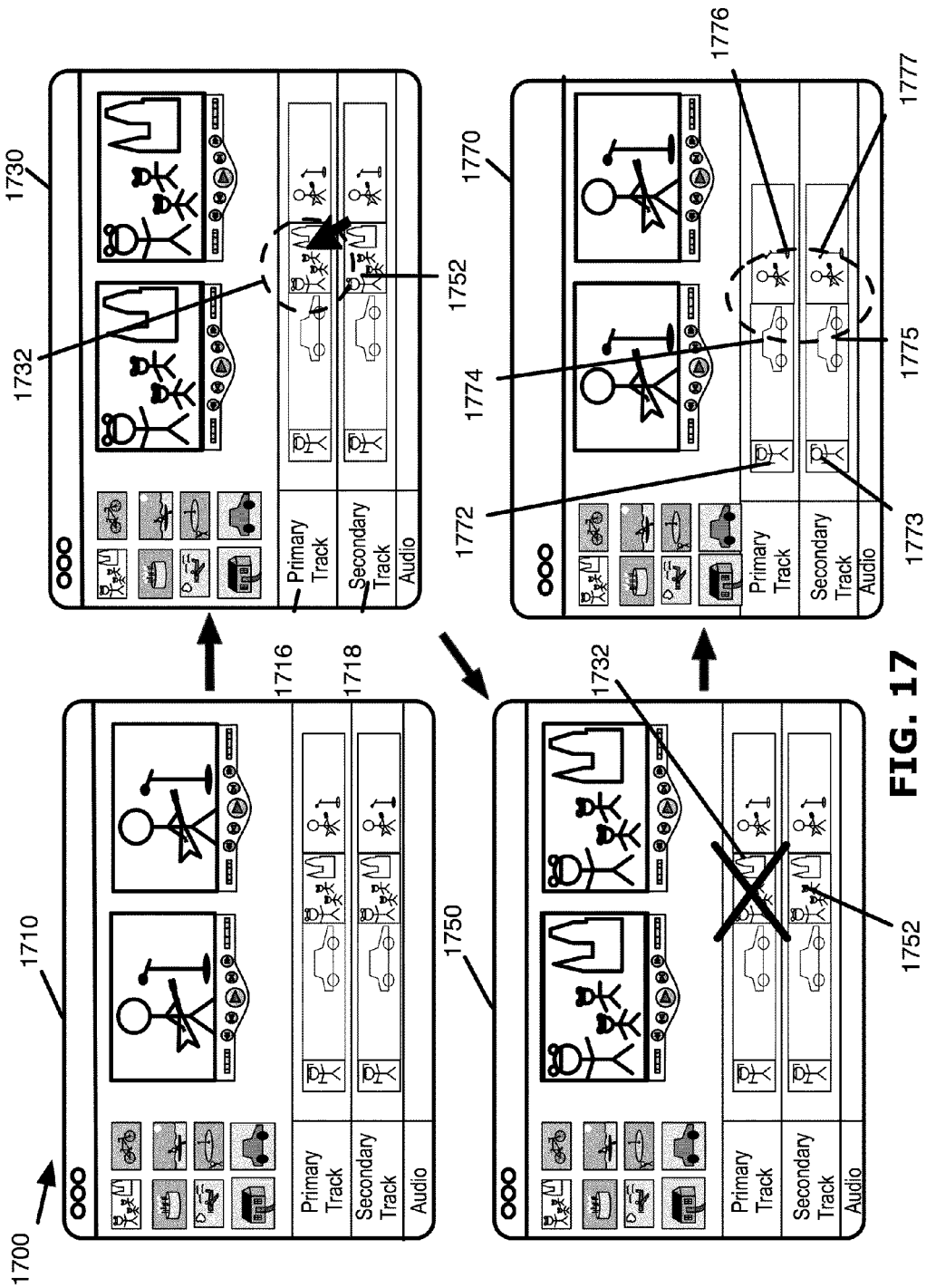
FIG. 17 illustrates an example of the deletion of a pair of corresponding 3D video clips from a composite presentation through the use of a GUI of a media editing application of some embodiments.

FIG. 17 illustrates an example of the deletion of a pair of corresponding 3D video clips from a composite presentation through the use of a GUI 1700 of a media editing application of some embodiments. Specifically, FIG. 17 illustrates the GUI 1700 at four different stages: a first stage 1710 at which a set of media clips have been edited to form a composite presentation, a second stage 1730 at which a user selects a primary 3D video clip in the primary track of the composite display area, a third stage at which the user deletes the selected primary 3D video clip, and a fourth stage at which the selected clip is deleted from the primary track and a corresponding secondary 3D video clip is deleted from the secondary track. As shown at stage 1710, the GUI 1700 includes a multimedia clip library, a graphical representation of a composite presentation including primary track 1716 and secondary track 1718, a primary display area, and secondary display area, similar to the corresponding GUI elements described above by reference to FIG. 10.

As shown, the process 1600 begins by receiving (at 1610) a selection of primary video clips for deletion. The user may choose to delete a single clip or a group of clips. In some embodiments, a user selects one or more clips (e.g., with a cursor controller) and then presses a keystroke or series of keystrokes or selects a user interface item (e.g., a selectable button, an item from a drop-down menu, etc.).

Stage 1730 of FIG. 17 illustrates that a user has selected a primary 3D video clip 1732 in the primary track 1716 of the composite presentation using a cursor (e.g., by placing the cursor over the video clip and pressing and releasing a cursor controller selector. As shown at stage 1750, the user also selected to delete the video clip 1732 (e.g., by pressing a key or selecting a UI item).

Returning to FIG. 16, the process 1600 next determines (at 1620) the corresponding set of secondary 3D video clips for deletion. The corresponding set of secondary clips will be those secondary 3D video clips that are associated with the selected primary 3D video clips. As shown in FIG. 17, the selected primary 3D video clip 1732 has an associated corresponding secondary 3D video clip 1752 that is at the same location in the timeline of the composite media presentation.

In some embodiments, as described above, either the same 2D video clip or a gap will be used in the secondary track when a 2D video clip is in the primary track. Some embodiments will delete the duplicate clip or the gap when a 2D video clip is deleted from the primary track, in order to keep all of the primary 3D video clips in the timeline together with their corresponding secondary 3D video clips.

Next, the process 1600 deletes (at 1630) the set of primary clips and the corresponding secondary clips. Stage 1770 of FIG. 17 illustrates that the associated 3D video clips 1732 and 1752 have been removed from their respective tracks of the composite presentation.

The process 1600 the moves (at 1640) any primary and secondary video clips affected by the deletion along the timeline of the composite presentation, then ends. In some embodiments, when a clip is inserted, the overall length of the primary and secondary tracks decreases by the duration of the video clip that is removed. Any clips after the deleted clip are moved earlier in the composite presentation by the duration of the deleted clip. Accordingly, all primary clips after the deleted clip and their corresponding secondary clips are affected by the insertion. As shown at stage 1770, the primary 3D video clip 1776 and the secondary 3D video clip 1777 that were after the deleted clip in the composite presentation have been moved earlier in the timeline in their respective tracks by the duration of clip 1732.

As described above, in some embodiments the media editing application creates data structures (e.g., those shown in FIG. 11) to represent the clips added to the composite media presentation separately from the actual media clips. When a clip is deleted from the composite media presentation, some embodiments delete (1) the primary clip data structure and (2) its associated secondary clip data structure. In addition, the start and end times of all primary and secondary clips that move earlier in the composite presentation are modified to reflect the earlier time.

(3) Moving Clips

Figure 18:
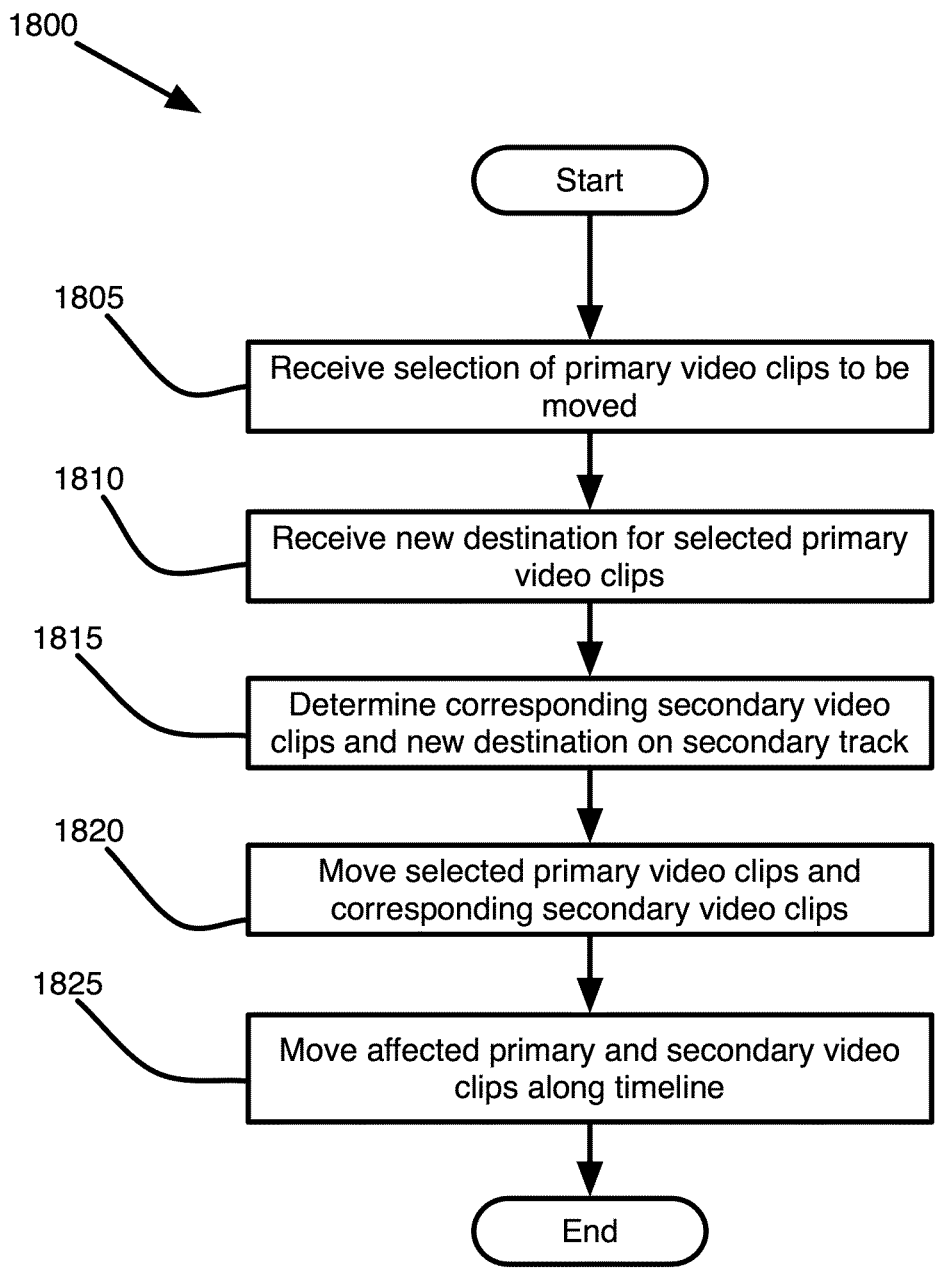
FIG. 18 conceptually illustrates a process of some embodiments for moving a video clip within a primary track of a composite media presentation.

FIG. 18 conceptually illustrates a process 1800 of some embodiments for moving a video clip within a primary track of a composite media presentation. Process 1800 will be described with reference to FIGS. 19 and 20.

Figure 19:
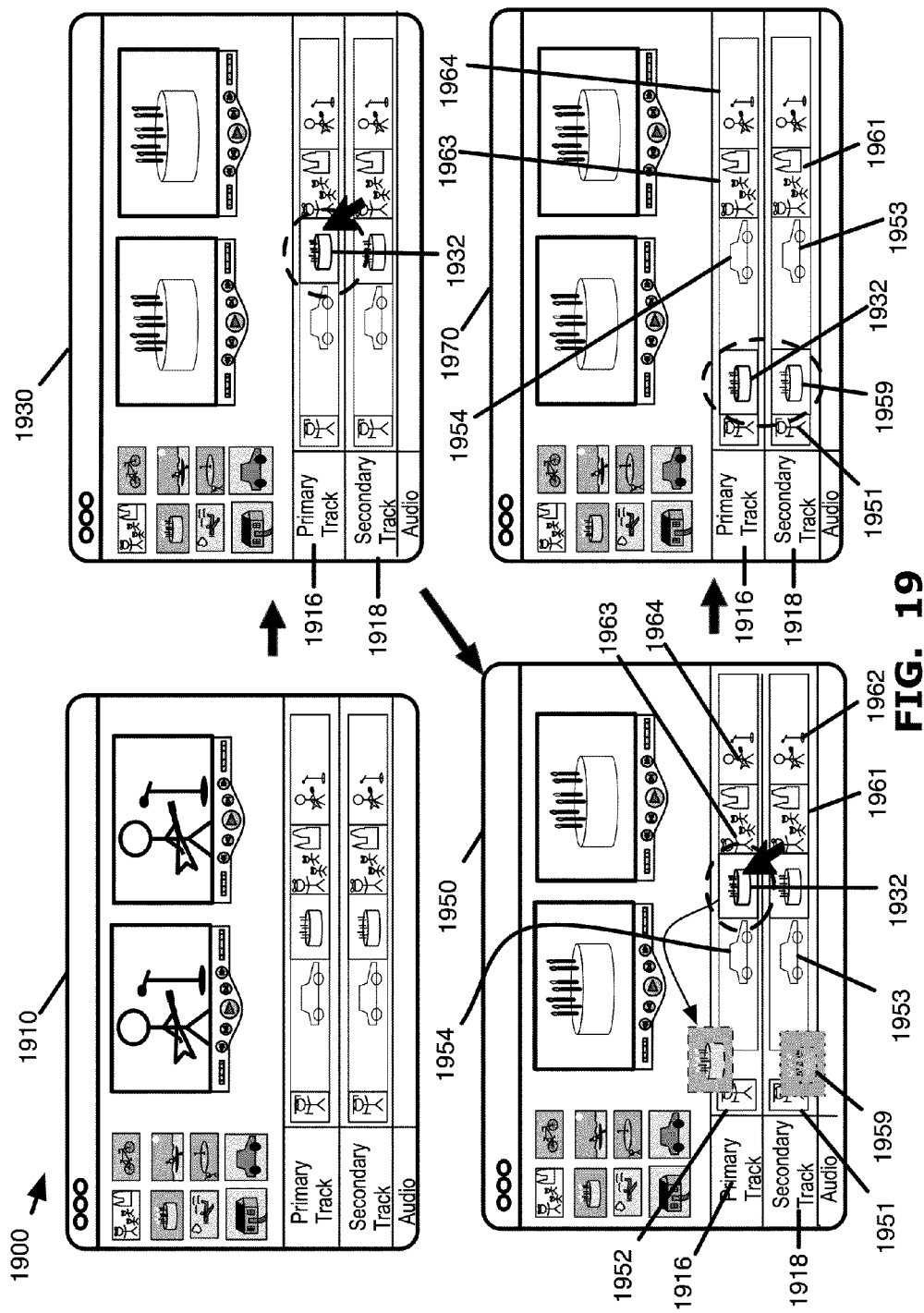
FIG. 19 illustrates an example of the movement of a video clip within a primary track of a composite media presentation through the use of a of a media editing application of some embodiments.

FIG. 19 illustrates an example of the movement of a video clip within a primary track of a composite media presentation through the use of a GUI 1900 of a media editing application of some embodiments. Specifically, FIG. 19 illustrates the GUI 1900 at four different stages: a first stage 1910 at which a set of media clips have been edited to form a composite presentation, a second stage 1930 at which the user selects a primary 3D video clip in the primary track of the composite display area, a third stage 1950 at which the user drags and moves the selected video clip to a different location between two other video clips on the primary track, and a fourth stage 1970 after the movement of the selected video clip. As shown at stage 1910, the GUI 1900 includes a multimedia clip library, a graphical representation of a composite presentation including primary track 1916 and secondary track 1918, a primary display area, and secondary display area, similar to the corresponding GUI elements described above by reference to FIG. 10.

As shown, the process 1800 begins by receiving (at 1805) a selection of a primary video clip to be moved. The process then receives (at 1810) a new destination for the selected primary video clips. In some embodiments, a user selects one or more clips in the primary track (e.g., with a cursor controller, through a touchscreen) and then drags the selected clips to a new location in the primary track (e.g., by moving the cursor or dragging the finger along the touchscreen). The new destination location may be defined in many ways. In some embodiments, the destination location is defined as a time on the timeline of the composite presentation or as a location between two adjacent video clips. In the example of FIG. 19, the new location is between video clip 1952 and video clip 1954.

Stage 1930 of FIG. 19 illustrates that a user has selected a video clip 1932 on the primary track 1916 using a cursor (e.g., by placing the cursor over the video clip and pressing a cursor controller selector, placing a finger on a touchscreen over the video clip, etc.). As shown in stage 1950, the user has also dragged the selected clip 1932 to a new location in the primary track 1916 (e.g., by releasing a cursor controller selector, removing a finger from a touchscreen, etc.).

In some embodiments, multiple clips can be selected and moved as a group. In addition, some embodiments enable a user to select a portion of a clip or a range along the timeline of the composite presentation that should be moved, which could include portions of multiple clips. For instance, a user could specify a start frame and frame and then move all video falling between those two frames in the composite presentation.

Returning to FIG. 18, the process 1800 next determines (at 1815) the corresponding secondary 3D video clips to move along with the selected primary 3D video clips and the new destination on the secondary track for the secondary clips. The corresponding set of secondary clips will be those 3D video clips that are associated with the selected primary 3D video clips. As shown in FIG. 19, the selected video clip 1932 has an associated corresponding secondary 3D video clip 1959 that is at the same location in the timeline of the composite media presentation.

In some embodiments, as described above, either the same 2D video clip or a gap will be used in the secondary track when a 2D video clip is in the primary track. Some embodiments will move the duplicate clip or the gap when a 2D video clip is moved in the primary track, in order to keep all of the primary 3D video clips in the timeline together with their corresponding secondary 3D video clips.

Next, the process 1800 moves (at 1820) the selected primary 3D video clips and corresponding secondary 3D video clips to the received destination. Stage 1950 of FIG. 19 illustrates an example in which the video clip 1932 is moved into the primary track 1916 between video clips 1952 and 1954 in the composite presentation. As shown at stage 1970, the selected clip 1932 is now located earlier in the timeline, between clip 1952 and clip 1954. Correspondingly, the secondary 3D video clip 1959 is now located between clip 1951 and 1953.

The process 1800 next moves (at 1830) any primary and secondary video clips affected by the move along the timeline of the composite presentation, then ends. In general, when a clip is moved within a track, the overall duration of the composite presentation does not change. However, any clips between the point from which the clip is removed and the point at which the clip is re-inserted will be shifted in the timeline. If the selected clip is moved earlier in the timeline of the composite presentation, as shown in FIG. 19, these affected clips are moved later in the timeline by the duration of the selected clip. As shown at stage 1970 of FIG. 19, the selected clip 1932 was moved from after clip 1954 to before clip 1954. Accordingly, clip 1954 has been moved later in the primary track 1916 of the composite presentation by the duration of the selected primary 3D video clip 1932. Similarly, the secondary clip 1953 has been moved later in the secondary track 1918 by the same duration.

The above example shown in FIG. 19 illustrates moving a video clip into a new location in the timeline between two other video clips. As was described with respect to insertion in sub-section (1) above, in some embodiments a user can also move a first clip into the middle of a second clip, thereby splitting the second clip into two clips—one before the first clip in the composite presentation, and one after.

Figure 20:
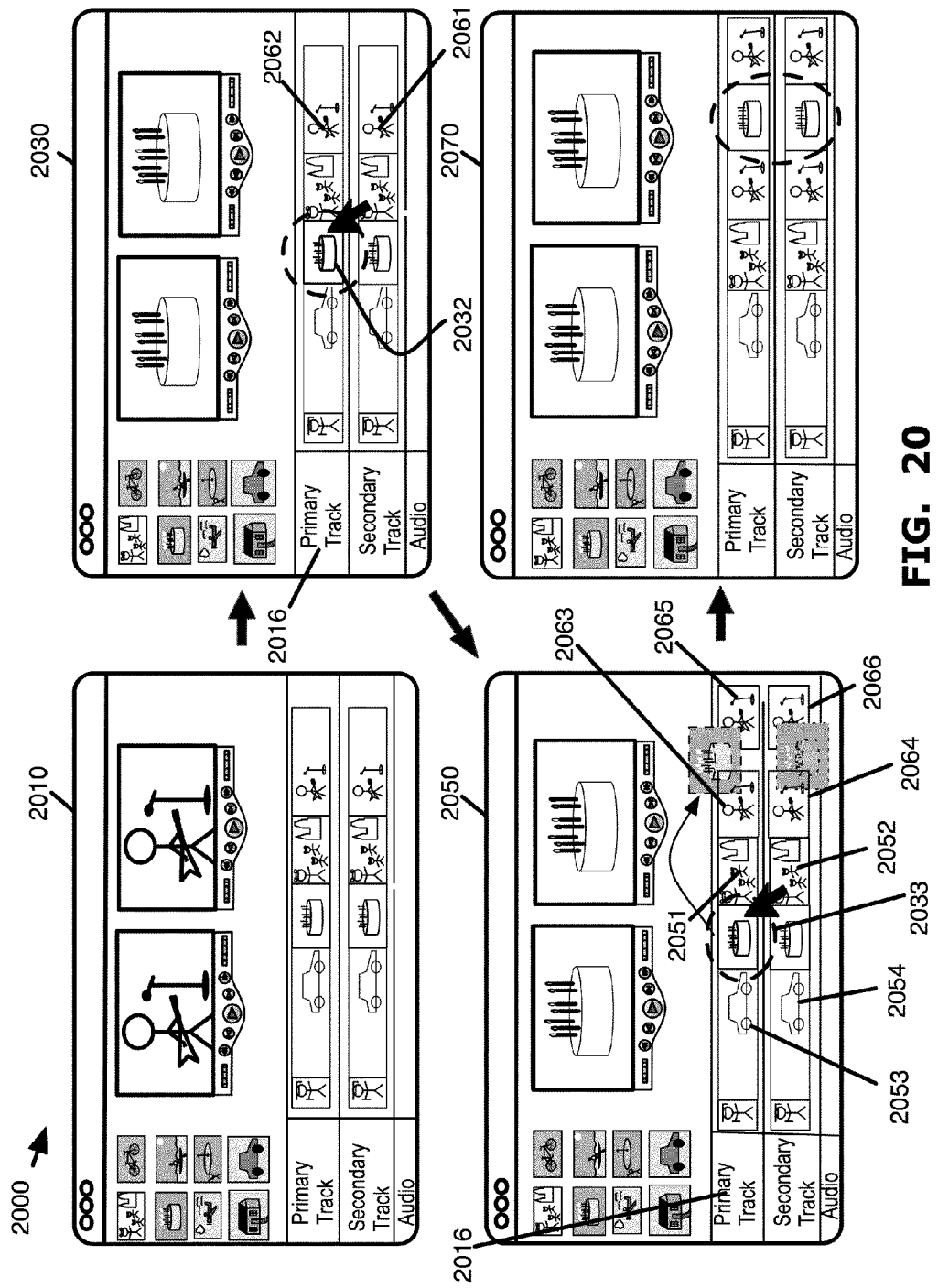
FIG. 20 illustrates an example of the movement of a first pair of corresponding 3D video clips into the middle of a second pair of corresponding 3D video clips in a composite presentation through the use of a GUI of some embodiments.

FIG. 20 illustrates an example of the movement of a first pair of corresponding 3D video clips into the middle of a second pair of corresponding 3D video clips in a composite presentation through the use of a GUI 2000 of some embodiments. Specifically, FIG. 20 illustrates the GUI 2000 at four different stages: a first stage 2010 at which a set of media clips have been edited to form a composite presentation, a second stage 2030 at which a user selects a primary 3D video clip in the primary track of the composite display area, a third stage 2050 at which the user drags and moves the selected primary 3D video clip into the middle of a second primary 3D video clip in the primary track, and a fourth stage 2070 after the movement of the selected primary 3D video clip.

The first and second stage 2010 and 2030 are similar to those of FIG. 19, in that the user has selected a primary 3D video clip in the primary track. As shown at the third stage 2050, however, the user moves the selected primary 3D video clip 2032 later in the composite presentation and re-inserts the selected clip 2032 into the middle of the primary 3D video clip 2062 in the primary track 2016. In some embodiments, a first clip can be moved into the middle of a second clip by placing the playhead at the desired insertion point in the second clip and using a move key with the first clip selected, though many other methods of moving the clip are possible as well (e.g., dragging and dropping the clip at the desired insertion point).

The third stage also shows that an associated corresponding secondary 3D video clip 2033 is moved in the secondary track to a corresponding location along the timeline as the primary 3D video clip 2032, in the middle of the secondary 3D video clip 2061 that corresponds to primary video clip 2032.

The fourth stage 2070 illustrates the result of the movements of the primary and secondary video clips. The movement has split the primary 3D video clip 2062 into two new clips 2063 and 2065. As the selected primary 3D video clip 2032 is moved later in the timeline of the composite presentation, the frames of clip 2063 have been moved earlier in the timeline of the composite presentation by the duration of primary 3D video clip 2032. Although the clips are now split apart, the out point of clip 2063 will be one frame before the in point of clip 2065. In addition, the intervening clip 2051 is moved earlier in the timeline by the duration of the clip 2032.

The fourth stage also illustrates that the corresponding movement of the associated corresponding secondary 3D video clip 2033 has split the secondary 3D video clip 2061 into two new clips 2064 and 2066. The new clips 2064 and 2066 correspond to the clips 2063 and 2065. Accordingly, further edits applied to clip 2063 will also be correspondingly applied to clip 2066.

Some embodiments update the data structures of all affected timeline clips after a clip is moved. When a clip (e.g., clip 1932) is moved in the composite media presentation, the start and end times (in reference to the timeline of the composite presentation) for all of the clips that are moved are modified by the duration of the inserted clip. In addition, when a clip is moved into the middle of a second clip to split the second clip in two, new data structures are created for the clip that is split. One of the resulting pairs of clips (primary and secondary) retains the old associated data structures (e.g., the earlier part of the clip), and a new pair of associated data structures are created for the second pair of clips. As mentioned, the out point of the first pair of clips will be one frame prior to the in point of the second pair of clips.

(4) Trimming

Another editing feature that affects the timeline of the composite presentation and is therefore applied to both tracks is trim editing. Trim editing refers to edits commonly used to modify in and out points of clips in the timeline. Particular examples of trim edits include slide edits, slip edits, ripple edits and roll edits.

A slide edit moves a clip's position in the timeline between two other clips without creating a gap. The sliding clip's content and duration remain the same; only its position in the timeline changes. When a clip slides, the adjacent clips get longer and shorter to fill any gaps that would normally be created (i.e., the out point of the previous clip and the in point of the subsequent clip are modified). The combined duration of these three clips does not change, and therefore the duration of the composite presentation remains unchanged as well.

A slip edit does not change a clip's position or duration in the timeline, but instead changes what portion of the clip's media appears in the timeline. The slip moves a clip's in and out points simultaneously.

A ripple edit adjusts a clip's in or out point, making the clip longer or shorter, without leaving a gap in the timeline. The change in the clip's duration ripples outward, moving all subsequent clips earlier (if the clip is shortened) or later (if the clip is lengthened) in the timeline.

A roll edit adjusts the out point and in point of two adjacent clips simultaneously. No clips move in the timeline as a result; only the edit point between the two clips moves. This is a two-sided edit, meaning that two clips' edit points are affected simultaneously: the first clip's out point and the next clip's in point are both adjusted by a roll edit. The roll edit does not modify the duration of the composite presentation.

Figure 21:
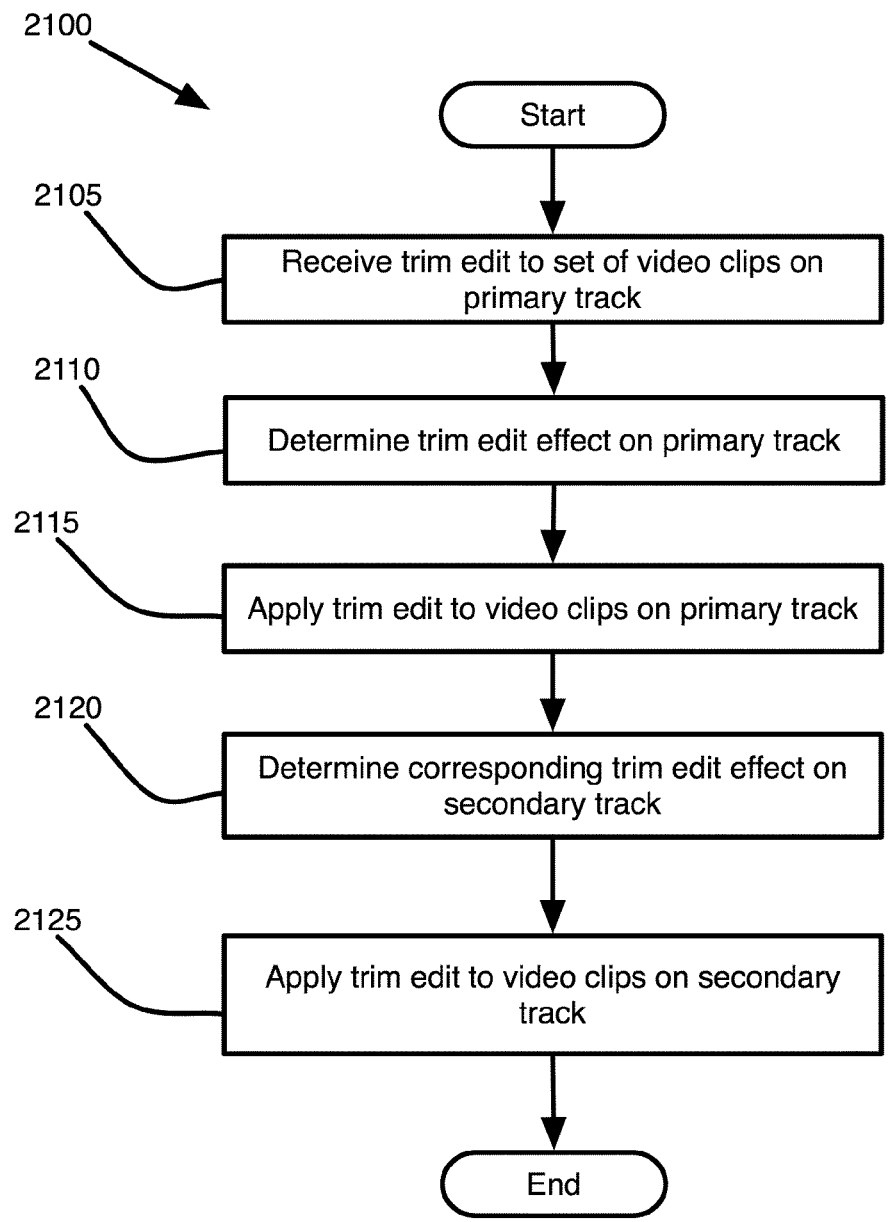
FIG. 21 conceptually illustrates a process for applying trim edits to a video clip in a composite presentation.

FIG. 21 conceptually illustrates a process 2100 for applying trim edits to a video clip in a composite presentation. Process 2100 will be described by reference to FIG. 22, which illustrates one particular type of trim edit.

Figure 22:
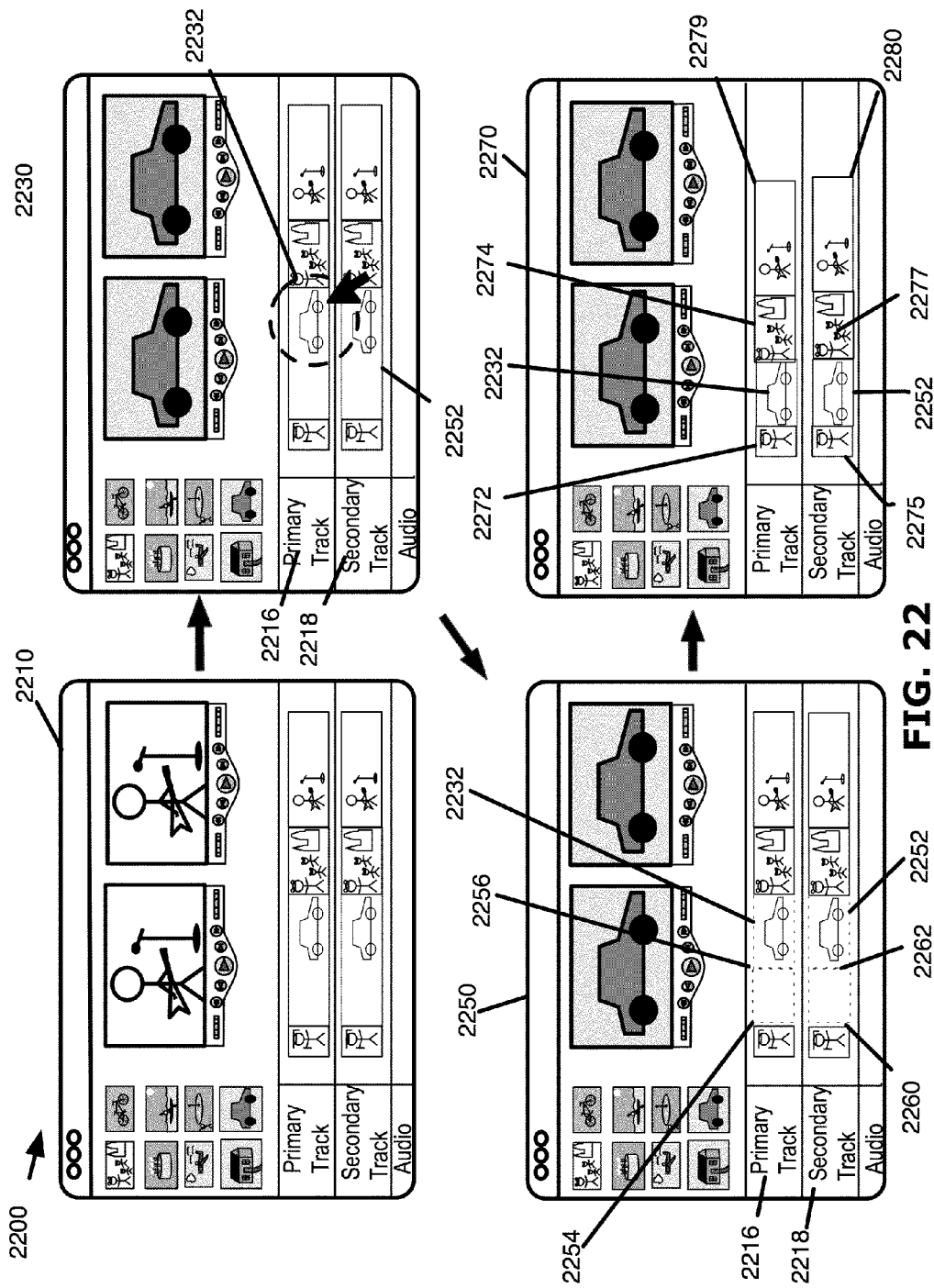
FIG. 22 illustrates an example of applying a trim edit to a primary 3D video clip in the primary track of a composite presentation through the use of a GUI of a media editing application for some embodiments.

FIG. 22 illustrates an example of applying a trim edit to a primary 3D video clip in the primary track of a composite presentation through the use of a GUI 2200 of a media editing application for some embodiments. Specifically, FIG. 22 illustrates the GUI 2200 at four different stages: a first stage 2210 at which a set of media clips have been edited to form a composite presentation, a second stage 2230 that shows user selection of one video clip on the primary track, a third stage 2250 at which the user applies a ripple edit to the in point of the selected clip and a fourth stage 2270 at which the selected clip and its corresponding secondary clip are shortened as a result of the ripple edit. As shown at stage 2210, the GUI 2200 includes a multimedia clip library, a graphical representation of a composite presentation including primary track 2216 and secondary track 2218, a primary display area, and secondary display area, similar to the corresponding GUI elements described above by reference to FIG. 10.

As shown, the process 2100 begins by receiving (at 2105) a trim edit to a set of video clips on a primary track. The trim edit may affect one or more in and/or out points of various video clips as well as the location of the video clips in the timeline. A slide edit, for example, affects the position of the sliding clip in the timeline as well as the out point of the clip previous to the sliding clip and the in point of the clip after the sliding clip. A slip edit only affects the in and out points of the slipping clip, while a roll edit affects the out point of a first clip and the in point of a subsequent clip. A ripple edit affects the in or out point of a clip as well as the location in the timeline of all clips after the affected clip.

Stage 2230 of FIG. 22 illustrates that a user has selected a video clip 2232 on the primary track 2216 (e.g., by placing the cursor over the video clip and clicking a mouse button or similar cursor controller selector, placing a finger over the video clip on a touchscreen, etc.). Stage 2250 in FIG. 22 illustrates that a user has applied a ripple trim edit to the in point of clip 2232. In stage 2250, the ripple edit applied to primary 3D video clip 2232 modifies the in point of this video clip from an original in point position 2254 of the video clip 2232 to a new in point position 2256. In this particular example, the trim edit shortens the duration of the entire primary video clip 2232 by the difference between these two positions. Ripple edits may also lengthen the duration of a primary video clip.

Returning to FIG. 21, the process 2100 next determines (at 2110) the trim edit's effect on the primary track. That is, the process determines which in and out points are affected by the received trim edit, and whether any clips are shifted in the timeline of the composite presentation. As shown at stage 2250, the trim edit applied to primary 3D video clip 2232 modifies the in point to a later timecode in the source clip for that clip, thereby shortening the primary 3D video clip 2232. Because the ripple edit affects the duration of the primary 3D video clip 2232, all clips after the rippled clip are shifted in the timeline.

Next, the process 2100 applies (at 2115) the trim edit to the affected video clips on the primary track. As shown at stage 2270, the rippled clip 2232 is shortened by the duration from point 2254 to 2256. In addition, the primary 3D video clips 2274 and 2279 are moved earlier in the timeline of the composite presentation by the same duration. As a result of the ripple edit, the overall duration of the composite presentation is shortened by this duration.

The process 2100 next determines (at 2120) the corresponding trim edit effect on the secondary track. For each primary 3D video clip that is affected (e.g., in or out point modified, location in timeline shifted), an associated corresponding secondary 3D video clip is similarly affected. Thus, the secondary 3D video clip 2252 that corresponds to primary 3D video clip 2232 has its in point similarly modified, and the secondary 3D video clips that correspond to primary 3D video clips 2274 and 2279 are similarly shifted.

The process 2100 then applies (at 2125) the trim edit to the affected video clips on the secondary track, and ends. As shown at stage 2250 of FIG. 22, the secondary 3D video clip 2252 has been shortened and the secondary 3D video clips 2277 and 2280 have been moved earlier in the timeline. Just as with the primary track, the secondary track has been shortened in duration.

For a trim edit, no new data structures are created and no data structures are deleted in some embodiments. However, in and out points of the modified clips are changed in the timeline clip data structures. In addition, when the trim edit is a ripple edit, the start and end times of all the clips after the modified clip are changed as well.

A. Edits Optionally Applied to Both Tracks

The above-described edits are automatically applied to the secondary 3D video track when a user applies the edits to the primary 3D video track. As mentioned, though, some edits are not automatically applied to the secondary 3D video track when applied to the primary track. These tend to be edits that do not directly affect the timeline of the composite presentation. However, some embodiments present the user with an option to apply the edit to clips on both tracks. In some embodiments, such edits can also be applied directly to the secondary 3D video track without affecting clips on the primary 3D video track. Examples of such edits include the application of an effect (e.g., color correction, transitions, etc.) and alignment control (i.e., the modification of the size or angle of a particular 3D video clip or frame of a clip).

(1) Special Effects

Special effects are one example of a type of edit that can be applied either to only one track or to both tracks of a 3D composite media presentation. Examples of special effects include color correction (e.g., to a single frame or field of video or to a clip as a whole), transitions between clips (e.g., cross-fade, etc.), etc. Some special effects are more likely to be applied to both primary and secondary tracks, though the option is given to only apply the effects to a single track. For instance, a transition will usually be desired for both tracks.

Figure 23:
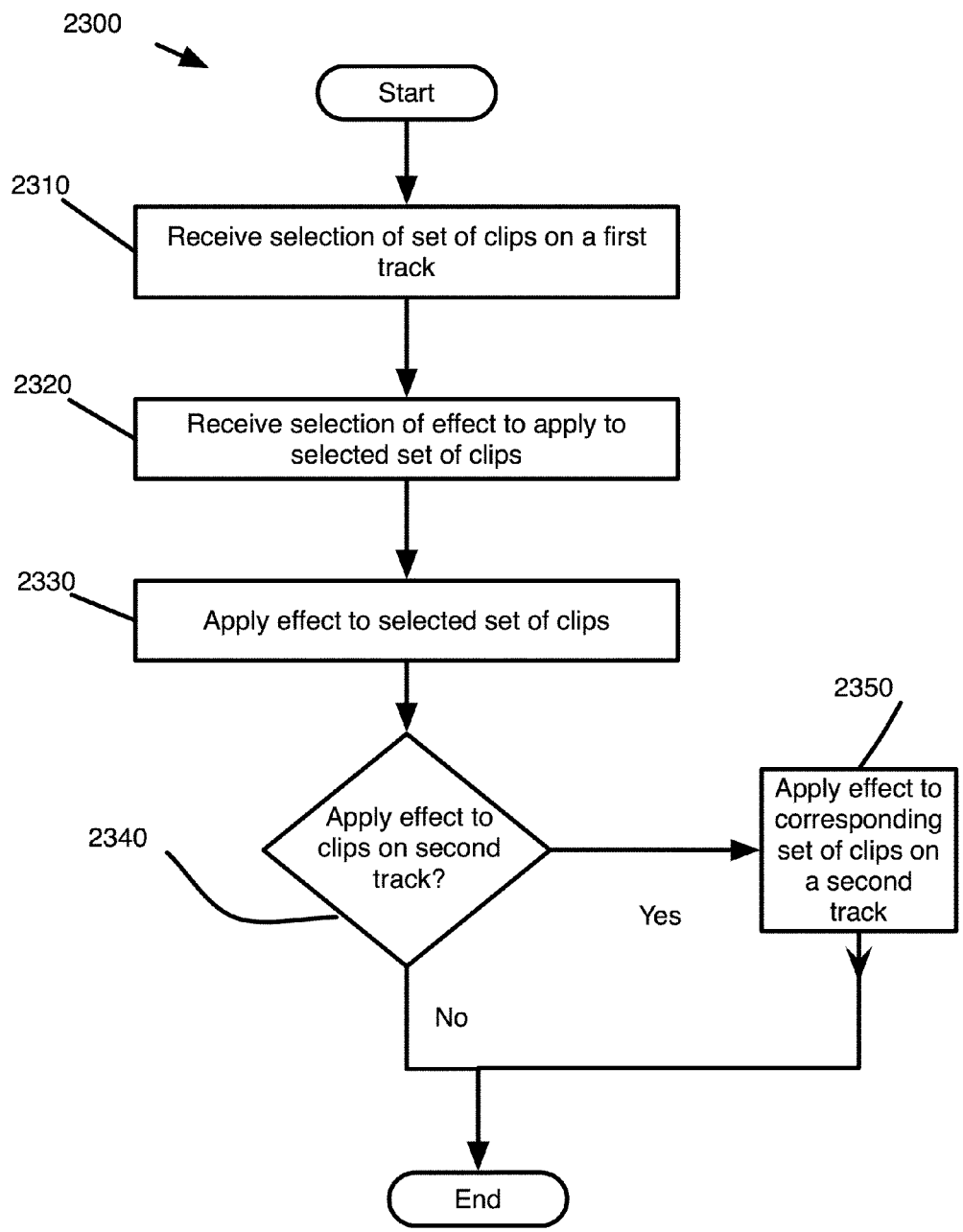
FIG. 23 conceptually illustrates a process for applying an effect to one or more 3D video clips on either a primary or secondary track.

FIG. 23 conceptually illustrates a process 2300 for applying an effect to one or more 3D video clips on either a primary or secondary track. Process 2300 will be described by reference to FIGS. 24 and 25.

Figure 24:
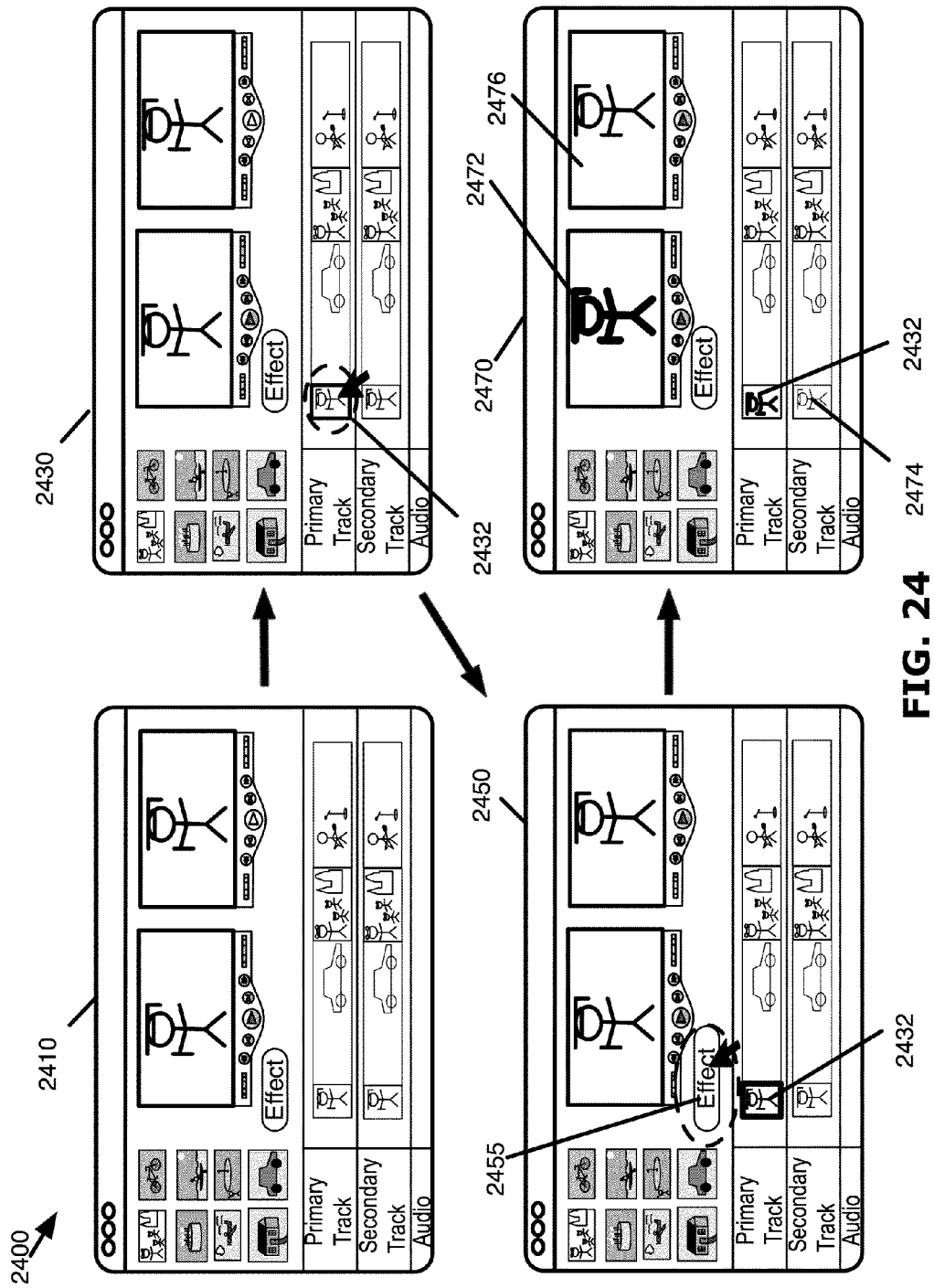
FIG. 24 illustrates an example of the application of an effect to a primary 3D video clip in a composite presentation through the use of a GUI.

FIG. 24 illustrates an example of the application of an effect to a primary 3D video clip in a composite presentation through the use of a GUI 2400. FIG. 24 illustrates the GUI 2400 at four different stages: a first stage 2410 at which a set of media clips have been edited to form a composite presentation, a second stage 2430 at which a user selects a video clip within the primary track of a composite media presentation, a third stage 2450 at which a user selects an effect to apply to the selected video clip, and a fourth stage 2470 after the effect has been applied to the primary 3D video clip only.

As shown at stage 2410, the GUI 2400 includes a multimedia clip library, a graphical representation of a composite presentation including primary track 2416 and secondary track 2418, a primary display area 2472, and secondary display area 2476, similar to the corresponding GUI elements described above by reference to FIG. 10. The GUI 2400 also includes an "Effect" button 2455. The button 2455 is representative of a user interface element or series of user interface elements used to apply an effect to only one of a pair of associated 3D video clips.

Figure 25:
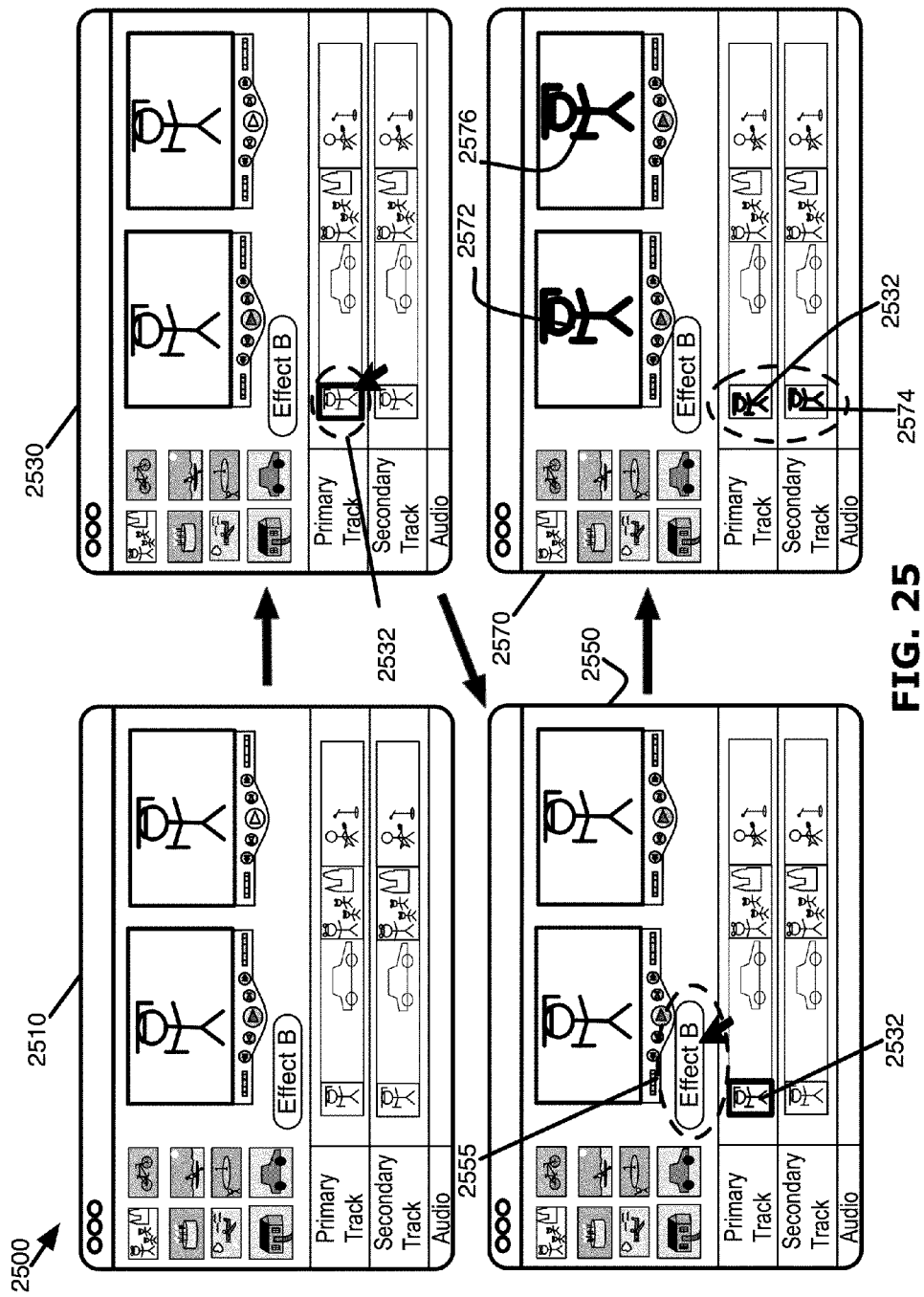
FIG. 25 illustrates a similar GUI to that of FIG. 24, except that in this case the selected effect is applied to both the selected primary 3D video clip as well as a corresponding associated secondary 3D video clip.

FIG. 25 illustrates a similar GUI 2500 in four different stages as well, except that in this case the selected effect is applied to both the selected primary 3D video clip as well as a corresponding associated secondary 3D video clip. The GUI elements of GUI 2500 are the same as FIG. 24 except that the "Effect" button 2455 is replaced with the "Effect B" button 2555 that represents a user interface element or series of user interface elements used to apply an effect to both of a pair of associated 3D video clips.

As shown, the process 2300 begins by receiving (at 2310) a selection of a set of clips on a first track. In some embodiments, this first track from which the set of clips is selected may be either the primary or secondary 3D video track. In some embodiments, the user touches the clips on a touchscreen, places a cursor over the clips and presses/releases a cursor controller selector (e.g., a mouse button), moves the playhead over a clip, etc. In some embodiments, multiple clips can be selected, or a portion of a clip (e.g., a single frame to be color corrected) may be selected using various UI mechanisms. Some embodiments also allow a user to select one or more primary 3D video clips from the primary 3D video track as well as one or more secondary 3D video clips from a secondary 3D video track, that may or may not correspond to the selected primary 3D video clips.

Stage 2430 of FIG. 24 illustrates that a user has selected a primary 3D video clip 2432 in the primary video track of the composite presentation using a cursor. Stage 2530 of FIG. 25 illustrates a similar selection of a primary video clip 2532.

Next, the process 2300 receives (at 2320) a selection of an effect to apply to the selected set of clips. Different effects may be received differently in some embodiments. For instance, a user might select a transition from a drop-down menu of transitions, or bring up a color correction window and use various UI tools within the window to modify color properties of the selected frames or clips. In stage 2450 of FIG. 24, the user selects the "Effect" button 2455 in order to apply the effect to the selected clip 2432. Similarly, at stage 2550 of FIG. 25, the user selects the "Effect B" button 2555 in order to apply the Effect B to the selected clip 2532.

The process 2300 then applies (at 2330) the selected effect to the selected set of clips. In some embodiments, the application of the effect appears in the preview display area if the playhead is over the clip or frame being edited. For instance, a user will generally want color correction or similar effects to be shown in the preview display area (or a different window or display area) so that the effect can be optimized. Stage 2470 of FIG. 24 illustrates the application of the effect represented by UI item 2455 to the selected video clip 2432. The result of this effect is shown in the preview display area 2472.

The process 2300 next determines (at 2340) whether to apply the effect to associated corresponding clips on the second track. In some embodiments, different types of user input indicate whether to apply the effect to associated second-track clips. For instance, some embodiments provide two options for each effect that a user can select. In some embodiments, when a user applies an effect, a dialog box or similar UI construct opens to ask the user whether he wants the effect applied to just the selected clips or associated clips as well.

When the effect is to be applied to the corresponding set of clips on the second track, the process applies (at 2350) the effect to these clips. The process then ends. Stage 2470 in FIG. 24 illustrates that the chosen effects edit is applied only to primary 3D video clip 2432, and not its associated corresponding secondary 3D video clip 2474. On the other hand, stage 2570 of FIG. 25 illustrates that the chosen effects edit is applied to both the selected primary 3D video clip 2532 and its associated corresponding secondary 3D video clip 2574. The primary and secondary preview display areas 2572 and 2576 both show the result of the effect as applied to the frames shown in these display areas.

One of ordinary skill in the art will recognize that the UI items 2455 and 2555 are merely constructs designed to represent selections of an effect for only selected clips or for selected clips as well as their associated clips. In most cases, selecting an effect to apply and whether to apply the effect to clips in one or both tracks will be more involved than merely clicking a button in the UI. The user may use drop-down menus, color correction tools, etc. in order to make these selections.

(2) Alignment Control

Alignment control is another type of edit that may be applied to either one or both tracks of a 3D composite media presentation. In some embodiments, alignment control refers to adjusting a video clip (or a frame of the video clip) to scale, shift, skew, or rotate the video. This is an especially important type of edit in 3D video editing, as the two video picture that will be played stereoscopically need to be properly aligned for the ideal 3D viewing effect. Alignment control is a type of edit that will generally be only applied to one track, though the option is provided in some embodiments to apply edits to both tracks.

Figure 26:
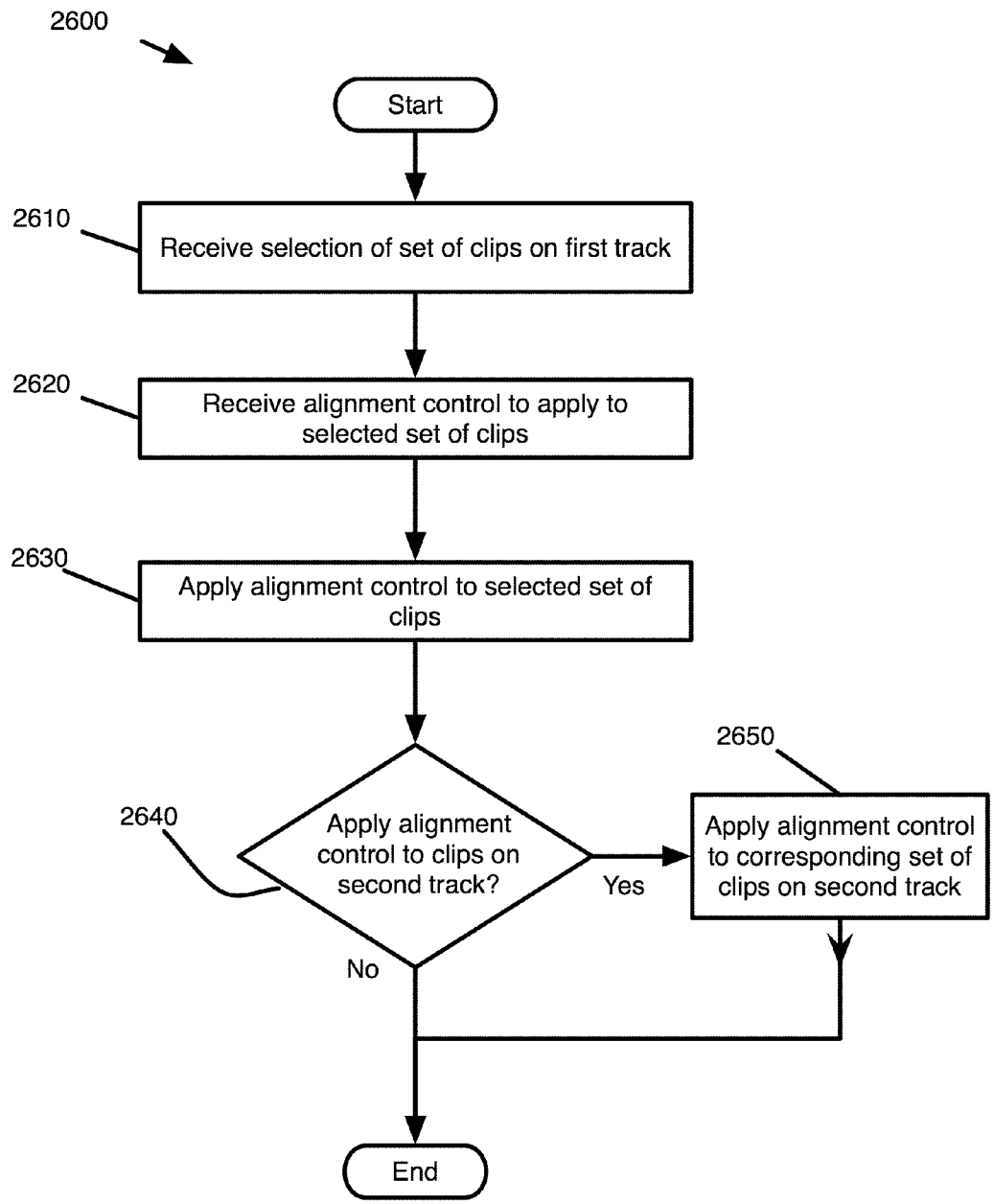
FIG. 26 conceptually illustrates a process for applying alignment control edits to one or more 3D video clips on either a primary or secondary track.

FIG. 26 conceptually illustrates a process 2600 for applying alignment control edits to one or more 3D video clips on either a primary or secondary track. Process 2600 will be described with reference to FIGS. 27 and 28.

Figure 27:
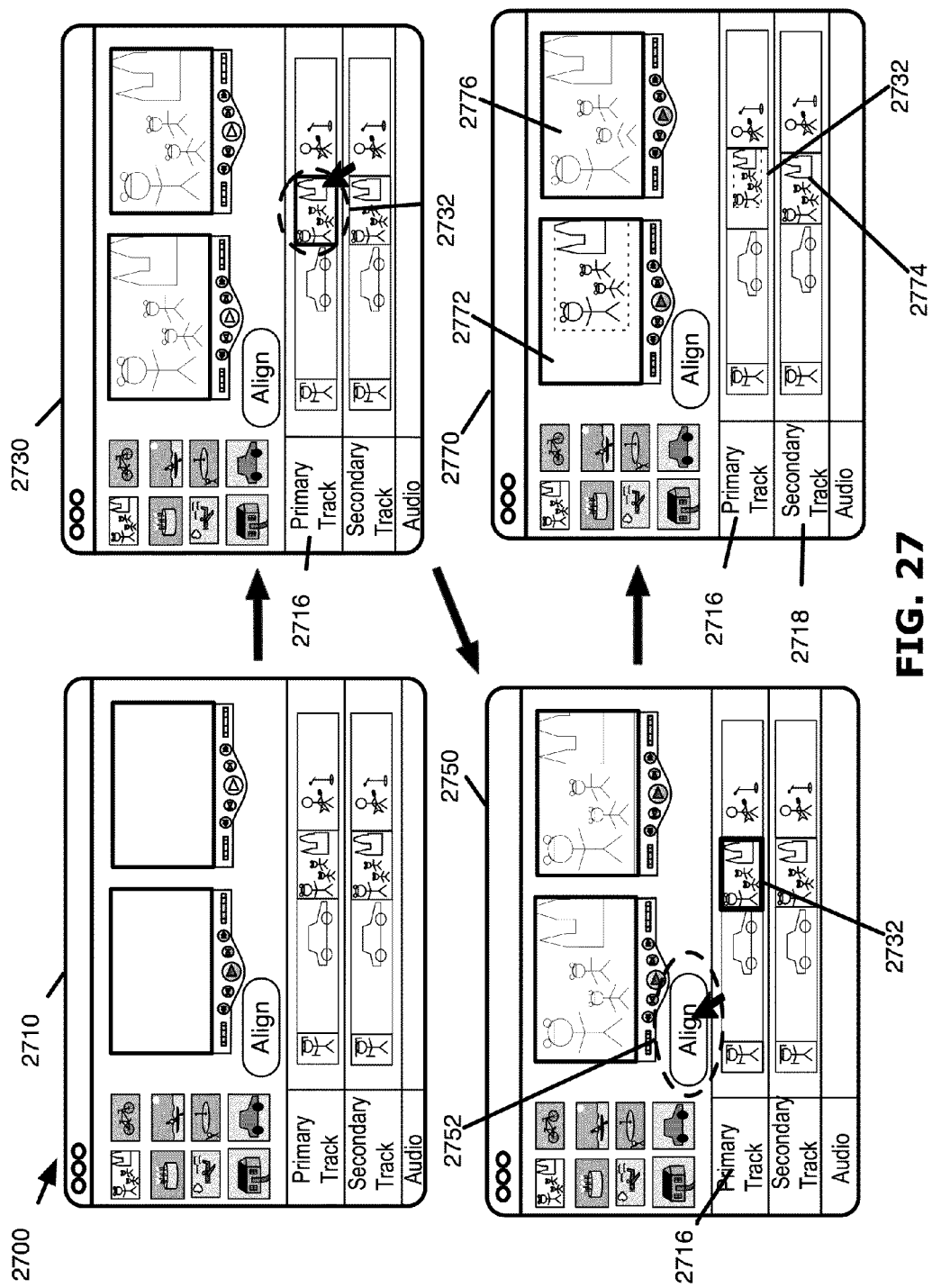
FIG. 27 illustrates an example of the application of an alignment control edit to a primary 3D video clip in a composite presentation through the use of a GUI of some embodiments.

FIG. 27 illustrates an example of the application of an alignment control edit to a primary 3D video clip in a composite presentation through the use of a GUI 2700 of some embodiments. FIG. 27 illustrates the GUI 2700 at four different stages: a first stage 2710 at which a set of media clips have been edited to form a composite presentation, a second stage 2730 at which a user selects a primary 3D video clip within the primary track of a composite media presentation, a third stage 2750 at which a user selects an alignment control edit to apply to the selected primary 3D video clip, and a fourth stage 2770 after the effect has been applied to the primary 3D video clip only.

As shown at stage 2710, the GUI 2700 includes a multimedia clip library, a graphical representation of a composite presentation including primary track 2716 and secondary track 2718, a primary display area 2772, and secondary display area 2776, similar to the corresponding GUI elements described above by reference to FIG. 10. The GUI 2700 also includes an "Align" button 2752. The button 2752 is representative of a user interface element or series of user interface elements used to apply an alignment edit to only one of a pair of associated 3D video clips.

Figure 28:
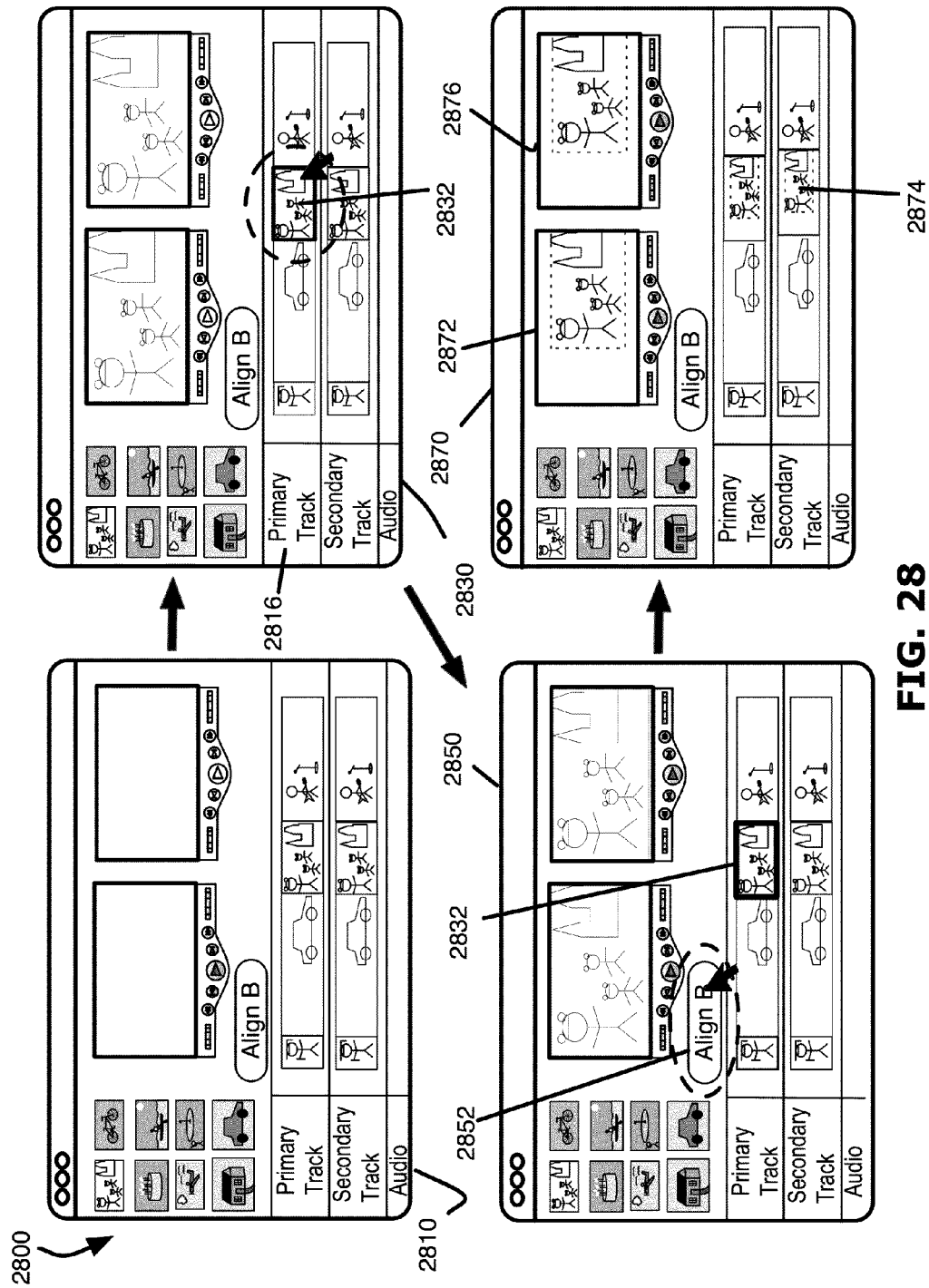
FIG. 28 illustrates a similar GUI to that of FIG. 27, except that in this case the selected effect is applied to both the selected primary 3D video clip as well as a corresponding associated secondary 3D video clip.

FIG. 28 illustrates a similar GUI 2800 in four different stages as well, except that in this case the selected effect is applied to both the selected primary 3D video clip as well as a corresponding associated secondary 3D video clip. The GUI elements of GUI 2800 are the same as FIG. 27 except that the "Effect" button 2752 is replaced with the "Effect B" button 2852 that represents a user interface element or series of user interface elements used to apply an effect to both of a pair of associated 3D video clips.

As shown, the process 2600 begins by receiving (at 2610) a selection of a set of clips on a first track. In some embodiments, this first track from which the set of clips is selected may be either the primary or secondary 3D video track. In some embodiments, the user touches the clips on a touch-screen, places a cursor over the clips and presses/releases a cursor controller selector (e.g., a mouse button), moves the playhead over a clip, etc. In some embodiments, multiple clips can be selected, or a portion of a clip (e.g., a single frame to be aligned) may be selected using various UI mechanisms. Some embodiments also allow a user to select one or more primary 3D video clips from the primary track as well as one or more secondary video clips from the secondary video track, that may or may not correspond to the selected primary 3D video clips.

Stage 2730 of FIG. 27 illustrates that a user has selected primary video clip 2732 in the primary video track of the composite presentation using a cursor. Stage 2730 of FIG. 28 illustrates a similar selection of primary video clip 2832.

Next, the process 2600 receives a selection of an alignment control edit to apply to the selected set of clips. The alignment control edit may be received in various different ways in different embodiments. For example, a user might select an alignment control feature that brings up a wireframe with selectable points (either over the video picture displayed in the preview display area or in a different location in the GUI). The user can then directly modify the wireframe (or the video picture directly, in some embodiments) in order to scale, shift, rotate, or skew the image. In stage 2750 of FIG. 27, the user selects the "Align" button 2752 in order to apply an alignment edit to the selected clip 2732. Similarly, at stage 2850 of FIG. 27, the user selects the "Align B" button 2852 in order to apply the alignment edit to the selected clip 2832.

The process 2600 then applies (at 2630) the selected alignment edit to the selected set of clips. In some embodiments, the application of the alignment appears in the preview display area or separate alignment window. Some embodiments superimpose the clip being aligned with its corresponding clip so that the user can view how the stereoscopic 3D video will look when played back. Stage 2770 of FIG. 27 illustrates the application of the alignment control to the selected video clip 2732. The result of this alignment edit is shown in the preview display area 2772.

The process 2600 next determines (at 2640) whether to apply the alignment control to corresponding clips on the second track. In some embodiments, different types of user input indicate whether to apply the alignment control to associated second-track clips. For instance, some embodiments provide two options when a user brings up alignment control functions, or provide a checkbox for application to a second track.

When the alignment control is to be applied to the corresponding set of clips on the second track, the process applies (at 2650) the alignment to these clips. The process then ends. Stage 2770 in FIG. 27 illustrates that the alignment edit is applied only to the primary 3D video clip 2752, and not its associated corresponding secondary 3D video clip 2774. On the other hand, stage 2870 of FIG. 28 illustrates that the alignment edit is applied to both the selected primary video clip 2832 and its associated corresponding secondary 3D video clip 2874. The primary and secondary preview display areas 2872 and 2876 both show the result of the effect as applied to the frames shown in these display areas.

One of ordinary skill in the art will recognize that the UI items 2755 and 2855 are merely constructs designed to represent alignment control edits for only selected clips or for selected clips as well as their associated clips. In most cases, application of alignment control will be more involved than merely clicking a button in a UI. The user may need to directly manipulate a wireframe or the video picture itself in order to scale, shift, rotate, or skew the video picture.

IV. Exporting 3D Video Presentations

Either during the editing process or after the user has completed editing a composite media presentation, the user may export the composite presentation to a storage. Some embodiments export the primary and secondary 3D video tracks individually. In some such embodiments, the audio tracks are combined with one of the video tracks (e.g., the primary track) for export. However, some embodiments export the primary and secondary 3D video tracks to a single file.

Figure 29:
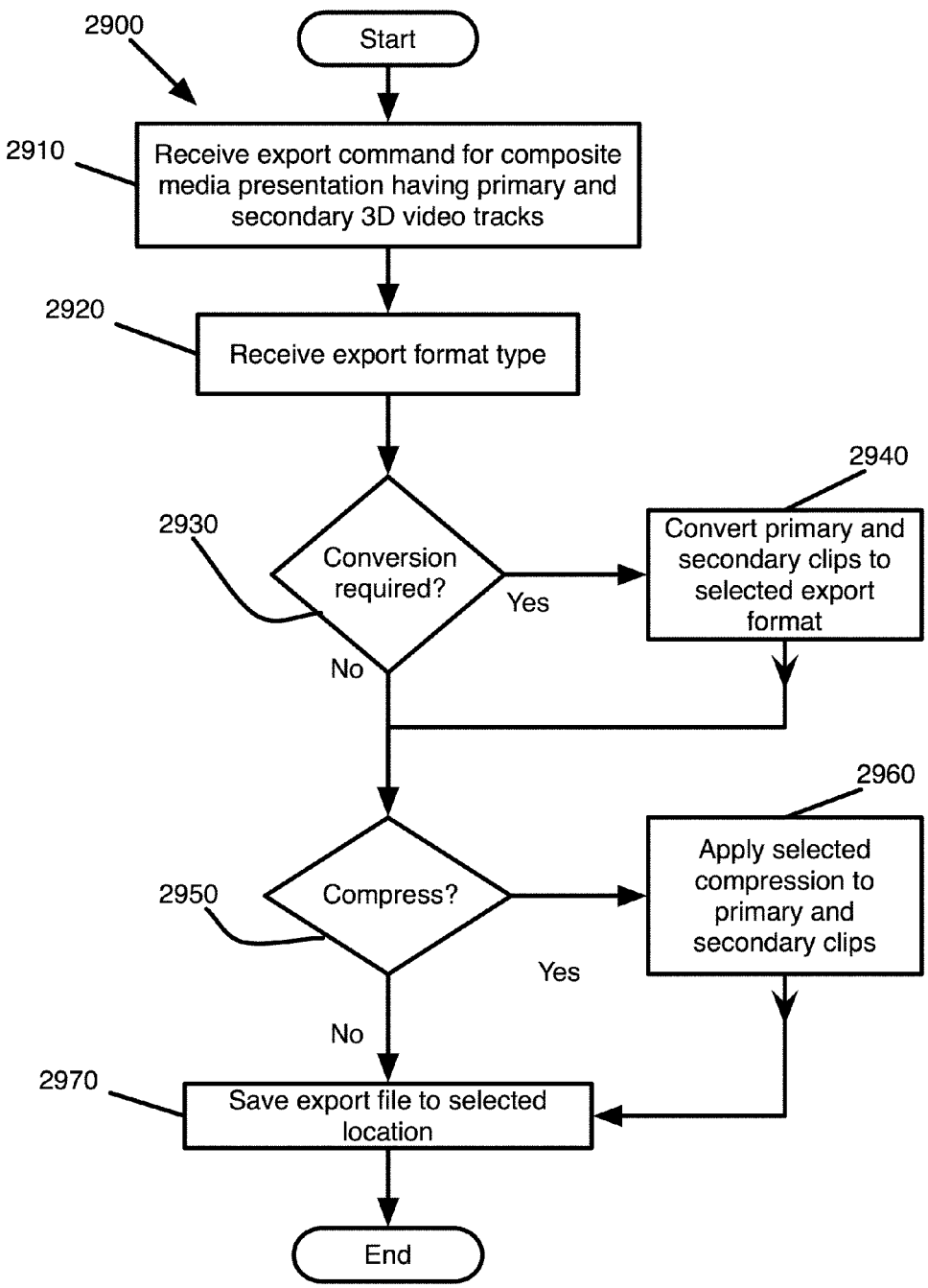
FIG. 29 conceptually illustrates a process for exporting a composite media presentation with 3D video.

FIG. 29 conceptually illustrates a process 2900 for exporting a composite media presentation with 3D video. As shown, the process 2900 receives (at 2910) an export command for a composite media presentation having primary and secondary 3D video tracks. In some embodiments, the user initiates the export command through a user interface (e.g., through a drop-down menu). Some embodiments give the user the option of exporting to either a single file or to separate files for the primary and secondary 3D video tracks.

Next, the process 2900 receives (at 2920) an export format type. This indicates the parameters of the export video presentation. Some embodiments include a default format (i.e., file type, resolution, etc.) and a user can modify this default through a menu interface, a configuration file, etc. Some embodiments determine the export format type based on the format type of the video clips that make up the composite presentation. Some embodiments include both HD and non-HD formats, as well as both NTSC and PAL formats.

The process then determines (at 2930) whether any conversion is required. When the video clips that make up the composite presentation are not all of the same type as the export format type, then the process will need to convert these video clips. When conversion is required, the process converts (at 2940) the video clips to the selected export format.

The process 2900 then determines (at 2950) whether to apply any compression to the primary and secondary tracks. In some embodiments, a user can specify if and how the composite video presentation should be compressed. When compression is selected, the process 2900 applies (at 2960) the selected compression to the primary and secondary video clips and audio clips.

The process 2900 then saves (at 2970) the export file to a selected location, such as a file system in some embodiments. The process then ends. The selected location may be an internal or external storage of the device on which the 3D media editing application operates (e.g., an internal hard drive, external drive connected via a Firewire port, etc.). In some embodiments, the export file is a playable video.

The above-described process refers to rendering a composite presentation as a single file. As described above in Section I, the media editing application of some embodiments can also export project data to a file readable by other editing applications (e.g., color-grading applications, other editing applications, etc.). In some embodiments, the associations between primary and secondary 3D video clips (e.g., those associations described by reference to FIG. 11) are maintained in the description of clips in the exported file (although other editing applications may not be capable of using the data).

V. Process for Defining a Media-Editing Application

Figure 30:
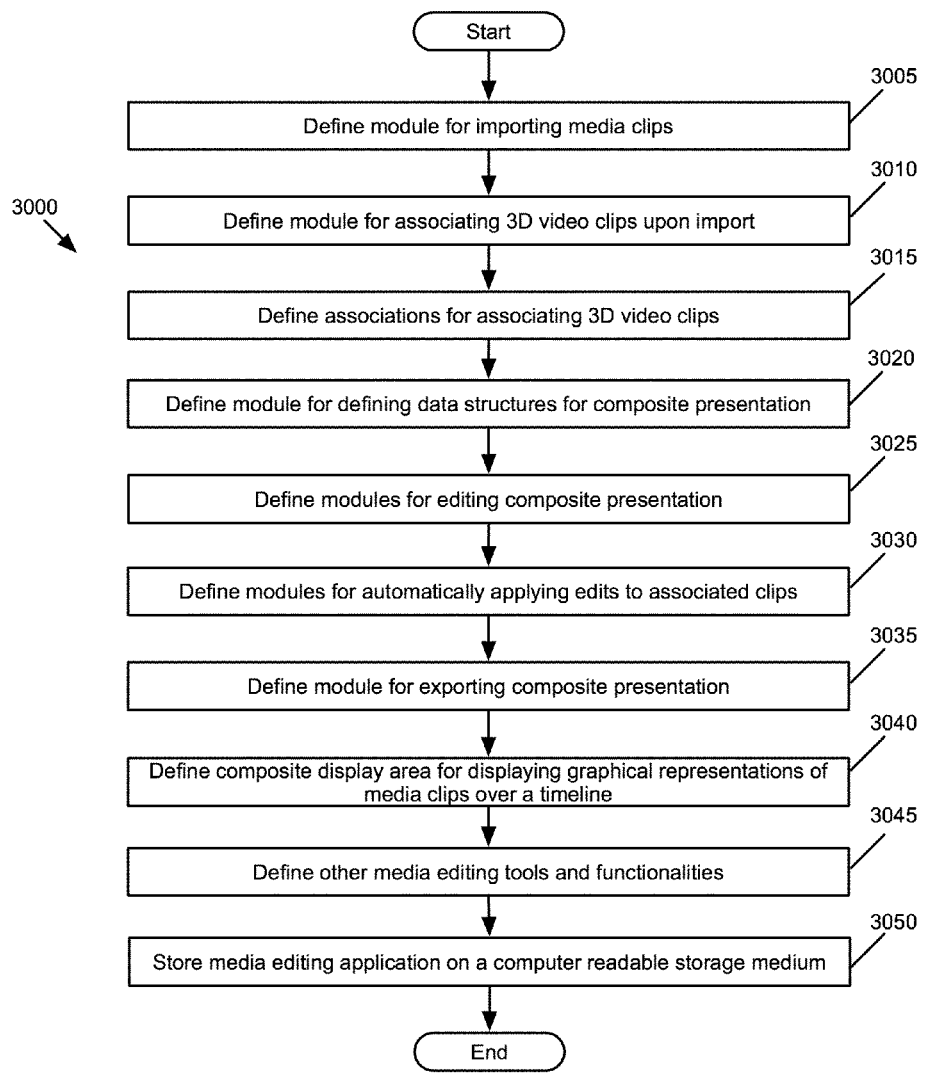
FIG. 30 conceptually illustrates a process of some embodiments for manufacturing a computer readable medium that stores a computer program.

FIG. 30 conceptually illustrates a process 3000 of some embodiments for manufacturing a computer readable medium that stores a media-editing application such as the application described above by reference to FIG. 2. In some embodiments, the computer readable medium is a distributable CD-ROM. As shown, the process 3000 begins by defining (at 3005) a module for importing media clips. An example of such a module is the A/V capture module 218 of FIG. 2. The process then defines (at 3010) a module for associating 3D video clips upon import, such as the timecode locking module 220. The process defines (at 3015) associations for associating the 3D video clips, as illustrated in FIGS. 8 and 9.

The process then defines (at 3020) a module for defining data structures for a composite presentation, such as the data structures illustrated in FIG. 11. The process defines (at 3025) modules for editing the composite presentation. Examples of such modules are shown in FIG. 2 as editing modules 232, and may include modules for inserting, deleting, moving, trimming, etc. clips within a composite media presentation. The process defines (at 3030) modules for automatically applying edits to associated clips. This may be a separate module in some embodiments, or may also be performed by editing modules 232.

The process then defines (at 3035) a module for exporting the composite presentation, such as export module 237. The process defines (at 3040) a composite display area for displaying graphical representations of media clips over a timeline. An example of such a composite display area is the display area 1010 of FIG. 10.

The process then defines (at 3045) other media editing tools and functionalities. Examples of such editing tools may include zoom, color enhancement, blemish removal, audio mixing, trim tools, etc. In addition, various other media editing functionalities may be defined. Such functionalities may include library functions, format conversion functions, etc. The process defines these additional tools in order to create a media editing application that has many additional features to the features described above.

Figure 31:
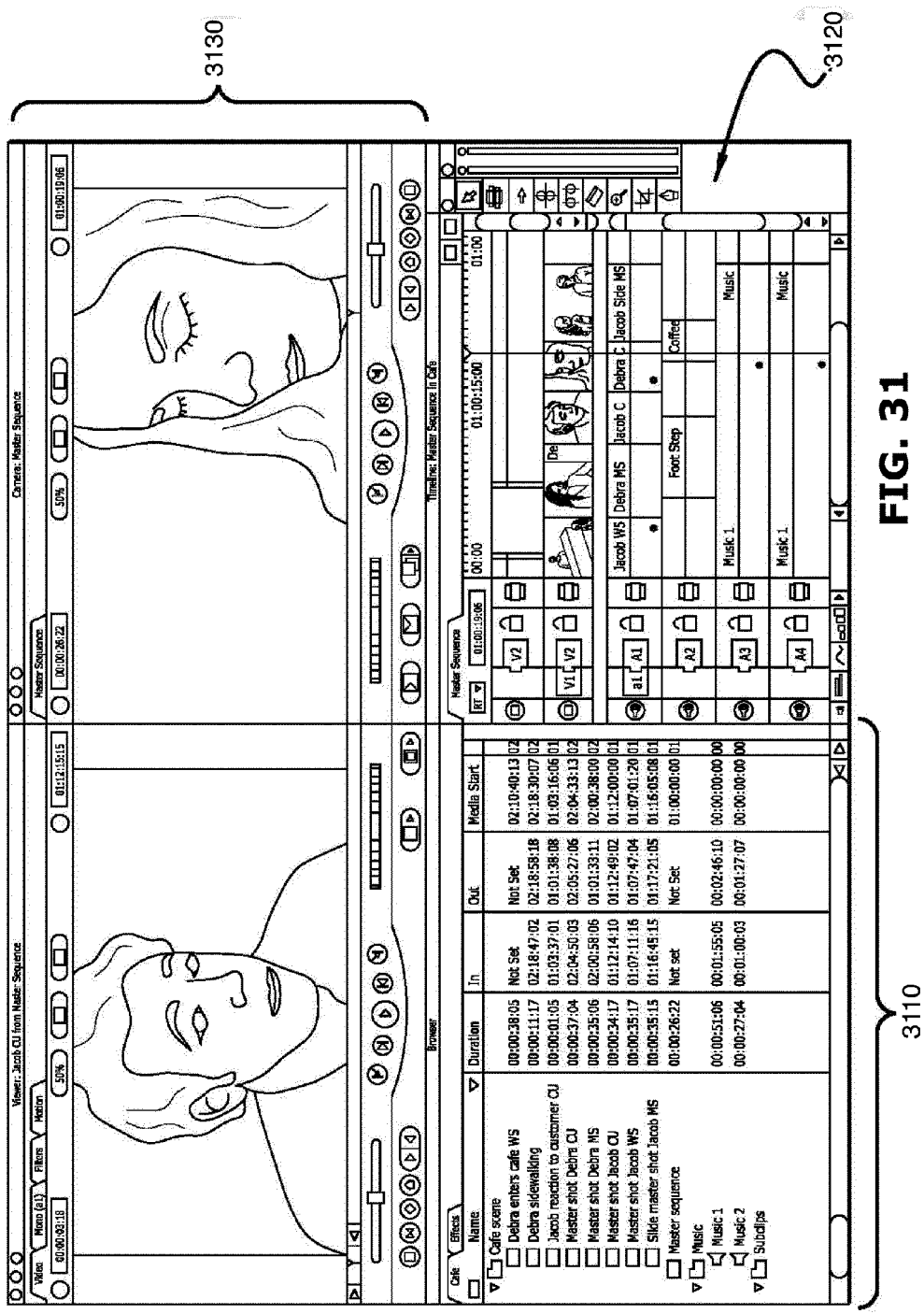
FIG. 31 illustrates an alternative GUI of the media editing application of some embodiments FIG. 32 conceptually illustrates a computer system with which some embodiments of the invention are implemented.

A more detailed view of a media editing application with these additional features is illustrated in FIG. 31. Specifically, this figure shows a media editing application with these additional tools. FIG. 31 illustrates a list of video and/or audio clips 3110, video editing tools 3120, and video displays 3130. The list of clips 3110 includes video clips along with metadata (e.g., timecode information) about the video clips. In some embodiments, the list of video clips is the list of video clips in a particular sequence of video clips, and the metadata specifies in and out points, durations, etc. for the video clips.

The video editing tools 3120 include tools that allow a user to graphically set in and out points for video clips (in other words, where in the final product a specific clip or part of a clip will be shown). The video editing tools 3120 can be used to modify the temporal sequence of the video frame and to synchronize audio tracks with video tracks (e.g., in order to add music over a video clip). In some embodiments, video editing tools 3120 also give users the ability to edit in effects or perform other video editing functions. In some embodiments, the video editing tools include trim tools for performing edits such as slide edits, ripple edits, slip edits, roll edits, etc.

Video displays 3130 allow a user to watch multiple video clips at once, thereby enabling easier selection of in and out points for the video clips. The screen shot 3100 illustrates a few of many different editing tools that a video editing application of some embodiments may have to edit digital video.

In some cases, some or all of the video clips that are displayed in the list of clips 3110, played in displays 3130, and edited by a user with video editing tools 3120, are video clips of real-world objects (e.g., people, landscapes, etc.) filmed by a camera and include real-world audio (e.g., conversations, real-world noises, etc.) recorded by a camera, microphone, etc. In some cases, some or all of the video clips are computer-generated animations or include computer generated animations (e.g., animated objects, computer-generated effects, etc.).

Returning to FIG. 30, process 3000 next stores (at 3050) the defined media-editing application on a computer readable storage medium. As mentioned above, in some embodiments the computer readable storage medium is a distributable CD-ROM. In some embodiments, the medium is one or more of a solid-state device, a hard disk, a CD-ROM, or other non-volatile computer readable storage medium.

One of ordinary skill in the art will recognize that the various elements defined by process 3000 are not exhaustive of the modules, rules, processes, and UI items that could be defined and stored on a computer readable storage medium for a media editing application incorporating some embodiments of the invention. In addition, the process 3000 is a conceptual process, and the actual implementations may vary. For example, different embodiments may define the various elements in a different order, may define several elements in one operation, may decompose the definition of a single element into multiple operations, etc. In addition, the process 6900 may be implemented as several sub-processes or combined with other operations within a macro-process.

V. Computer System

Many of the above-described features and applications are implemented as software processes that are specified as a set of instructions recorded on a computer readable storage medium (also referred to as computer readable medium). When these instructions are executed by one or more computational element(s) (such as processors or other computational elements like ASICs and FPGAs), they cause the computational element(s) to perform the actions indicated in the instructions. Computer is meant in its broadest sense, and can include any electronic device with a processor. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs when installed to operate on one or more computer systems define one or more specific machine implementations that execute and perform the operations of the software programs.

Figure 32:
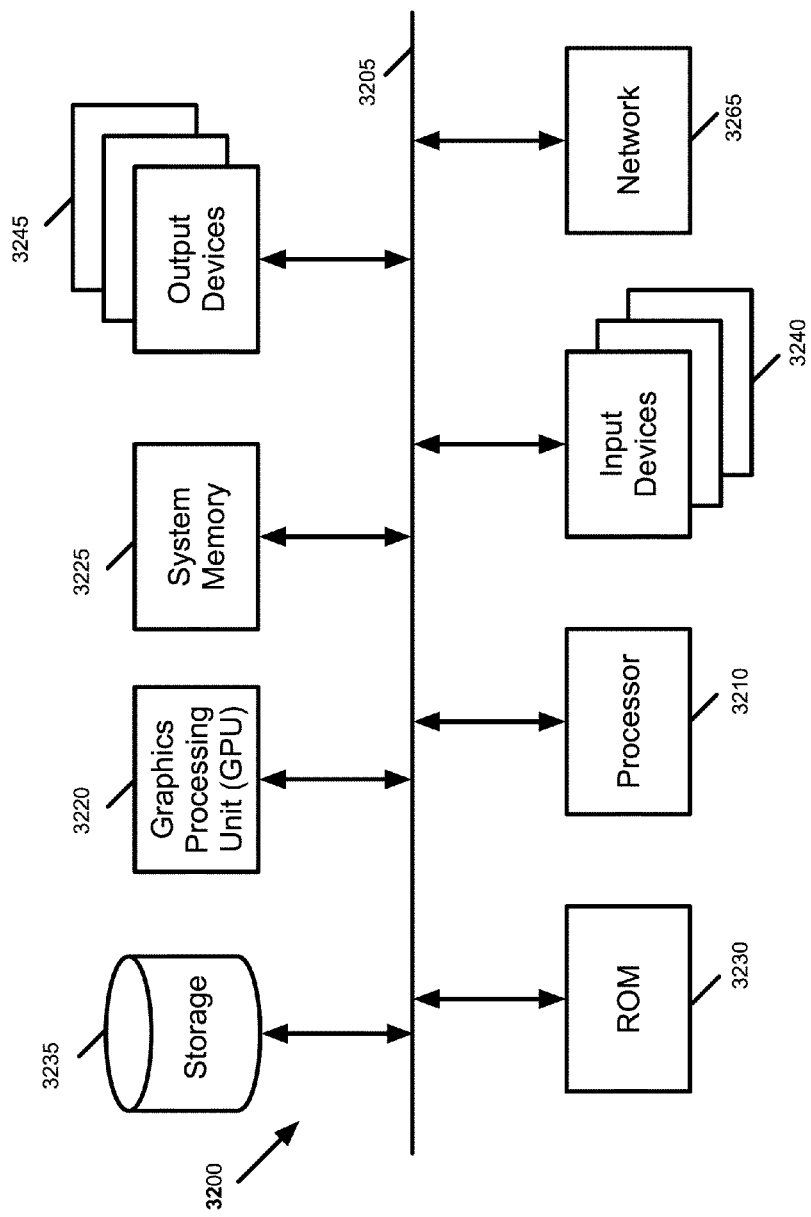

FIG. 32 conceptually illustrates a computer system with which some embodiments of the invention are implemented. Such a computer system includes various types of computer readable media and interfaces for various other types of computer readable media. One of ordinary skill in the art will also note that the digital video camera of some embodiments also includes various types of computer readable media. Computer system 3200 includes a bus 3205, processing unit(s) 3210, a graphics processing unit (GPU) 3220, a system memory 3225, a read-only memory 3230, a permanent storage device 3235, input devices 3240, and output devices 3245.

The bus 3205 collectively represents all system, peripheral, and chipset buses that communicatively connect the numerous internal devices of the computer system 3200. For instance, the bus 3205 communicatively connects the processing unit(s) 3210 with the read-only memory 3230, the GPU 3220, the system memory 3225, and the permanent storage device 3235.

From these various memory units, the processing unit(s) 3210 retrieve instructions to execute and data to process in order to execute the processes of the invention. The processing unit(s) may be a single processor or a multi-core processor in different embodiments. While the discussion in this section primarily refers to software executed by a microprocessor or multi-core processor, in some embodiments the processing unit(s) include a Field Programmable Gate Array (FPGA), an ASIC, or various other electronic components for executing instructions that are stored on the processor.

Some instructions are passed to and executed by the GPU 3220. The GPU 3220 can offload various computations or complement the image processing provided by the processing unit(s) 3210. In some embodiments, such functionality can be provided using CoreImage's kernel shading language.

The read-only-memory (ROM) 3230 stores static data and instructions that are needed by the processing unit(s) 3210 and other modules of the computer system. The permanent storage device 3235, on the other hand, is a read-and-write memory device. This device is a non-volatile memory unit that stores instructions and data even when the computer system 3200 is off. Some embodiments of the invention use a mass-storage device (such as a magnetic or optical disk and its corresponding disk drive) as the permanent storage device 3235.

Other embodiments use a removable storage device (such as a floppy disk, flash drive, or ZIP® disk, and its corresponding disk drive) as the permanent storage device. Like the permanent storage device 3235, the system memory 3225 is a read-and-write memory device. However, unlike storage device 3235, the system memory is a volatile read-and-write memory, such a random access memory. The system memory stores some of the instructions and data that the processor needs at runtime. In some embodiments, the invention's processes are stored in the system memory 3225, the permanent storage device 3235, and/or the read-only memory 3230. For example, the various memory units include instructions for processing multimedia items in accordance with some embodiments. From these various memory units, the processing unit(s) 3210 retrieve instructions to execute and data to process in order to execute the processes of some embodiments.

The bus 3205 also connects to the input and output devices 3240 and 3245. The input devices enable the user to communicate information and select commands to the computer system. The input devices 3240 include alphanumeric keyboards and pointing devices (also called "cursor control devices"). The output devices 3245 display images generated by the computer system. The output devices include printers and display devices, such as cathode ray tubes (CRT) or liquid crystal displays (LCD).

Finally, as shown in FIG. 32, bus 3205 also couples computer 3200 to a network 3265 through a network adapter (not shown). In this manner, the computer can be a part of a network of computers (such as a local area network ("LAN"), a wide area network ("WAN"), or an Intranet, or a network of networks, such as the internet. Any or all components of computer system 3200 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processor and includes sets of instructions for performing various operations. Examples of hardware devices configured to store and execute sets of instructions include, but are not limited to application specific integrated circuits (ASICs), field programmable gate arrays (FPGA), programmable logic devices (PLDs), ROM, and RAM devices. Examples of computer programs or computer code include machine code, such as is produced by a compiler, and files including higher-level code that are executed by a computer, an electronic component, or a microprocessor using an interpreter.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIGS. 1, 3, 12, 13, 16, 18, 21, 23, 26, 29, and 30) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process.

What is claimed is:

1. A non-transitory machine readable medium storing a computer program which when executed by at least one processor associates pairs of video clips, the computer program comprising sets of instructions for:

identifying, from a set of external sources, a first video clip of a scene from a first view in a stereoscopic three-dimensional (3D) video and a second video clip of the same scene from a second view in the stereoscopic 3D video, each of the first and second video clips associated with metadata; and importing, from the set of external sources, the first and second video clips by:

analyzing the metadata of the first and second video clips to determine if the metadata match one another;

associating the first video clip with the second video clip as matching pairs of video clips in the stereoscopic 3D video upon determining that the metadata match one another; and storing the associated first and second video clips in a storage, wherein the association is for use in timecode locking the first and second video clips to one another in order to synchronously edit the first and second video clips for a composite presentation.

2. The non-transitory machine readable medium of claim 1, wherein when the first video clip and the second video clip are timecode locked, any edit operation that affects a duration of one of the first and second clips in the composite presentation is synchronously applied to the other clip.

3. The non-transitory mac readable medium of claim 1, wherein the set of instructions for associating comprises a set of instructions for storing a reference to the second video clip with the first video clip.

4. The non-transitory machine readable medium of claim 3, wherein the reference is a first reference, wherein the set of instructions for associating further comprises a set of instructions for storing a second reference to the first video clip with the second video clip.

5. The non-transitory machine readable medium of claim 1, wherein the set of external sources are three-dimensional (3D) video cameras that simultaneously captured the first and second video clips.

6. The non-transitory machine readable medium of claim 1, wherein the metadata comprises start and end timecodes, wherein the set of instructions for analyzing the metadata comprises a set of instructions for determining whether the start and end timecodes of the first and second video clips match one another.

7. The non-transitory machine readable medium of claim 1, wherein the set of instructions for importing further comprises sets of instructions for:

analyzing the metadata to identify which video clip of the first and second video clips is a primary video clip in the stereoscopic 3D video; and specifying the identified video clip as a primary video clip and the other remaining clip as a secondary video clip in the stereoscopic 3D video.

8. The non-transitory machine readable medium of claim 1, wherein the metadata of each of the first and second video clips comprises a filename, wherein the filenames of the first and second video clips are the same except for an identifier that indicates whether the corresponding video clip is from the first view or the second view, wherein the set of instructions for analyzing the metadata comprises sets of instructions for:

determining, from the identifier of the first video clip's filename, that the first video clip is from the first view; and determining, from the identifier of the second video clip's filename, that the second video clip is from the second view.

9. The non-transitory machine readable medium of claim 1, wherein the metadata of each of the first and second video clips comprises a timecode which indicates an order of the first and second video clips relative to other video clips on the set of external sources.

10. The non-transitory machine readable medium of claim 1, wherein the metadata of each of the first and second video clips comprises a timecode, wherein the timecodes for the first and second video clips are the same, wherein the set of instructions for analyzing the metadata comprises a set of instructions for determining that the timecodes of the first and second video clips are matching timecodes.

11. For a media editing application, a method of importing video clips on a computing device, the method comprising:

receiving an input to import a first video clip and a second video clip into the media editing application from a set of external sources, wherein the first video clip is associated with a first filename that indicates that the first video clip is a primary video clip of a stereoscopic three dimensional (3D) video, and the second video clip is associated with a second filename that indicates that the second video clip is a secondary video clip of the stereoscopic 3D video; and importing the first and second video clips into the media editing application by:

analyzing the filenames of both the first and second video clips to determine that the first and second video clips are a matching pair of video clips, and that the first video clip is the primary video clip and the second video clip is the secondary video clip;

creating an association between the first and second video clips based on the determination, wherein creating the association comprises timecode locking the primary and secondary video clips to one another in order to synchronously edit the primary and secondary video clips for a composite presentation; and storing the first and second video clips in a storage.

12. The method of claim 11, wherein the filenames of the first and second video clips are the same except for an identifier that indicates whether the corresponding video clip is the primary video clip or the secondary video clip of the stereoscopic 3D video, wherein the analyzing comprises inspecting the identifiers of the first and second video clips.

13. For a media editing application, a method for associating pairs of video clips, the method comprising:

identifying, from a set of external sources, a first video clip of a scene from a first view in a stereoscopic three-dimensional (3D) video and a second video clip of the same scene from a second view in the stereoscopic 3D video, each of the first and second video clips associated with metadata; and importing, from the set of external sources, the first and second video clips by:

analyzing the metadata of the first and second video clips to determine if the metadata match one another;

associating the first video clip with the second video clip as matching pairs of video clips in the stereoscopic 3D video upon determining that the metadata match one another; and storing the associated first and second video clips in a storage, wherein the association is for use in timecode locking the first and second video clips to one another in order to synchronously edit the first and second video clips for a composite presentation.

14. The method of claim 13, wherein when the first video clip and the second video clip are timecode locked, any edit operation that affects a duration of one of the first and second clips in the composite presentation is synchronously applied to the other clip.

15. The method of claim 13, wherein associating the first video clip comprises storing a reference to the second video clip with the first video clip.

16. The method of claim 15, wherein the reference is a first reference, wherein associating the first video clip further comprises storing a second reference to the first video clip with the second video clip.

17. The method of claim 13, wherein the set of external sources are three-dimensional (3D) video cameras that simultaneously captured the first and second video clips.

18. The method of claim 13, wherein the metadata comprises start and end timecodes, wherein analyzing the metadata comprises determining whether the start and end timecodes of the first and second video clips match one another.

19. The method of claim 13, wherein importing further comprises:

analyzing the metadata to identify which video clip of the first and second video clips is a primary video clip in the stereoscopic 3D video; and specifying the identified video clip as a primary video clip and the other remaining clip as a secondary video clip in the stereoscopic 3D video.

20. The method of claim 13, wherein the metadata of each of the first and second video clips comprises a filename, wherein the filenames of the first and second video clips are the same except for an identifier that indicates whether the corresponding video clip is from the first view or the second view, wherein analyzing the metadata comprises:

determining, from the identifier of the first video clip's filename, that the first video clip is from the first view; and determining, from the identifier of the second video clip's filename, that the second video clip is from the second view.

21. The method of claim 13, wherein the metadata of each of the first and second video clips comprises a timecode which indicates an order of the first and second video clips relative to other video clips on the set of external sources.

22. The method of claim 13, wherein the metadata of each of the first and second video clips comprises a timecode, wherein the timecodes for the first and second video clips are the same, wherein analyzing the metadata comprises determining that the timecodes of the first and second video clips are matching timecodes.

23. A non-transitory machine readable medium storing a computer program which when executed by at least one processing unit imports video clips, the computer program comprising sets of instructions for:

receiving an input to import a first video clip and a second video clip into the media editing application from a set of external sources, wherein the first video clip is associated with a first filename that indicates that the first video clip is a primary video clip of a stereoscopic three dimensional (3D) video, and the second video clip is associated with a second filename that indicates that the second video clip is a secondary video clip of the stereoscopic 3D video; and importing the first and second video clips into the media editing application by:

analyzing the filenames of both the first and second video clips to determine that the first and second video clips are a matching pair of video clips, and that the first video clip is the primary video clip and the second video clip is the secondary video clip;

creating an association between the first and second video clips based on the determination, wherein creating the association comprises timecode locking the primary and secondary video clips to one another in order to synchronously edit the primary and secondary video clips for a composite presentation; and storing the first and second video clips in a storage.

24. The non-transitory machine readable medium of claim 23, wherein the filenames of the first and second video clips are the same except for an identifier that indicates whether the corresponding video clip is the primary video clip or the secondary video clip of the stereoscopic 3D video, wherein the analyzing comprises inspecting the identifiers of the first and second video clips.

* * * * *